United States Patent
Enokida

(10) Patent No.: US 7,366,906 B2
(45) Date of Patent: Apr. 29, 2008

(54) DIGITAL CERTIFICATE MANAGEMENT SYSTEM, DIGITAL CERTIFICATE MANAGEMENT APPARATUS, DIGITAL CERTIFICATE MANAGEMENT METHOD, PROGRAM AND COMPUTER READABLE INFORMATION RECORDING MEDIUM

(75) Inventor: Tomoaki Enokida, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 838 days.

(21) Appl. No.: 10/804,097

(22) Filed: Mar. 19, 2004

(65) Prior Publication Data

US 2004/0243805 A1    Dec. 2, 2004

(30) Foreign Application Priority Data

| Mar. 19, 2003 | (JP) | ............................ 2003-075278 |
| Mar. 31, 2003 | (JP) | ............................ 2003-096129 |
| Mar. 1, 2004 | (JP) | ............................ 2004-056764 |
| Mar. 1, 2004 | (JP) | ............................ 2004-056766 |

(51) Int. Cl.
  *H04L 9/00* (2006.01)
  *G06F 11/30* (2006.01)
  *H04L 9/14* (2006.01)
  *H04L 29/06* (2006.01)
  *H04N 7/24* (2006.01)

(52) U.S. Cl. ................. 713/175; 713/156; 713/157; 713/158; 713/168; 713/169; 713/191

(58) Field of Classification Search ................. 713/175
See application file for complete search history.

(56) References Cited

U.S. PATENT DOCUMENTS 5,781,310 A    7/1998    Nakamura et al.

FOREIGN PATENT DOCUMENTS

| EP | 1641212 A2 * | 3/2006 |
| JP | 11-122238 | 4/1999 |

OTHER PUBLICATIONS

Bresson et al., "Provably Secure Authentication Group Diffie-Hellman Key Exchange", ACM Transactions on Information and System Security, vol. 10, Issue 3, Jul. 2007, pp. 1-45.*

* cited by examiner

*Primary Examiner*—Matthew Smithers
*Assistant Examiner*—Courtney D Fields
(74) *Attorney, Agent, or Firm*—Oblon, Spivak, McClelland, Maier & Neustadt, P.C.

(57) ABSTRACT

A digital certificate management apparatus updates a proof key used for proving validity of a digital certificate used for authentication for establishing communication between a client and a server. The apparatus acquires a new proof key for updating, acquires a new digital certificate used for the authentication for which validity can be proved with the use of said new proof key, transmits the new proof key to the client and transmits a new server certificate which is a new digital certificate for the server to the server. The apparatus transmits the new server certificate to the server after receiving, from the client, information indicating that the client has received the new proof key.

71 Claims, 58 Drawing Sheets

| NODE ID | |
|---|---|
| DIRECT COMMUNICATION WITH MANAGEMENT APPARATUS AVAILABILITY | |
| COMMUNICATION COUNTERPART NODE ID | CLIENT/SERVER |
| | ROOT KEY ON USE |
| | UPDATE STATE |
| ⋮ | ... |
| | ... |
| | ... |
| ⋮ | ... |
| | ... |
| | ... |

FIG.33A

| SERVER APPARATUS 30 ||
| --- | --- |
| DIRECT COMMUNICATION AVAILABLE ||
| CLIENT APPARATUS 40-1 | SERVER |
| | ROOT KEY A |
| | UPDATE NEEDED |
| CLIENT APPARATUS 40-2 | SERVER |
| | ROOT KEY A |
| | UPDATE NEEDED |
| CLIENT APPARATUS 40-3 | SERVER |
| | ROOT KEY A |
| | UPDATE NEEDED |
| ⋮ | ... |
| | ... |
| | ... |
| CLIENT APPARATUS 40-n | SERVER |
| | ROOT KEY A |
| | UPDATE NEEDED |

FIG.33B

| CLIENT APPARATUS 40-1 ||
| --- | --- |
| DIRECT COMMUNICATION NOT AVAILABLE ||
| N/A | |

FIG.33C

| CLIENT APPARATUS 40-1 ||
| --- | --- |
| DIRECT COMMUNICATION NOT AVAILABLE ||
| SERVER APPARATUS 30 | CLIENT |
| | ROOT KEY A |
| | UPDATE NEEDED |

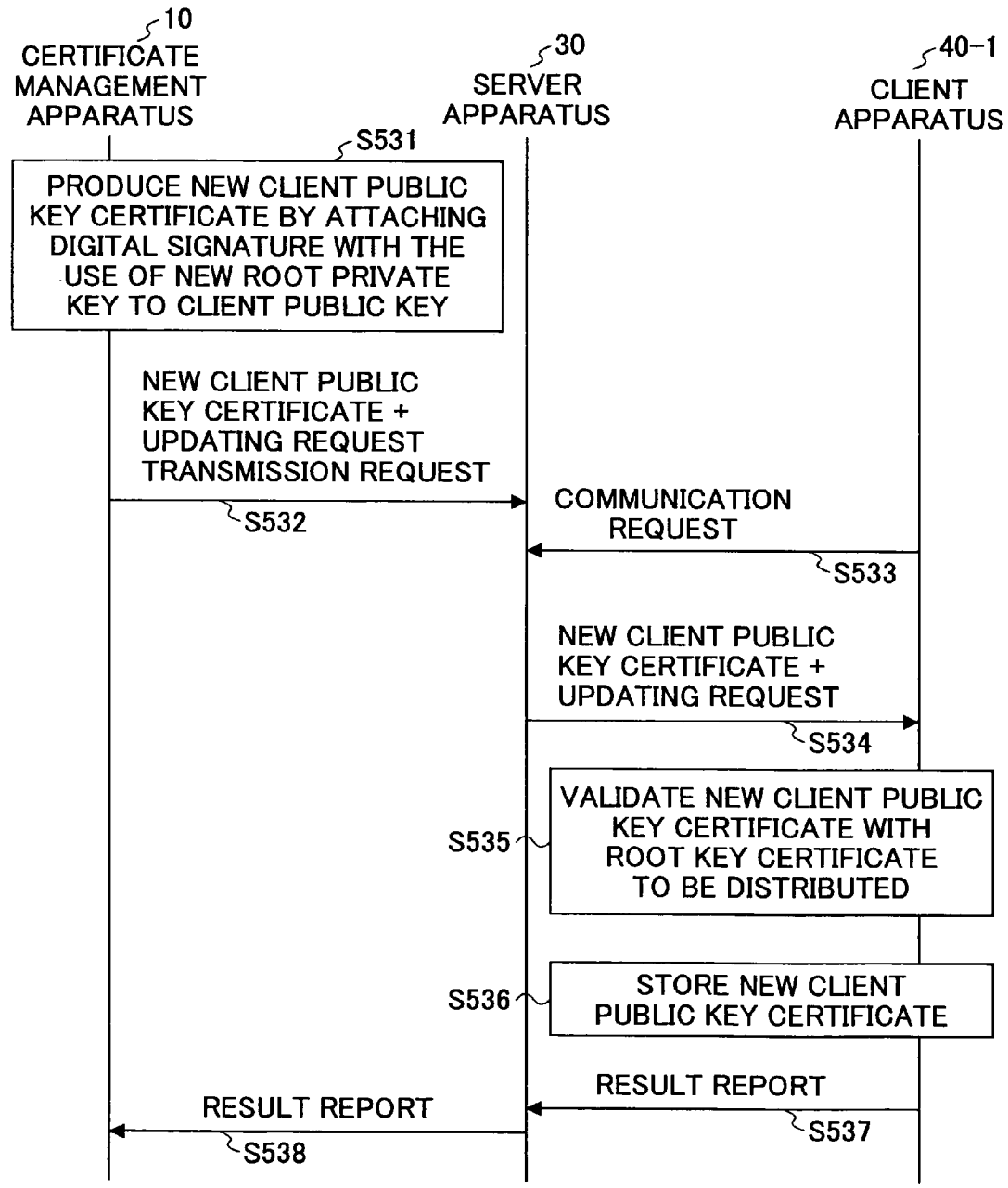

FIG.40A

| CLIENT APPARATUS 40 ||
|---|---|
| DIRECT COMMUNICATION AVAILABLE ||
| SERVER APPARATUS 30-1 | CLIENT |
| | ROOT KEY A |
| | UPDATE NEEDED |
| SERVER APPARATUS 30-2 | CLIENT |
| | ROOT KEY A |
| | UPDATE NEEDED |
| SERVER APPARATUS 30-3 | CLIENT |
| | ROOT KEY A |
| | UPDATE NEEDED |
| ⋮ | ... |
| | ... |
| | ... |
| SERVER APPARATUS 30-n | CLIENT |
| | ROOT KEY A |
| | UPDATE NEEDED |

FIG.40B

| SERVER 30-1 ||
|---|---|
| DIRECT COMMUNICATION NOT AVAILABLE ||
| N/A | |
| | |
| | |

FIG.40C

| SERVER 30-1 ||
|---|---|
| DIRECT COMMUNICATION NOT AVAILABLE ||
| CLIENT APPARATUS 30 | CLIENT |
| | ROOT KEY A |
| | UPDATE NEEDED |

DIGITAL CERTIFICATE MANAGEMENT SYSTEM, DIGITAL CERTIFICATE MANAGEMENT APPARATUS, DIGITAL CERTIFICATE MANAGEMENT METHOD, PROGRAM AND COMPUTER READABLE INFORMATION RECORDING MEDIUM

BACKGROUND OF THE INVENTION

1. Field of the Invention

The present invention relates to a digital certificate management system managing a digital certificate in a digital certificate management apparatus used for authentication processing between one or a plurality of clients and one or a plurality of servers which configure a client and server system, the digital certificate management apparatus, a digital certificate management method for managing the digital certificate, an updating procedure determining method for determining an updating procedure for updating the digital certificate proving validity of the digital certificate concerning the digital certificate management processing, a program causing a computer to function as the digital certificate management apparatus, and a computer readable information recording medium storing the program.

2. Description of the Related Art

There is a client and server system in which a plurality of computers such as PCs are connected together via a communication network in a manner such that each computer is communicatable with any other computers, and at least one thereof acts as a server and at least another one thereof acts as a client.

In such a client and server system, a request is transmitted from the client to the server, which then executes processing according to the request, and then responds to the client. Such a client and server system has been applied to a so-called electronic commerce system in which the client transmits an order request for goods, and the server accepts the order request, for example. Another type of system has also been proposed in which various electronic devices are made to have functions as the clients or the servers, are connected via a communication network and thereby, remote management for the electronic devices is achieved.

In such a case, it is important to confirm whether a communication counterpart is an appropriate one, and also, to confirm whether information transmitted has not been tampered. Furthermore, especially in a case of utilizing the Internet or so, in many cases, information passes through many computers which have no relevance until the information reaches a communication counterpart. Thereby, when secret information is transmitted, it is necessary to take a measure such as to avoid the information from leaking. A communication protocol which solves such a problem, such as a protocol called SSL (secure socket layer) or so has been developed, and has spread widely. When such a protocol is applied for communication, a public key cryptosystem and a private key cryptosystem are combined for performing authentication of a communication counterpart, and also, tamper or wiretap can be avoided effectively since the information is encoded.

A communication procedure performed when the authentication processing is performed with the use of a pubic key cryptosystem, and a digital certificate used there, will now be described. There, it is assumed that a client authenticates a server in this case. In this case, in order to perform authentication processing, a server private key and a server public key certificate (server certificate) are stored in the server, and also, a root key certificate is stored in the client.

The server private key is a private key issued by a certificate authority (CA) for the server. The server public key certificate is created in a form of a digital certificate including a public key corresponding to the private key to which the CA attached a digital signature. The root key certificate also has a form of a digital certificate including a root key which is a proof public key (referred to as a 'proof key', hereinafter) corresponding to a root private key which is a proof private key used by the CA in the digital signature.

FIGS. 53A and 53B illustrate such relationship. As shown in FIG. 53A, the server public key includes a key body used for decoding a document encoded with the use of the server private key, and bibliographic information including information of an agency (CA) which issued the public key, a part (server) for which public key was issued, validity due date and so forth. In order to show that the key body and the bibliographic information have not been tampered, the CA encodes with the use of the root private key a hash value obtained from hash processing performed on the server public key, and attaches it as a digital signature to the server public key. Further, at this time, identification information used for identifying the root private key used for the digital signature is added to the bibliographic information as signature key information. The server public key certificate is obtained as a public key certificate having the digital signature attached thereto.

When using the server public key certificate in the authentication processing, the digital signature included therein is decoded with the use of the key body of the root key which is the public key corresponding to the root private key. When the decoding has been completed normally, it is positively determined that the digital signature was attached by the CA. Further, when a hash value obtained from performing hash processing on the server public key part and a hash value obtained from the decoding agree with one another, it is determined that the key itself has not been subject to any damage or tamper. Furthermore, when the received data has been normally decoded with the use of the server public key, it is determined that the data is one transmitted from the server which possesses the server private key. After that, with reference to the bibliographic information, authentication is performed based on the given reliability of the CA, whether or not the server is registered, or so.

In order to perform the authentication, it is necessary to previously stores the root key, and this root key is stored in a form of a root key certificate having a digital signature attached thereto by the CA, as shown in FIG. 53B. This root key certificate is in a self signing type such that the digital signature can be decode with the use of a public key which is included in the same certificate. When the root key is used, the digital signature included in the root key certificate is decoded with the use of the key body, and is compared with a hash value obtained from performing hash processing on the root key. When they agree with one another, it can be proved that the root key has not been subject to any damage or such.

When the client requests the server for communication in the client and server system, these respective apparatuses perform the follows processing:

First, the server generates a random number in response to the communication request from the client, and also, encodes it with the use of the server private key. The thus-obtained encoded random number is transmitted to the client together with the server public key certificate. Then, when receiving it, the client proves validity of the received server public key certificate with the use of the root key certificate. This proving processing includes not only processing for proving that it has been subject to neither damage nor tamper but also processing for proving that the server is a proper communication counterpart with the use of the bibliographic information. After the proving is normally completed, the received random number is decoded with the use of the server public key included in the received server public key certificate. When the decoding is completed in success, it can be proved that the random number is one received from the server for which the server public key certificate was issued, positively. Thus, through the above-described processing, the server is authenticated as a proper communication counterpart by the client.

Furthermore, when a key for common key used encoding is exchanged after it is encoded with the use of the private key or the public key, the common key can be exchanged safely, and it is achieved to establish a safe communication path by encoding the communication contents according to the common key used encoding.

In the public key cryptosystem, it is possible to derive the private key from the public key although it requires a considerably long time depending on the key length, in general. Then, when the private key is thus known once, a third person can pretend to be the right holder of the private key (spoofing). If so, reliability in the authentication or safety in communication cannot be secured. Then, in order to solve this problem, there are some users who apply a security policy by which validity due date is given to a key mentioned above, and a set of keys are replaced periodically. As a result, when the above-mentioned remote management system utilizing the above-mentioned authentication processing is provided, it is needed to guarantee, for a customer, that the system has an ability of updating keys. The same discussions should also be made for the root keys and root private keys. A trigger of updating a key is not only expiration of a predetermined validity due date, but also a fact that it is known that the private key has leaked to a third person.

Japanese Laid-open Patent Application No. 11-122238 discloses an art relating to such a manner of updating the key, for example.

SUMMARY OF THE INVENTION

However, in the above-mentioned disclosure, although a disclosure is included for updating a key issued for each apparatus, no disclosure is included for updating the root key.

In a case of public key cryptosystem, when a pair of keys issued for each apparatus are updated, this apparatus stores a new public key certificate corresponding to the thus-updated new private key. Then, after the new certificate is transferred to a communication counterpart, the above-described authentication processing can be performed without problem.

However, when the root key is updated, since the new root key is not useful for decoding the digital signature attached in the old digital certificate, it is necessary to again create a new public key certificate for each apparatus with the use of a new root private key corresponding to the new root key, and then, to distribute the thus-created certificate. Otherwise, the authentication processing cannot be performed properly. In this regard, it is noted that the private key of each apparatus should not be necessarily updated.

Since no way was known to update the root key without causing any such a trouble for the authentication processing, it was not possible to safely distribute the root key to the apparatus for which updating thereof is needed via the communication network. Thus, it was necessary to safely distribute the root key certificate or the public key certificate via another safe communication path to each apparatus. In other words, it was necessary to provide a special communication path for distributing the root key certificate.

As such a communication path, for example, a certified mail system may be applied. Specifically, a memory card, a flexible disk or such, in which data of a certificate is stored, is distributed to a manager (person) of a relevant apparatus via the certified mail system, and then, the manager updates the key of the apparatus of his or her own. However, this method can be applied only in a case where the manager has a sufficient skill or knowledge for the relevant apparatus such as the server or the client. Furthermore, in this method, the CA has no way to prove that the manager of the apparatus performs the updating processing without error, after distributing the recording medium such as a memory card or a flexible disk. If the manager fails to properly update the key or fails to perform the updating processing, the authentication processing cannot work properly.

On the other hand, also the manager has no way to prove that the data of certificate thus distributed is correct one, other than determining it from a name of a sender printed on the recording medium or on the envelope thereof. Thus, there is a possibility that a person who pretends to the CA distributed false data which may then be used to update the key for the system.

In another method, the CA or a provider of the client and server system may dispatch service staffs to respective locations in which relevant apparatuses are installed for directly perform key updating works. However, if such a method is applied for a case where the relevant system covers a very wide area, many service centers are needed, and thus, the costs increase accordingly. It is also necessary to well manage and educate these service staffs. For example, management with the use of identification numbers of the respective managers who perform the updating works, with a necessary measure to positively avoid any possible wrongdoings. For example, if a simple method is applied such as to manually input authentication information or such, it is necessary to change authentication information in the respective apparatus for positively deleting updating right of a retired service staff if any, for example. However, it is difficult to perform such change in the authentication for many apparatuses installed at the customers.

Consequently, if a method is employed for securing a safe distribution path for the certificate without the use of the communication network, there is no way other than relying on a person, where a deceit may occur accordingly. Although it is possible to perform management to reduce this possibility to the best effort, considerable costs may be required. Therefore, there was not a practical way to establish a 'path' for distributing the certificate for which there is no worry about such a deceit As a communication path for such a key/certificate updating work, a special communication path may be prepared with the use of a digital certificate especially for this updating work and a root key certificate especially for the updating work, other than those used for regular communications. However, in a system in which a client authenticates a server, the following problem may occur at this time:

That is, in this case, the server transmits a digital certificate in response to a connection request made by the client. However, in a case where the server receives connection requests in any timing from unspecified clients, it is difficult to properly determine for each client which of a digital certificate for the regular communications and the same for the updating work should be distributed. In case of making the determination, a session identifier such as a source end point identifier, a destination end point identifier, a URL (uniform resource locator), or such, may be utilized. However, in order to achieve the determination, it is necessary to provide a function in each client to switch the session identifier (for example, URL) depending on whether the relevant communications are regular communications or communications for the updating work, to provided in the server to manage a correspondence relationship between the source end point identifier and a digital certificate to be distributed, or such. However, such a measure may require extra costs accordingly. Accordingly, to provide a function in the server to select a digital certificate to be distributed to the client based on information exchanged before actual communications such as a session identifier should be omitted if possible. Further, if two communication paths are provided with the use of a same protocol, a problem may occur in which, when the authentication results in failure, it may be difficult to determine whether a problem occurs from the digital certificate or from the session identifier.

Thus, the method of providing a special communication path for the root key updating may result in increase in the costs or increase in the management load, and thus, there is a demand to provide a scheme by which, without providing a special communication path, the root key can be safely updated.

The present invention has been devised for the purpose of solving this problem, and for providing a scheme in which a proof key used for proving validity of a digital certificate in authentication processing in a client and server system can be safely updated without providing a special communication path therefor.

In order to achieve the above-mentioned object, according to the present invention, a digital certificate management system includes: a client and server system in which a digital certificate is used for authentication so as to establish communication between a server and a client, and data transmission is performed therebetween with the use of a path established through the authentication; and a digital certificate management apparatus communicatable with the client and the server, wherein: the digital certificate management apparatus includes a proof key updating unit which updates a proof key used for proving validity of the digital certificate used for authentication by the server; the proof key updating unit includes: a unit configured to acquire a new proof key for updating; a unit configured to acquire a new digital certificate used for the authentication for which validity can be proved with the use of the new proof key; a first transmitting unit transmitting the new proof key to the client; and a second transmitting unit transmitting a new server certificate which is the new digital certificate for the server to the server, and wherein: the second transmitting unit performs the operation of transmitting the new server certificate to the server after receiving from the client information indicating that the client has received the new proof key.

In this digital certificate management system, it is preferable that: the proof key updating unit in the digital certificate management apparatus includes a unit configured to acquire a proof key certificate, which is the digital certificate, including the new proof key, for which validity can be proved with the use of an old proof key, and wherein: the first transmitting unit is configured to transmit the new proof key in a form of the proof key certificate to the client; and the client includes a unit configured to be responsive to the proof key included in the proof key certificate coming from the digital certificate management apparatus, for proving validity of the received proof key certificate with the use of the old proof key and storing the proof key included in the proof key certificate when determining that the proof key is an appropriate one.

The proof key updating unit in the digital certificate management system may preferably include: a unit configured to acquire a first proof key certificate, including the new proof key, which is the digital certificate for which validity can be proved with the use of an old proof key; and a unit configured to acquire a second proof key certificate, including the new proof key, which is the digital certificate for which validity can be proved with the use of the new proof key, and wherein: the first transmitting unit is configured to transmit the new proof keys in respective forms of the first proof key certificate and the second proof key certificate to the client; and the client includes: a unit configured to be responsive to the first proof key certificate coming from the digital certificate management apparatus, for proving validity of the received certificate with the use of the old proof key and storing the certificate when determining that it is an appropriate one; and a unit configured to be responsive to the second proof key certificate coming from the digital certificate management apparatus, for proving validity of the received certificate with the use of the new proof key included in the first proof key certificate, and storing the second proof key certificate when determining that it is an appropriate one, and then deleting the old proof key certificate and the first proof key certificate, and wherein: the first transmitting unit in the digital certificate management apparatus is configured to perform the operation of transmitting the second proof key certificate to the client at least after receiving information from the server indicating that the server has received the new server certificate.

According to another aspect of the present invention, a digital certificate management system includes: a client and server system in which a digital certificate is used for mutual authentication so as to establish communication between a server and a client, and data transmission is performed therebetween with the use of a path established through the authentication; and a digital certificate management apparatus communicatable with the client and the server, and wherein: the digital certificate management apparatus includes a proof key updating unit which updates a proof key used for proving validity of the digital certificate used for the mutual authentication by the client and the server; the proof key updating unit includes: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for the client, and the new proof key, to the client; and a second transmitting unit transmitting a new server certificate which is the new digital certificate for the server, and the new proof key, to the server, and wherein: the second transmitting unit performs the operation of transmitting the new server certificate to the server after receiving from the client information indicating that the client has received the new proof key; and the first transmitting unit performs the operation of transmitting the new client certificate to the client after receiving information from the server indicating that the server has received the new proof key.

In this digital certificate management system, the first transmitting unit may preferably be configured to transmit the new proof key to the client at the same time of or in prior to transmission of the new client certificate; and the second transmitting unit may preferably be configured to transmit the new proof key to the server at the same time of or in prior to transmission of the new server certificate.

According to another aspect of the present invention, a digital certificate management system includes: a client and server system in which a digital certificate is used for mutual authentication so as to establish communication between a server and a client, and data transmission is performed therebetween with the use of a path established through the authentication; and a digital certificate management apparatus communicatable with the client and the server, and wherein: the digital certificate management apparatus includes a proof key updating unit which updates a proof key used for proving validity of the digital certificate used for the mutual authentication by the client and the server; the proof key updating unit includes: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for the client, and the new proof key, to the client; and a second transmitting unit transmitting a new server certificate which is the new digital certificate for the server, and the new proof key, to the server, and wherein: the first transmitting unit performs the operation of transmitting the new client certificate and the new proof key to the client at the same time; and the second transmitting unit performs the operation of transmitting the new server certificate and the new proof key to the server at the same time after receiving information from the client indicating that the client has received the new proof key.

In this digital certificate management system, the server may preferably have an intermediary function for communication between the digital certificate management apparatus and the client; the digital certificate management apparatus and the client may preferably perform data transmission mutually via the server; and the server may preferably transmit the new proof key and/or the new client certificate to the client, transmitted from the first transmitting unit of the digital certificate management apparatus for the client, via the communication established through authentication performed with the client with the use of an old digital certificate.

Alternatively, in the above-mentioned digital certificate management system, the client may preferably have an intermediary function for communication between the digital certificate management apparatus and the server; the digital certificate management apparatus and the server may preferably perform data transmission mutually together via the client; and the client may preferably transmit the new proof key and/or the new server certificate to the server, transmitted from the second transmitting unit of the digital certificate management apparatus for the server, via the communication established through authentication performed with the server with the use of an old digital certificate.

Furthermore, the authentication performed between the client and the server may preferably be authentication according to an SSL or TLS protocol; and the server certificate may preferably be a public key certificate for the server.

In the digital certificate management apparatus, it is preferable to provide, in the proof key updating unit, a unit configured to acquire the digital certificate which is a proof key certificate including the new proof key, and also, to configure the first transmitting unit to have a function of transmitting the new proof key to the client in a form of the proof key certificate, and requesting the client to store the proof key included therein.

Further, the proof key updating unit may preferably include: a unit configured to acquire a first proof key certificate, including the new proof key, which is the digital certificate for which validity can be proved with the use of an old proof key; and a unit configured to acquire a second proof key certificate, including the new proof key, which is the digital certificate for which validity can be proved with the use of the new proof key, and wherein: the first transmitting unit is configured to transmit the new proof keys in respective forms of the first proof key certificate and the second proof key certificate to the client; and the client includes a unit which, when storing the second proof key certificate, deletes the old proof key certificate and the first proof key certificate, and wherein: the first transmitting unit in the digital certificate management apparatus is configured to perform the operation of transmitting the second proof key certificate to the client at least after receiving information from the server indicating that the server has received the new server certificate.

According to another aspect of the present invention, a digital certificate management apparatus communicatable with a client and a server which configure a client and server system, includes: a proof key updating unit which updates a proof key used for proving validity of a digital certificate used for mutual authentication by which communication is established between the client and the server, and wherein: the proof key updating unit includes: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for the client, and the new proof key, to the client; and a second transmitting unit transmitting a new server certificate which is the new digital certificate for the server, and the new proof key, to the server, and wherein: the second transmitting unit performs the operation of transmitting the new server certificate to the server after receiving from the client information indicating that the client has received the new proof key; and the first transmitting unit performs the operation of transmitting the new client certificate to the client after receiving information from the server indicating that the server has received the new proof key.

According to another aspect the present invention, a digital certificate management apparatus communicatable with a client and a server which configure a client and server system, includes: a proof key updating unit which updates a proof key used for proving validity of a digital certificate used for mutual authentication by which communication is established between the client and the server, and wherein: the proof key updating unit includes: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for the client, and the new proof key, to the client; and a second transmitting unit transmitting a new server certificate which is the new digital certificate for the server, and the new proof key, to the server, and wherein: the first transmitting unit performs the operations of transmitting the new client certificate and the new proof key to the client at the same time; and the second transmitting unit performs the operations of transmitting the new server certificate and the new proof key to the server at the same time after receiving information from the client indicating that the client has received the new proof key.

This digital certificate management apparatus may perform data transmission with the client via the server; and the server may preferably transmit the new proof key and/or the new client certificate to the client, transmitted from the first transmitting unit of the digital certificate management apparatus for the client, via the communication established through authentication performed with the client with the use of an old digital certificate.

Alternatively, the above-mentioned digital certificate management apparatus may perform data transmission with the server via the client; and the client may preferably transmit the new proof key and/or the new server certificate to the server, transmitted from the second transmitting unit of the digital certificate management apparatus for the server, via the communication established through authentication performed with the server with the use of an old digital certificate.

Furthermore, in the digital certificate management apparatus, the authentication performed between the client and the server may preferably be authentication according to an SSL or TLS protocol; and the server certificate may preferably be a public key certificate for the server.

According to another aspect of the present invention, a digital certificate management system includes: a client and server system in which one or a plurality of clients and one or a plurality of servers are provided, authentication is performed between each client and each sever with the use of a digital certificate, and communication is performed therebetween with a path established through the authentication; and a digital certificate management apparatus communicatable with each client and each server, and wherein: the digital certificate management apparatus includes: a proof key updating unit updating a proof key used for proving validity of the digital certificate used for authentication by each server; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit includes: a unit configured to acquire a new proof key for updating; a unit configured to acquire a new digital certificate used for the authentication for which validity can be proved with the use of the new proof key; a first transmitting unit transmitting the new proof key to each client; and a second transmitting unit transmitting a new server certificate which is the new digital certificate for each server to the relevant server, and wherein: the updating order control unit controls the updating procedure so that the second transmitting unit performs the operation of transmitting the new server certificate to the respective server after receiving from all the clients, which act as communication counterparts of the server, information indicating that the clients have received the new proof keys.

In this digital certificate management system, the proof key updating unit in the digital certificate management apparatus may preferably include a unit configured to acquire a proof key certificate, including the new proof key, which is the digital certificate for which validity can be proved with the use of an old proof key, and wherein: the first transmitting unit may preferably be configured to transmit the new proof key in a form of the proof key certificate to the client; and each client may preferably include a unit configured to be responsive to the proof key certificate coming from the digital certificate management apparatus, for proving validity of the received proof key certificate with the use of the old proof key and storing the proof key included in the proof key certificate when determining that the proof key is an appropriate one.

Furthermore, in the digital certificate management system, the proof key updating unit may include: a unit configured to acquire a first proof key certificate, including the new proof key, which is the digital certificate for which validity can be proved with the use of an old proof key; and a unit configured to acquire a second proof key certificate, including the new proof key, which is the digital certificate for which validity can be proved with the use of the new proof key, and wherein: the first transmitting unit is configured to transmit the new proof keys in respective forms of the first proof key certificate and the second proof key certificate to each client; and each client includes: a unit configured to be responsive to the first proof key certificate coming from the digital certificate management apparatus, for proving validity of the received certificate with the use of the old proof key and storing the certificate when determining that it is an appropriate one; and a unit configured to be responsive to the second proof key certificate coming from the digital certificate management apparatus, for proving validity of the received certificate with the use of the new proof key included in the second proof key certificate, and storing the second proof key certificate when determining that it is an appropriate one, and then deleting the old proof key certificate and the first proof key certificate, and wherein: the updating order control unit in the digital certificate management apparatus is configured to perform control such that the operation of transmitting the second proof key certificate to each client from the first transmitting unit is performed at least after receiving information from all the servers which act as communication counterparts of the client indicating that the servers have received the new server certificates.

According to another aspect of the present invention, a digital certificate management system includes: a client and server system in which one or a plurality of clients and one or a plurality of servers are provided, mutual authentication is performed between each client and each sever with the use of a digital certificate, and data transmission is performed therebetween with a path established through the authentication; and a digital certificate management apparatus communicatable with each client and each server, and wherein: the digital certificate management apparatus includes: a proof key updating unit which updates a proof key used for proving validity of the digital certificate used for the mutual authentication by each client and each server; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit includes: a unit configured to acquire a new proof key for updating; a unit configured to acquire a new digital certificate, used for the mutual authentication, for which validity can be proved with the use of the new proof key; a first transmitting unit transmitting a new client certificate which is the new digital certificate for each client, and the new proof key, to the relevant client; and a second transmitting unit transmitting a new server certificate which is the new digital certificate for each server, and the new proof key, to the relevant server, and wherein: the updating order control unit controls the updating procedure so that the second transmitting unit performs the operation of transmitting the new server certificate to each server after receiving, from all the clients which act as communication counterparts of the relevant server, information indicating that the relevant clients have received the new proof keys, and the first transmitting unit performs the operation of transmitting the new client certificate to each client after receiving information, from all the servers which act as communication counterparts of the relevant client, indicating that the relevant servers have received the new proof keys.

According to another aspect of the present invention, a digital certificate management system includes: a client and server system in which one or a plurality of clients and one or a plurality of servers are provided, mutual authentication is performed between each client and each sever with the use of a digital certificate, and data transmission is performed therebetween with a path established through the authentication; and a digital certificate management apparatus communicatable with each client and each server, and wherein: the digital certificate management apparatus includes: a proof key updating unit which updates a proof key used for proving validity of the digital certificate used for the mutual authentication by each client and each server; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit includes: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for each client, and the new proof key, to the client; and a second transmitting unit transmitting a new server certificate which is the new digital certificate for each server, and the new proof key, to the server, and wherein: the updating order control unit controls the updating procedure so that the first transmitting unit performs the operations of transmitting the new client certificate and the new proof key to each client at the same time, and the second transmitting unit performs the operations of transmitting the new server certificate and the new proof key to each server at the same time after receiving information, from all the clients which act as communication counterparts of the relevant server, indicating that the clients have received the new proof key.

In any of the above-mentioned digital certificate management systems, each server may have an intermediary function for communication between the digital certificate management apparatus and at least one of the clients; the digital certificate management apparatus and each client may perform data transmission mutually via any of the servers; and the server may transmit the new proof key and/or the new client certificate to the client, transmitted from the first transmitting unit of the digital certificate management apparatus for the client, via the communication established through authentication performed with the client which is a transmission destination with the use of an old digital certificate.

Alternatively, in any of the above-mentioned digital certificate management systems, each client may have an intermediary function for communication between the digital certificate management apparatus and at least one of the servers; the digital certificate management apparatus and each server may perform data transmission mutually together via any of the clients; and the client may transmit the new proof key and/or the new server certificate to the server, transmitted from the second transmitting unit of the digital certificate management apparatus for the server, via the communication established through authentication performed with the server which is a transmission destination with the use of an old digital certificate.

Furthermore, in the digital certificate management system, the authentication performed between the client and the server may be authentication according to an SSL or TLS protocol; and the server certificate may be a public key certificate for the server.

A digital certificate management apparatus, according to the present invention, communicatable with one or a plurality of clients and one or a plurality of servers which configure a client and server system, includes: a proof key updating unit updating a proof key used for proving validity of the digital certificate used for authentication by the server, whereby communication is established between each client and each server; and a updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit includes: a unit configured to acquire a new proof key for updating; a unit configured to acquire a new digital certificate used for the authentication for which validity can be proved with the use of the new proof key; a first transmitting unit transmitting the new proof key to each client; and a second transmitting unit transmitting a new server certificate which is the new digital certificate for each server to the relevant server, and wherein: the updating order control unit controls the updating procedure so that second transmitting unit performs the operation of transmitting the new server certificate to the relevant server after receiving from all the clients, which act as communication counterparts of the server, information indicating that the clients have received the new proof keys.

In this digital certificate management apparatus, the proof key updating unit may preferably include a unit configured to acquire a proof key certificate, including the new proof key, which is the digital certificate for which validity can be proved with the use of an old proof key, and wherein: the first transmitting unit may preferably be configured to transmit the new proof key in a form of the proof key certificate to the client.

Furthermore, in the digital certificate management apparatus, the proof key updating unit may include: a unit configured to acquire a first proof key certificate, including the new proof key, which is the digital certificate for which validity can be proved with the use of an old proof key; and a unit configured to acquire a second proof key certificate, including the new proof key, which is the digital certificate for which validity can be proved with the use of the new proof key, and wherein: the first transmitting unit is configured to transmit the new proof keys in respective forms of the first proof key certificate and the second proof key certificate to each client; and each client includes: a unit, which when storing the second proof key certificate, deletes the old proof key certificate and the first proof key certificate, and wherein: the updating order control unit in the digital certificate management apparatus is configured to perform control such that the operation of transmitting the second proof key certificate to each client from the first transmitting unit is performed at least after receiving information from all the servers which act as communication counterparts of the client indicating that the servers have received the new server certificate.

According to another aspect of the present invention, a digital certificate management apparatus communicatable with one or a plurality of clients and one or a plurality of servers which configure a client and server system, includes: a proof key updating unit updating a proof key used for proving validity of the digital certificate used for mutual authentication, whereby communication is established between each client and each server; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit includes: a unit configured to acquire a new proof key for updating; a unit configured to acquire a new digital certificate, used for the mutual authentication, for which validity can be proved with the use of the new proof key; a first transmitting unit transmitting a new client certificate which is the new digital certificate for each client, and the new proof key, to the relevant client; and a second transmitting unit transmitting a new server certificate which is the new digital certificate for each server, and the new proof key, to the relevant server, and wherein: the updating order control unit controls the updating procedure so that the second transmitting unit performs the operation of transmitting the new server certificate to each server after receiving, from all the clients which act as communication counterparts of the relevant server, information indicating that the relevant clients have received the new proof keys, and the first transmitting unit performs the operation of transmitting the new client certificate to each client after receiving information, from all the servers which act as communication counterparts of the relevant client, indicating that the relevant servers have received the new proof keys.

According to another aspect of the present invention, a digital certificate management apparatus communicatable with one or a plurality of clients and one or a plurality of servers which configure a client and server system, includes: a proof key updating unit updating a proof key used for proving validity of the digital certificate used for mutual authentication, whereby communication is established between each client and each server; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit includes: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for each client, and the new proof key, to the client; and a second transmitting unit transmitting a new server certificate which is the new digital certificate for each server, and the new proof key, to the server, and wherein: the updating order control unit controls the updating procedure so that the first transmitting unit performs the operations of transmitting the new client certificate and the new proof key to each client at the same time, and the second transmitting unit performs the operations of transmitting the new server certificate and the new proof key to each server at the same time after receiving information, from all the clients which act as communication counterparts of the relevant server, indicating that the clients have received the new proof keys.

Any of the above-mentioned digital certificate management apparatuses may perform data transmission with each client via any of the servers; and the server may transmit the new proof key and/or the new client certificate to the client, transmitted from the first transmitting unit of the digital certificate management apparatus for the client, via the communication established through authentication performed with the client which is a transmission destination with the use of an old digital certificate.

Alternatively, any of the above-mentioned digital certificate management systems may perform data transmission with each server via any of the clients; and the client may transmit the new proof key and/or the new server certificate to the server, transmitted from the second transmitting unit of the digital certificate management apparatus for the server, via the communication established through authentication performed with the server which is a transmission destination with the use of an old digital certificate.

Furthermore, in the digital certificate management apparatus, the authentication performed between the client and the server may be authentication according to an SSL or TLS protocol; and the server certificate may be a public key certificate for the server.

According to the present invention, in a digital certificate management method for managing by a digital certificate management apparatus communicatable with a server and a client which configure a client and server system, a digital certificate used for authentication whereby communication is established between the server and the client, the following steps are performed: a) the digital certificate management apparatus updating a proof key used for proving validity of the digital certificate used for authentication by the server, and wherein the step d) includes the steps of: a-1) acquiring a new proof key for updating; and a-2) acquiring a new digital certificate used for the authentication for which validity can be proved with the use of the new proof key; b-1) transmitting the new proof key to the client; and b-2) transmitting a new server certificate which is a new digital certificate for the server to the server after receiving, from the client, information indicating that the client has received the new proof key.

In the digital certificate management method, the step a) may further include the step of: a-3) acquiring a proof key certificate, which is the digital certificate, including the new proof key, for which validity can be proved with the use of an old proof key; the step b-1) includes the step of: b-3) transmitting the new proof key in a form of the proof key certificate to the client; and when transmitting the proof key certificate to the client, the client is caused to prove validity of the received proof key certificate with the use of the old proof key and store the proof key included in the proof key certificate when determining that the proof key is an appropriate one.

Furthermore, in the digital certificate management method, the step a) may further include the steps of: a-4) acquiring a first proof key certificate, including the new proof key, which is the digital certificate for which validity can be proved with the use of an old proof key; and a-5) acquiring a second proof key certificate, including the new proof key, which is the digital certificate for which validity can be proved with the use of the new proof key, and wherein: the step b-1) includes the step of transmitting the new proof keys in respective forms of the first proof key certificate and the second proof key certificate to the client; after the completion of the step b-2), the second proof key certificate is transmitted to the client at least after information indicating that the server has received the new server certificate is received; when the first proof key certificate is transmitted to the client, the client is caused to prove validity of the received certificate with the use of the old proof key and store the certificate when determining that it is an appropriate one; and when the second proof key certificate is transmitted to the client, the client is caused to prove validity of the received certificate with the use of the new proof key included in the first proof key certificate, and store the second proof key certificate when determining that it is an appropriate one, and then delete the old proof key certificate and the first proof key certificate.

According to another aspect of the present invention, a digital certificate management method for managing by a digital certificate management apparatus communicatable with a server and a client which configure a client and server system, a digital certificate used for mutual authentication whereby communication is established between the server and the client, includes the steps of: a) the digital certificate management apparatus updating a proof key used for proving validity of the digital certificate used for the mutual authentication by the client and the server, and wherein: the step a) includes the steps of; a-1) acquiring a new proof key for updating; and a-2) acquiring a new digital certificate used for the mutual authentication for which validity can be proved with the use of the new proof key; b-1) transmitting the new proof key to the server; b-2) transmitting the new proof key to the client; b-3) transmitting a new client certificate which is the new digital certificate for the client to the client; and b-4) transmitting a new server certificate which is the new digital certificate for the server to the server; and wherein: the step b-4) is performed after the completion of the step b-2), and after information indicating that the client has received the new proof key from the client, and also, the step b-3) is performed after the completion of the step b-1), and after information indicating that the server has received the new proof key from the server.

In the digital certificate management method, the step b-3) may be performed at the same time or after the completion of the step b-2), and also, the step b-4) may be performed at the same time or after the completion of the step b-1).

According to another aspect of the present invention, a digital certificate management method for managing by a digital certificate management apparatus communicatable with a server and a client which configure a client and server system, a digital certificate used for mutual authentication whereby communication is established between the server and the client, includes the steps of: a) the digital certificate management apparatus updating a proof key used for proving validity of the digital certificate used for the mutual authentication by the client and the server, and wherein: the step a) includes the steps of; a-1) acquiring a new proof key for updating; a-2) acquiring a new digital certificate used for the mutual authentication for which validity can be proved with the use of the new proof key; b-1) transmitting the new proof key to the server; b-2) transmitting the new proof key to the client; b-3) transmitting a new client certificate which is the new digital certificate for the client to the client; and b-3) transmitting a new server certificate which is the new digital certificate for the server to the server, and wherein: the steps b-2) and b-3) are performed at the same time, and also, after the completion of these steps, and, after information indicating that the client has received the new proof key is received, the steps b-1) and b-4) are performed at the same time.

In any of the above-mentioned digital certificate management methods, the digital certificate management apparatus and the client may perform data transmission mutually via the server; and the server may transmit the new proof key and/or the new client certificate to the client, transmitted in the step b-2 and/or the step b-3 for the client, via the communication established through authentication performed with the client with the use of an old digital certificate.

Alternatively, in any of the digital certificate management methods, the digital certificate management apparatus and the server may perform data transmission mutually via the client; and the client may transmit the new proof key and/or the new server certificate to the server, transmitted in the step b-1) and/or the step b-4) for the server, via the communication established through authentication performed with the server with the use of an old digital certificate.

Furthermore, in any of the digital certificate management methods, the authentication performed between the client and the server may be authentication according to an SSL or TLS protocol; and the server certificate may be a public key certificate for the server.

According to the present invention, a digital certificate management method for managing, by a digital certificate management apparatus communicatable with one or a plurality of servers and one or a plurality of clients which configure a client and server system, a digital certificate used for mutual authentication whereby communication is established between the one or the plurality of servers and the one or the plurality of clients, includes the steps of: a) the digital certificate management apparatus updating a proof key used for proving validity of the digital certificate used for the mutual authentication by each server, based on an updating procedure determined according to information concerning the respective nodes included in the client and server system as to a communication counterpart of each node and as to whether each of the node and the counterpart acts as a client or a server, and wherein: the step a) includes the steps of: a-1) acquiring a new proof key for updating; a-2) acquiring a new digital certificate used for the authentication for which validity can be proved with the use of the new proof key; a-3) transmitting the new proof key to each client; and a-4) transmitting a new server certificate which is the new digital certificate for each server to the server, and wherein: the updating procedure is configured so the step a-4) is performed after information indicating that the clients have received the new proof key is received from all the clients, which act as communication counterparts of the relevant server.

In the digital certificate management method, the step a) may further includes the steps of: a-5) acquiring a proof key certificate, including the new proof key, which is the digital certificate for which validity can be proved with the use of an old proof key, and wherein: the step a-3) includes the step of transmitting the new proof key in a form of the proof key certificate to the client; and when the proof key certificate is transmitted to the client, the client is caused to prove validity of the received proof key certificate with the use of the old proof key and store the proof key included in the proof key certificate when determining that the proof key is an appropriate one.

Furthermore, in the digital certificate management method, the step a) may further include the step of: a-6) acquiring a first proof key certificate, including the new proof key, which is the digital certificate for which validity can be proved with the use of an old proof key; and a-7) acquiring a second proof key certificate, including the new proof key, which is the digital certificate for which validity can be proved with the use of the new proof key, and wherein: the step a-3) may include the step of transmitting the new proof keys in respective forms of the first proof key certificate and the second proof key certificate to each client; the step a) may be configured so that the operation of transmitting the second proof key certificate to each client from the first transmitting unit is performed at least after receiving information from all the servers which act as communication counterparts of the client indicating that the servers have received the new server certificates; each client may be caused to be responsive to reception of the first proof key certificate from the digital certificate management apparatus, for proving validity of the received certificate with the use of the old proof key and storing the certificate when determining that it is an appropriate one; and the client may be caused to be responsive to reception of the second proof key certificate from the digital certificate management apparatus for proving validity of the received certificate with the use of the new proof key included in the second proof key certificate and storing the second proof key certificate when determining that it is an appropriate one, and then to delete the old proof key certificate and the first proof key certificate.

According to another aspect of the present invention, a digital certificate management method for managing, by a digital certificate management apparatus communicatable with one or a plurality of servers and one or a plurality of clients which configure a client and server system, a digital certificate used for mutual authentication whereby communication is established between the one or the plurality of servers and the one or the plurality of clients, includes the steps of: a) the digital certificate management apparatus updating a proof key used for proving validity of the digital certificate used for the mutual authentication by each client and each server based on an updating procedure determined according to information concerning the respective nodes included in the client and server system as to a communication counterpart of each node and as to whether each of the node and the counterpart acts as a client or a server, and wherein: the step a) includes: a-1) acquiring a new proof key for updating; a-2) acquitting a new digital certificate, used for the mutual authentication, for which validity can be proved with the use of the new proof key; a-3) transmitting a new client certificate which is the new digital certificate for each client, and the new proof key, to the relevant client; and a-4) transmitting a new server certificate which is the new digital certificate for each server, and the new proof key, to the relevant server, and wherein: the updating procedure is configured so that the step a-4) is performed after information indicating that the relevant clients have received the new proof key is received from all the clients which act as communication counterparts of the relevant server, and the step a-3) is performed after information indicating that the relevant servers have received the new proof key is received from all the servers which act as communication counterparts of the relevant client.

According to another aspect of the present invention, a digital certificate management method for managing, by a digital certificate management apparatus communicatable with one or a plurality of servers and one or a plurality of clients which configure a client and server system, a digital certificate used for mutual authentication whereby communication is established between the one or the plurality of servers and the one or the plurality of clients, includes the steps of: a) the digital certificate management apparatus updating a proof key used for proving validity of the digital certificate used for the mutual authentication by each client and each server based on an updating procedure determined according to information concerning the respective nodes included in the client and server system as to a communication counterpart of each node and as to whether each of the node and the counterpart acts as a client or a server, and wherein: the step a) includes the steps of: a-1) acquiring a new proof key for updating; a-2) acquiring a new digital certificate used for the mutual authentication for which validity can be proved with the use of the new proof key; a-3) transmitting a new client certificate which is the new digital certificate for each client, and the new proof key, to the client; and a-4) transmitting a new server certificate which is the new digital certificate for each server, and the new proof key, to the server, and wherein: the updating procedure is configured so that operations of transmitting the new client certificate and the new proof key to each client are performed at the same time, and operations of transmitting the new server certificate and the new proof key to each server are performed at the same time after information indicating that the clients have received the new proof key is received from all the clients which act as communication counterparts of the relevant server.

In any of the above-mentioned digital certificate management methods, the digital certificate management apparatus and each client may perform data transmission mutually via any of the servers; and the server may transmit the new proof key and/or the new client certificate to the client, transmitted from the digital certificate management apparatus for the client in the step a-3), via the communication established through authentication performed with the client which is a transmission destination with the use of an old digital certificate.

Alternatively, in any of the above-mentioned digital certificate management method, the digital certificate management apparatus and each server may perform data transmission mutually via any of the clients; and the client may transmit the new proof key and/or the new server certificate to the server, transmitted from the digital certificate management apparatus for the server in the step a-4), via the communication established through authentication performed with the server which is a transmission destination with the use of an old digital certificate.

Furthermore, in any of the digital certificate management methods, the authentication performed between the client and the server may be authentication according to an SSL or TLS protocol; and the server certificate may be a public key certificate for the server.

According to the present invention, an updating procedure determining method for determining an updating procedure to be stored in one or a plurality of clients and one or a plurality of servers which configure a client and server system, for updating by a digital certificate management apparatus a proof key used for proving validity of a digital certificate used by each server when communication is established between the one or the plurality of clients and the one or the plurality of servers, includes the step of: the digital certificate management apparatus determining the updating procedure based on information based on information concerning the respective nodes included in the client and server system as to a communication counterpart of each node and as to whether each of the node and the counterpart acts as a client or a server so that a step of transmitting a new server certificate which is a new digital certificate for which validity can be proved with the use of a new proof key for updating used for the authentication by the server is performed after information indicating that all the clients which act as communication counterparts of the server is received from the clients.

According to the present invention, a program for causing a computer, which controls a digital certificate management apparatus communicatable with a client and a server which configure a client and server system, to perform a proof key updating step of updating a proof key used for proving validity of a digital certificate used by the server for authentication performed when communication is established between the client and the server, is configured to cause the computer to function as: a unit configured to acquire a new proof key for updating; a unit configured to acquire a new digital certificate used for the authentication for which validity can be proved with the use of the new proof key; a first transmitting unit transmitting the new proof key to the client; and a second transmitting unit transmitting a new server certificate which is a new digital certificate for the server to the server, and wherein: the second transmitting unit performs the operation of transmitting the new server certificate to the server after receiving from the client information indicating that the client has received the new proof key.

In this program, another program may be preferably included causing the computer to function as a unit to acquire a proof key certificate, including the new proof key, which is the digital certificate for which validity can be proved with the use of an old proof key, and wherein: the first transmitting unit may preferably be configured to transmit the new proof key in a form of the proof key certificate to the client.

Furthermore, it is preferable to further provide a program further causing the computer to function as a unit configured to acquire a first proof key certificate, including the new proof key, which is the digital certificate for which validity can be proved with the use of an old proof key; and a unit configured to acquire a second proof key certificate, including the new proof key, which is the digital certificate for which validity can be proved with the use of the new proof key, and wherein: the first transmitting unit is configured to transmit the new proof keys in respective forms of the first proof key certificate and the second proof key certificate to the client; and the client is made to function as: a unit, which when storing the second proof key certificate, delete the old proof key certificate and the first proof key certificate, and wherein: the updating order control unit is configured to perform control such that the operation of transmitting the second proof key certificate to the client from the first transmitting unit is performed at least after receiving information from the server indicating that the server has received the new server certificate.

According to another aspect of the present invention, a program for causing a computer, which controls a digital certificate management apparatus communicatable with a client and a server which configure a client and server system, to perform a proof key updating step of updating a proof key used for proving validity of a digital certificate used by the server for authentication performed when communication is established between the client and the server, is configured to cause the computer to function as: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for the client, and the new proof key, to the client; and a second transmitting unit transmitting a new server certificate which is the new digital certificate for the server, and the new proof key, to the server, and wherein: the second transmitting unit performs the operation of transmitting the new server certificate to the server after receiving from the client information indicating that the client has received the new proof key; and the first transmitting unit performs the operation of transmitting the new client certificate to the client after receiving information from the server indicating that the server has received the new proof key.

According to another aspect of the present invention, a program for causing a computer, which controls a digital certificate management apparatus communicatable with a client and a server which configure a client and server system, to perform a proof key updating step of updating a proof key used for proving validity of a digital certificate for mutual authentication performed when communication is established between the client and the server, is configured to cause the computer to function as: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for the client, and the new proof key, to the client; and a second transmitting unit transmitting a new server certificate which is the new digital certificate for the server, and the new proof key, to the server, and wherein: the first transmitting unit has a function of performing the operations of transmitting the new client certificate and the new proof key to the client at the same time; and the second transmitting unit has a function of performing the operations of transmitting the new server certificate and the new proof key to the server at the same time after receiving information from the client indicating that the client has received the new proof key.

In any of these programs, it is preferable to provide anther program to further cause the computer to function as a unit to perform data transmission with the client via the server; and the server may preferably transmit the new proof key and/or the new client certificate to the client, transmitted from the digital certificate management apparatus for the client, via the communication established through authentication performed with the client with the use of an old digital certificate.

Alternatively, in any of these programs, it is preferable to provide another program to further cause the computer to function as a unit to perform data transmission with the server via the client; and the client may preferably transmit the new proof key and/or the new server certificate to the server, transmitted from the digital certificate management apparatus for the server, via the communication established through authentication performed with the server with the use of an old digital certificate.

Furthermore, in any of the above-mentioned programs, the authentication performed between the client and the server may preferably be authentication according to an SSL or TLS protocol; and the server certificate may preferably be a public key certificate for the server.

According to another aspect of the present invention, a program is configured to cause a computer, which controls a digital certificate management apparatus communicatable with one of a plurality of clients and one or a plurality of servers which configure a client and server system, to function as: a proof key updating unit updating a proof key used for proving validity of the digital certificate used for authentication by each server for establishing communication between each server and each client; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit includes: a unit configured to acquire a new proof key for updating; a unit configured to acquire a new digital certificate used for the authentication for which validity can be proved with the use of the new proof key; a first transmitting unit transmitting the new proof key to each client; and a second transmitting unit transmitting a new server certificate which is a new digital certificate for each server to the relevant server, and wherein: the updating order control unit controls the updating procedure so that the second transmitting unit performs the operation of transmitting the new server certificate to the respective server after receiving from all the clients, which act as communication counterparts of the server, information indicating that the clients have received the new proof key.

In this program, another program may be preferably included causing the computer to further function as a unit to acquire a proof key certificate, including the new proof key, which is a digital certificate for which validity can be proved with the use of an old proof key, and wherein: the first transmitting unit may preferably be configured to transmit the new proof key in a form of the proof key certificate to each client.

Furthermore, it is preferable to further provide a program further causing the computer to further function as a unit configured to acquire a first proof key certificate, including the new proof key, which is a digital certificate for which validity can be proved with the use of an old proof key; and a unit configured to acquire a second proof key certificate, including the new proof key, which is a digital certificate for which validity can be proved with the use of the new proof key, and wherein: the first transmitting unit is configured to transmit the new proof keys in respective forms of the first proof key certificate and the second proof key certificate to each client; and each client is caused to function as: a unit, which when storing the second proof key certificate, delete the old proof key certificate and the first proof key certificate, and wherein: the updating order control unit in the digital certificate management apparatus is configured to perform control such that the operation of transmitting the second proof key certificate to each client from the first transmitting unit is performed at least after receiving information from all the servers which act as communication counterparts of the client indicating that the servers have received the new server certificates.

According to another aspect of the present invention, a program is configured to cause a computer, which controls a digital certificate management apparatus communicatable with one of a plurality of clients and one or a plurality of servers which configure a client and server system, to function as: a proof key updating unit updating a proof key used for proving validity of the digital certificate used for mutual authentication for establishing communication between each server and each client; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit has functions of: a unit configured to acquire a new proof key for updating; a unit configured to acquire a new digital certificate, used for the mutual authentication, for which validity can be proved with the use of the new proof key; a first transmitting unit transmitting a new client certificate which is the new digital certificate for each client, and the new proof key, to the relevant client; and a second transmitting unit transmitting a new server certificate which is the new digital certificate for each server, and the new proof key, to the relevant server, and wherein: the updating order control unit is configured to control the updating procedure so that the second transmitting unit performs the operation of transmitting the new server certificate to each server after receiving, from all the clients which act as communication counterparts of the relevant server, information indicating that the relevant clients have received the new proof keys, and the first transmitting unit performs the operation of transmitting the new client certificate to each client after receiving information, from all the servers which act as communication counterparts of the relevant client, indicating that the relevant servers have received the new proof keys.

According to another aspect of the present invention, a program is configured to cause a computer, which controls a digital certificate management apparatus communicatable with one of a plurality of clients and one or a plurality of servers which configure a client and server system, to function as: a proof key updating unit updating a proof key used for proving validity of the digital certificate used for mutual authentication for establishing communication between each server and each client; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein: the proof key updating unit has functions of: a unit configured to acquire a new proof key for updating; a unit configured to acquire a new digital certificate used for the mutual authentication for which validity can be proved with the use of the new proof key; a first transmitting unit transmitting a new client certificate which is the new digital certificate for each client, and the new proof key, to the client; and a second transmitting unit transmitting a new server certificate which is the new digital certificate for each server, and the new proof key, to the server, and wherein: the updating order control unit is configured to control the updating procedure so that the first transmitting unit performs the operations of transmitting the new client certificate and the new proof key to each client at the same time, and the second transmitting unit performs the operations of transmitting the new server certificate and the new proof key to each server at the same time after receiving information, from all the clients which act as communication counterparts of the relevant server, indicating that the clients have received the new proof keys.

In any of these programs, it is preferable to provide another program to further cause the computer to function as a unit to perform data transmission with each client via the server; and the server may preferably transmit the new proof key and/or the new client certificate to the client, transmitted from the first transmitting unit of the digital certificate management apparatus for the client, via the communication established through authentication performed with the client with the use of an old digital certificate.

Alternatively, in any of these programs, it is preferable to provide a program to cause the computer to function as a unit to perform data transmission with the server via each client; and the client may preferably transmit the new proof key and/or the new server certificate to the server, transmitted from the second transmitting unit of the digital certificate management apparatus for the server, via the communication established through authentication performed with the server with the use of an old digital certificate.

Furthermore, in any of the above-mentioned programs, the authentication performed between the client and the server may preferably be authentication according to an SSL or TLS protocol; and the server certificate may preferably be a public key certificate for the server.

According to the digital certificate management system, the digital certificate management apparatus, and the digital certificate management method in the present invention described above, it becomes possible to safely update the authentication public key used for proving validity of the digital certificate in authentication processing in the client and server system, without providing a special communication path for the updating processing.

According to the updating order determining method in the present invention, it is possible to determine an appropriate procedure in processing to update the proof key, and thus, the same advantage can be obtained by performing the updating processing according to the thus-obtained procedure.

Further, according to the program in the present invention, it is possible to cause a computer to control the digital certificate management apparatus, so that the above-mentioned features of the digital certificate management apparatus are achieved, and thus the same advantage can be obtained.

BRIEF DESCRIPTION OF THE DRAWINGS

Other objects and further features of the present invention will become more apparent from the following detailed description when read in conjunction with the following accompanying drawings:

FIGS. 33A, 33B and 33C show examples of information stored for a server apparatus and a client apparatus shown in FIG. 31, when information is stored in the format shown in FIG. 32;

FIG. 34 illustrates points of change performed when the processing according to the first embodiment is applied to the fifth embodiment;

FIGS. 40A, 40B and 40C show examples of information stored for a client apparatus 40 and a server apparatus 30-1 shown in FIG. 39, when information is stored in the format shown in FIG. 32;

DESCRIPTION OF THE PREFERRED EMBODIMENTS

Figure 1:
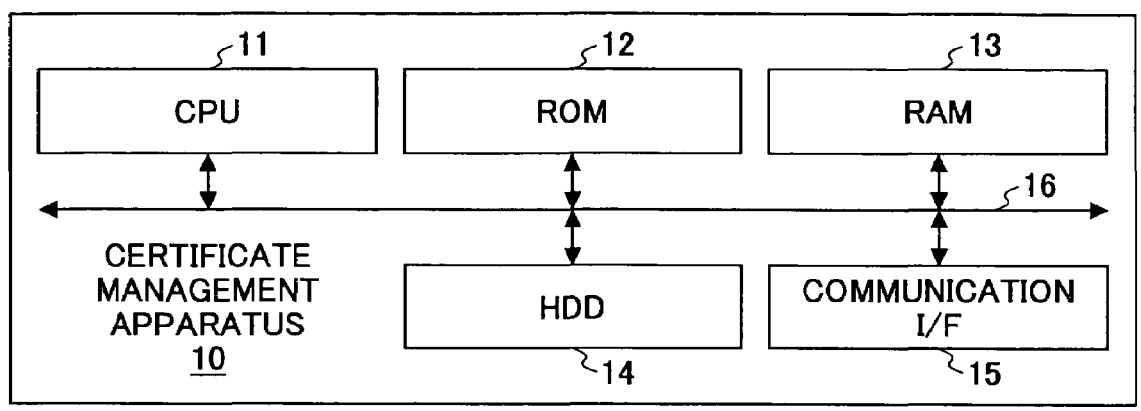
FIG. 1 shows a block diagram illustrating a hardware configuration of a certificate management apparatus in embodiments of a digital certificate management apparatus according to the present invention.

A first embodiment of the present invention will now be described with reference to FIGS. 1 through 13. A digital certificate management system in the first embodiment of the present invention includes a certificate management apparatus (digital certificate management apparatus), and a client apparatus and a server apparatus which configure a client and server system. In this embodiment, the client apparatus and the server apparatus form the client and server system. FIG. 2 shows a block diagram illustrating the respective apparatuses included in the digital certificate management system. In FIG. 2, indication of parts/components which have no particular relevance to features of the first embodiment of the present invention are omitted.

As shown in FIG. 2, the digital certificate management system includes a certificate management apparatus 10, a server apparatus 30 and a client apparatus 40.

The client apparatus (client) 40 and the server apparatus (server) 30 establish communication therebetween after they authenticate one another through authentication processing with the use of SSL which is an authentication manner employing a public key encoding scheme and a digital certificate. This authentication processing may be either a mutual authentication in which both authenticate one another or a single directional authentication in which one authenticates the other, as will be described later. As the server apparatus 30 responds to a request transmitted from the client apparatus 40 after performing predetermined processing, they function as the client and server system. The certificate management apparatus 10 issues the digital certificate used for the authentication, also, performs management, updating and so forth for the digital certificate, and thus acts as a CA such as that mentioned above.

In the actual system, there may be a case where the server apparatus 30 also as a function of a client, or the client apparatus 40 also as a function of a server. Then there may be a case where the client apparatus functioning as a server transmits a request to the server apparatus functioning as a client. However, in such a case, operation should be performed as in a second embodiment described later. Therefore, in the description of the first embodiment, the apparatus acting as a server is referred to as the server apparatus while the apparatus acting as a client is referred to as the client apparatus.

In this digital certificate management system, respective nodes, i.e., the certificate management apparatus 10, the server apparatus 30 and the client apparatus 40 can transmit 'request' which is a request for processing for a method of an application program which is mounted in both, and then, can obtain 'response' which is a result of the processing thus requested, through an RPC (remote procedure call).

In other words, the server apparatus 30 or the client apparatus 40 generates a request to the certificate management apparatus 10, transfers the same to the certificate management apparatus 10, and after that, obtains a response to the request. On the other hand, the certificate management apparatus 10 generates a request for the client and server system, transfer the same to the server apparatus 30, and obtains a response to the request. This request includes a request to cause the server apparatus 30 to transmit respective requests to the client apparatus 40, and then, to obtain responses to the requests from the client apparatus 40 via the server apparatus 30.

In order to achieve the RPC, well-known protocols, arts, or specification such as a SOAP (simple object access protocol), an HTTP (hyper text transfer protocol), an FTP (file transfer protocol), a COM (component object model), a CORBA (common object request broker architecture) or such may be utilized.

Figure 3A:
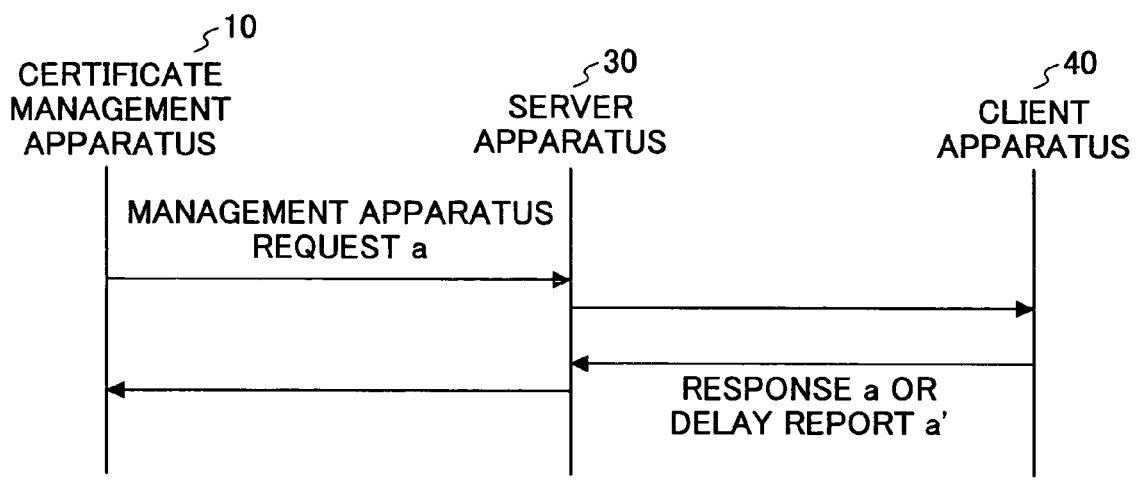
FIGS. 3A and 3B illustrate concept of a data transmission model in the digital certificate management system shown in FIG. 2.
Figure 3B:
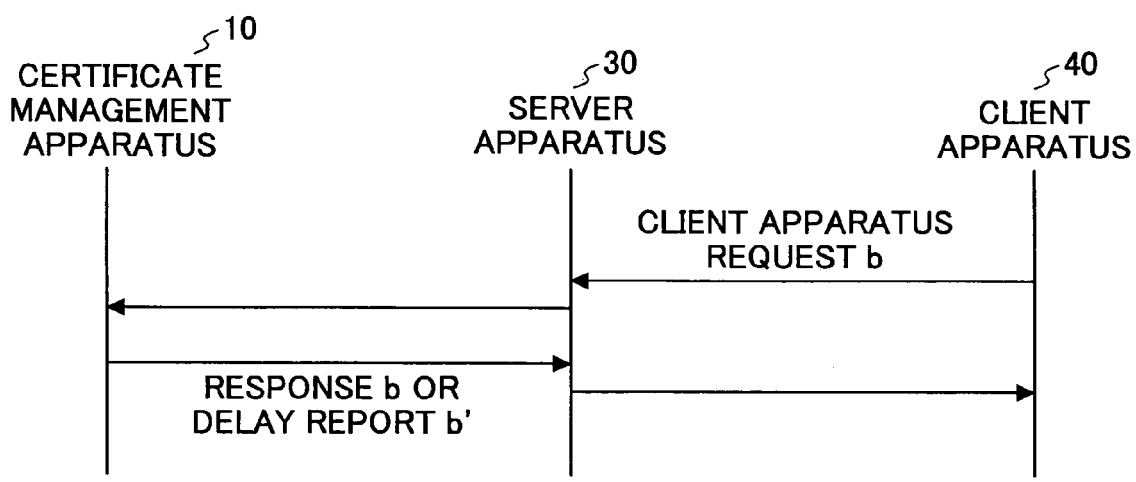

FIGS. 3A and 3B illustrate a data transmission/reception model in this case.

FIG. 3A shows a case where a request for the client apparatus 40 occurs in the certificate management apparatus 10. In this case, the certificate management apparatus 10 generates a management apparatus request 'a', and the client apparatus 40 which receives it via the server apparatus 30 returns a response 'a' to this request. In this case, not only the response a but also a response delay report a' are returned. This is because, in case where the client apparatus 40 having received the management apparatus request a determines that it cannot respond thereto immediately, it transmits the response delay report, once disconnects the connection, and then, returns a response to the above-mentioned request at a time of subsequent connection.

There, since the server apparatus 30 itself cannot initially make a request for communication to the client apparatus 40, a request which the server apparatus 30 should transmit to the client apparatus 40 should be transmitted as a response to a connection request previously made by the client apparatus 40 to the server apparatus 30.

FIG. 3B shows a case where a request for the certificate management apparatus 10 occurs in the client apparatus 40. In this case, the client apparatus 40 generates a client apparatus request b, and the certificate management apparatus 10 which has received it via the server apparatus 30 returns a response b to the request, to the client 40. Also in this case, in case where a response cannot be returned immediately, a response delay report b' is returned first.

A configuration and functions of each apparatus included in the digital certificate management system are described next.

Figure 2:
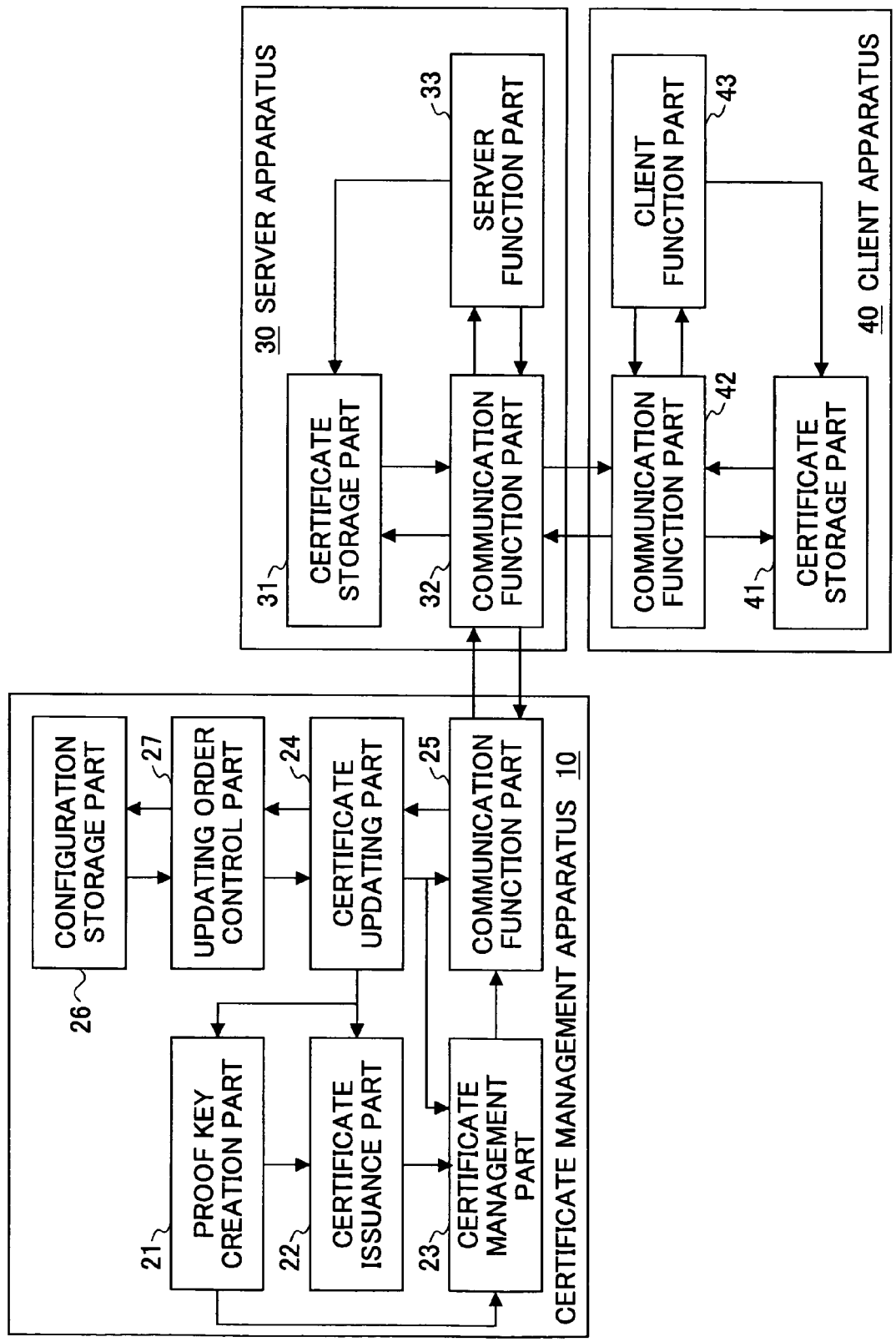
FIG. 2 shows a functional block diagram illustrating respective apparatuses in a first embodiment of a digital certificate management system according to the present invention.

FIG. 1 shows a block diagram illustrating a hardware configuration of the certificate management apparatus shown in FIG. 2. As shown, the certificate management apparatus 10 includes a CPU 11, a ROM 12, a RAM 13, an HDD 14 and a communication interface (I/F) 15, and these are connected together via a system bus 16. There, the CPU 11 executes various control programs stored in the ROM 12 or the HDD 14, controls operations of the certificate management apparatus 10, and thus, causes the certificate management apparatus 10 to act as respective parts such as a proof key updating unit, a configuration storage unit, an updating order control unit, a first transmitting unit, a second transmitting unit, and so forth.

As a hardware of the certificate management apparatus 10, a well-known computer may be employed. In this case, various other necessary hardware may be added thereto appropriately.

The client apparatus and the server apparatus which form the client and server system may have various configurations depending on the general purpose thereof, such as those for remote management of various devices, electronic commerce or so. For example, in case of remote management, the server apparatus acts as not only an image processing apparatus such as a printer, a facsimile machine, a copier, a scanner, a digital composite machine, or such, but also another electronic apparatus such as a network home electric appliance, an automatic dispenser, a medical apparatus, a power source apparatus, an air conditioner, a measurement system for gas, water and electricity, or such, which acts as an apparatus to be managed, and the client apparatus acts as a management apparatus which collects information from the apparatus to be managed, and then transmits a command thereto and operates it.

Each of the client apparatus and the server apparatus should include at least a CPU, a ROM, a RAM, a communication I/F needed for performing data transmission with external apparatuses via a communication network, and also, a storage device for storing information needed for performing the authentication processing. Then, as the CPU executes a control program stored in the ROM or such, the apparatus is made to function as the client or the server in the client and server system.

The above-mentioned communication may employ any medium such as a wired or wireless communication system, various communication circuits (communication paths) needed for establishing the communication network. The same medium may also be applied for communication with the certificate management apparatus 10.

FIG. 2 illustrates functional configurations of the respective apparatuses in the first embodiment.

First, the certificate management apparatus 10 includes a proof key creation part 21, a certificate issuance part 22, a certificate management part 23, a certificate updating part 24, a communication function part 25, a configuration storage part 26 and an updating order control part 27.

The proof key creation part 21 has a function of creating a root private key which is a proof private key used for producing a digital certificate, and a root key which is a proof public key (proof key) corresponding to the root private key for proving validity of a digital certificate.

The certificate issuance part 22 has a function of attaching a digital signature to a client public key and a server public key which are information used for the authentication processing between the server apparatus 30 and the client apparatus 40 and thus issuing a client public key certificate and a server public key certificate, respectively, which are the digital certificates. Also, the certificate issuance part 22 has functions of producing the client key certificate, the client private key, the server public key and the server private key, and producing a root key certificate which is the digital certificate in which a digital signature is attached to the root key.

The certificate management part 23 has a function of managing the digital certificates issued by the certificate issuance part 22, the root private key used for producing them, and the root key corresponding to the root private key. The certificate management part 23 stores these certificates and keys together with information such as validity dates, issuance destinations, IDs, necessity of updating thereof and so forth.

The certificate updating part 24 has a function of, upon updating the root key, causing the proof key creation part 21 to create a new root private key and a corresponding new root key for each of valid root private keys, and updating them. Further, the certificate updating part 24 has functions of, upon updating, causing the certificate issuance part 22 to issue a new client public key certificate, a new server public key certificate and a new root key certificate with digital signatures attached thereto with the use of the new root private key, respectively, causing the communication function part 25 to transmit them to the server apparatus 30 and the client apparatus 40, and then, causing the server apparatus 30 and the client apparatus 40 to update them. Furthermore, a procedure of respective processing needed for updating and management of progress thereof are performed by the updating control part 27, as will be described later.

The communication function part 25 has a function of performing data transmission with external apparatuses via the network, thus transmitting necessary information to the server apparatus 30 and to the client apparatus 40 according to instructions given by the certificate management part 23, or transferring received data to the certificate updating part 24.

The configuration storage part 26 has a function of storing, for the respective nodes (i.e., the server apparatus 30 and the client apparatus 40, in this case) included in the client and server system for which the certificate management apparatus 10 performs management of digital certificates, information of communication counterparts of the respective nodes, and information as to whether each of the respective nodes act as a client or a server with the communication counterpart thereof. Furthermore, the configuration storage part 26 also stores the private keys and the public key certificates used for mutual authentication by the respective nodes, IDs of the root key certificates, or information indicating updating states for the keys or the certificates, as the necessity arises.

The updating order control part 27 has a function of, when necessity of updating occurs for the root key, determining a procedure of updating the keys or the certificates performed by the certificate updating part 24 based on information stored by the configuration storage part 26, causing the certificate updating part 24 to perform the updating operation, and also, to control it.

The functions of the respective parts are achieved as a result of required control programs being executed by the CPU 11 shown in FIG. 1, and thereby, the CPU 11 controlling the operations of the respective parts of the certificate management apparatus 10.

The server apparatus 30 has a certificate storage part 31, a communication function part 32 and a server function part 33.

The certificate storage part 31 has a function of storing a key used for authentication processing according to SSL, and, for example, when mutual authentication is performed, it stores the root key certificate, the server private key and the server public key certificate.

The communication function part 32 has a function of performing data transmission with external apparatuses via the network, and thus, it transfers received data to the server function part 33, or transmits data to an external apparatus according to instructions of the server function part 33.

The server function part 33 performs predetermined processing in response to a request received from the client apparatus 40, and returns a response to the client apparatus 40. Further, as will be described later, the server function part 33 performs predetermined processing in response to a request such as that for certificate updating received from the certificate management apparatus 10 and returns a response thereto.

The functions of the respective parts are achieved as a result of the CPU of the server apparatus 30 executing a required control program, and controlling operations of the respective parts.

The client apparatus 40 includes a certificate storage part 41, a communication function part 42, and a client function part 42.

The certificate storage part 41 has a function of storing a key used for performing authentication processing according to SSL, and, for example, it stores the root key certificate, the client private key and the client public key certificate when mutual authentication is performed.

The connection function part 42 has a function of performing data transmission external apparatuses via the network, and, it transfers received data to the client function part 43, or transmits data to an external apparatus according to instructions given by the client function part 43.

The client function part 43 functions as a client by transmitting a required request to the server apparatus 30 in response to instructions input by a user, a state change detected by a sensor (not shown), or elapse of a predetermined time interval measured by a timer (not shown) regarding it as a trigger, and, after receiving a response thereto from the server apparatus 30, performing processing according to the contents of the response received from the server apparatus 30. Furthermore, as will be described later, when receiving a request for certificate updating or such from the certificate management apparatus 10 in a form of a response, the client function part 43 performs required processing and thus responds thereto.

The functions of the respective parts are achieved by the CPU of the client apparatus 40, as a result of it executing a required control program, and controlling operations of the respective parts.

In this digital certificate management system, the certificate management apparatus 10 can perform data transmission directly only with the server apparatus 30 in the client and server system, and a request which should be transmitted to the client apparatus 40 from the certificate management apparatus 10 is transmitted to the client apparatus 40 via the server apparatus 30 actually. Also, a response from the client apparatus 40 to the certificate management apparatus 10 is transmitted via the server apparatus 30 in the same way.

Further, in the server apparatus 30 and the client apparatus 40, initial root keys are stored at least before a user starts operation of authentication, i.e., at a time of shipment from a manufacturer's factory, or such. At this time, it is preferable that public key certificates and private keys are also stored there.

Next, root key updating processing performing in the digital certificate management system described above with reference to FIG. 2, and a configuration needed therefor, are described.

Although not shown in sequence diagram which will be described, before communication are established between the server apparatus 30 and the client apparatus 40, authentication processing according to SSL is performed and data transfer is permitted therebetween only through a communication path secured by the SSL after the authentication results in success. It is advantageous in this system that root key certificate updating processing can be performed without affecting this authentication processing. Authentication needed for the updating is performed with the use of a root key or a public key certificate which are stored at the time when the authentication is just performed. In other words, before the updating, those stored before updating are used, while, after the updating, those after being updated are used for the authentication. The same manner is also applied to other embodiments which will be described subsequently.

Furthermore, communication between the certificate management apparatus 10 and the server apparatus 30 is performed via a communication path for which safety is secured (in which none of data tamper, wiretapping or such occurs), such as a direct line, or such, is used.

First, a communication procedure in case where the authentication processing with the use of SSL described above is next described. As this authentication processing, either mutual authentication in which both authenticate one another or single directional authentication in which one authenticates the other may be applied. In each embodiment of the present invention, either one may be applied. First, description is next made for mutual authentication.

Figure 4:
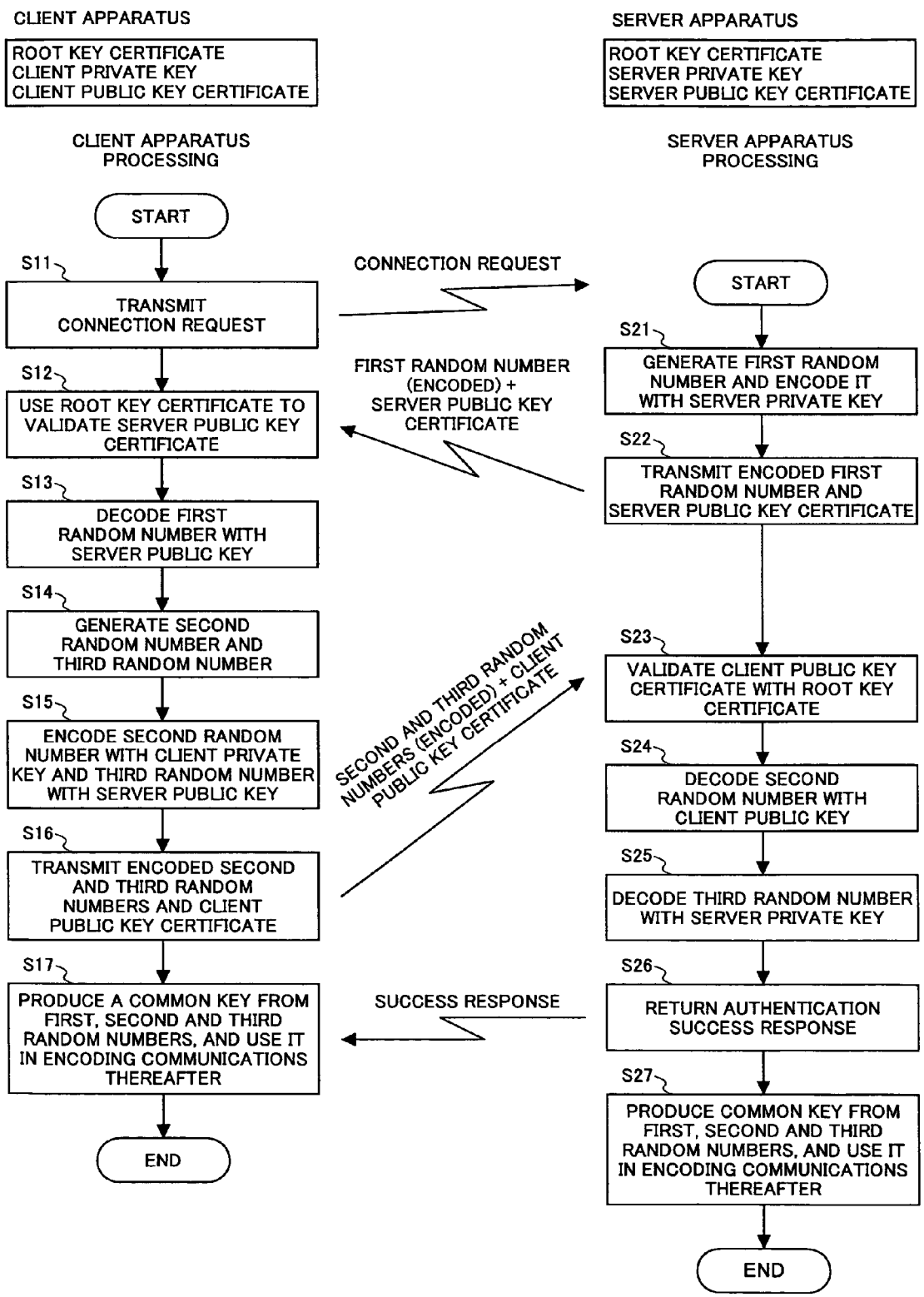
FIG. 4 shows a flow chart of operations performed by the respective apparatuses when mutual authentication according to SSL is performed between a server apparatus and a client apparatus together with information employed there.

FIG. 4 shows a flow chart of processing executed in each apparatus when mutual authentication according to SSL is performed between the client apparatus and the server apparatus, together with information used in the processing.

As shown, when authentication according to SSL is performed, first, a root key certificate, a client private key and a client public key certificate (client certificate) are stored in the client apparatus 40. The client private key is a private key issued by the certificate management apparatus 10 for the client apparatus 40. The client public key certificate is a digital certificate obtained as a result of a digital signature being attached to a public key corresponding to the client private key by the certificate management apparatus 10. The root key certificate is a digital certificate obtained as a result of a root key, which is a proof public key (referred to as a 'proof key', hereinafter) corresponding to a root private key which is a proof private key used for the signature by the certificate management apparatus 10, having a digital signature being attached thereto by the certificate management apparatus 10.

In the server apparatus 30, a root key certificate, a server private key certificate and a server public key certificate (server certificate) are stored. The server private key and the server public key certificate are a private key and a public key certificate, respectively, issued by the certificate management apparatus 10 for the server apparatus 30. There, the same certificate management apparatus 10 issues certificates for the client apparatus 40 and for the server apparatus 30 with the use of the same root private key. Accordingly, the root key certificate is common between the client apparatus 40 and the server apparatus 30.

Figure 53A:
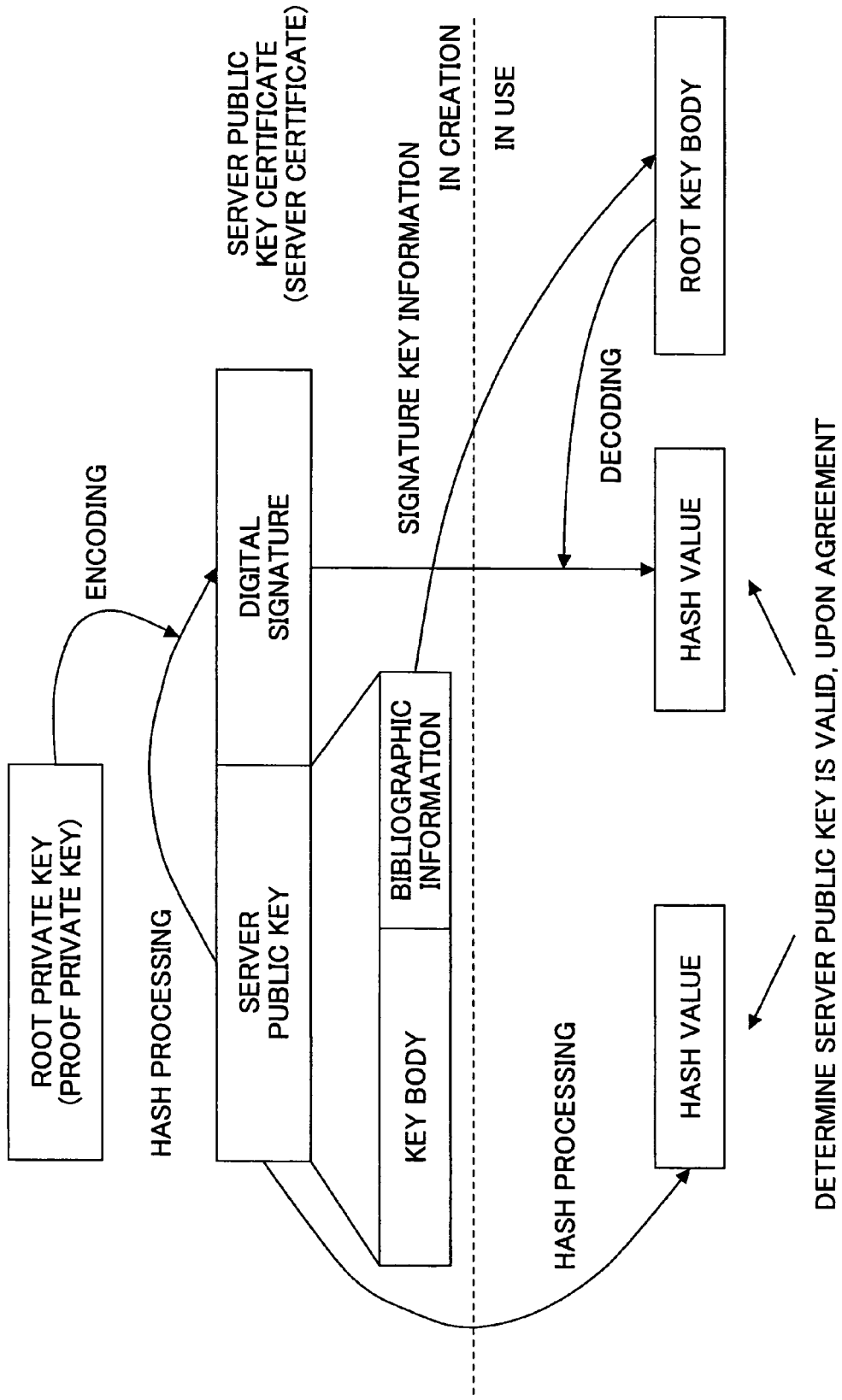
FIGS. 53A and 53B illustrate relationship among the root key, the root private key and the server public key in authentication processing illustrated in FIG. 4.
Figure 53B:
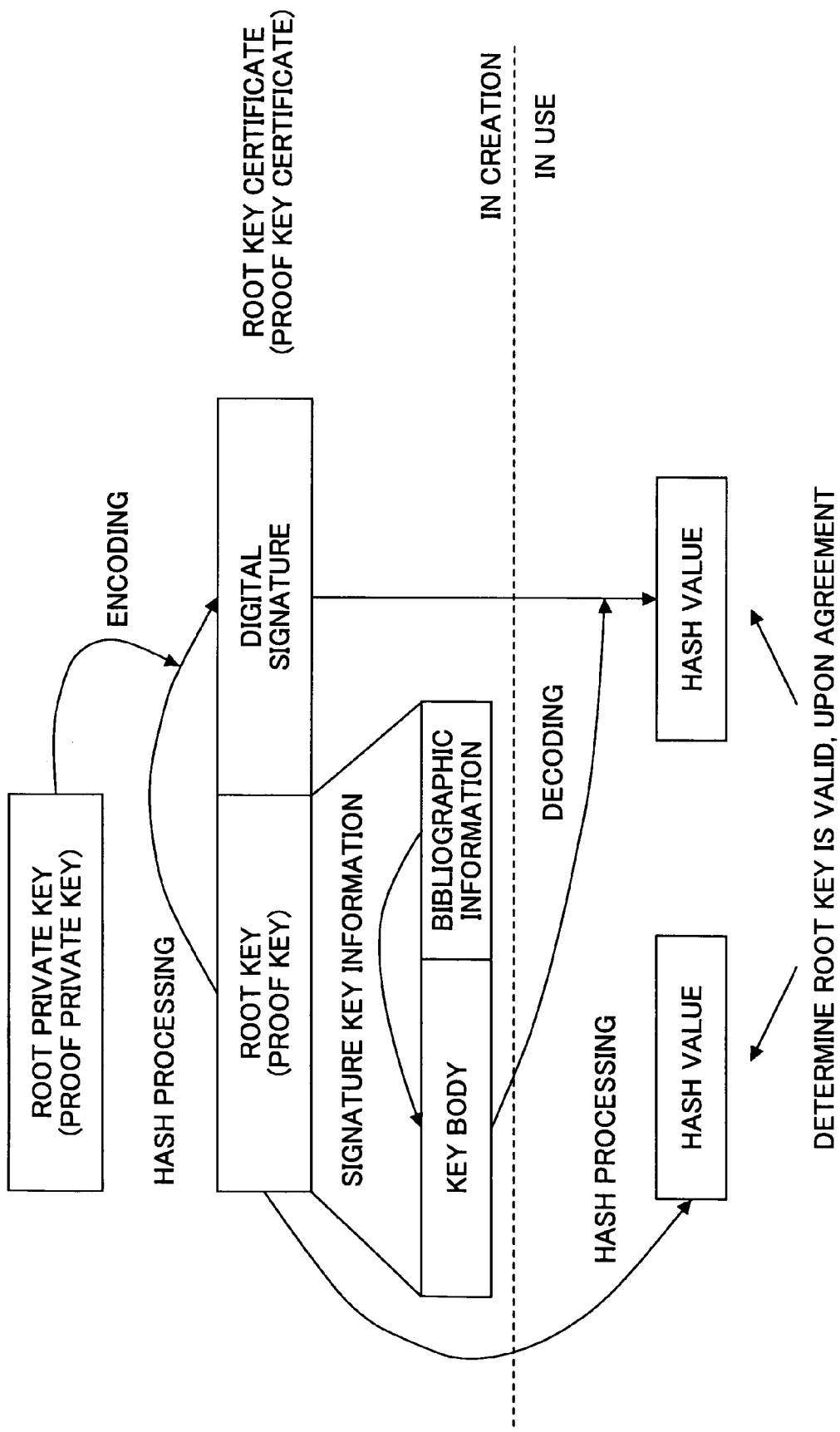

Relationships between respective keys and certificates are those described above in the description of the related art with reference to FIGS. 53A and 53B.

In FIG. 4, each arrow indicated between two flow charts means data transfer processing. A transmission end performs transfer processing in a step at the root of the arrow, while a reception end performs processing in a step at the tip of the arrow. When processing in each step is not completed normally, the authentication is repeated and the processing is stopped. The same manner is applied also when authentication failure is reported from a communication counterpart, when time out occurs in the processing, or such.

In order to make request for communication to the server apparatus 30, the CPU in the client apparatus 40 executes a required control program, and thus, starts processing according to the flow chart shown at the left in FIG. 4. Then, in Step S11, it transmits a connection request to the server apparatus.

The CPU in the server apparatus 30 executes a required control program when receiving the connection request, and thus, starts processing according to the flow chart at the right in FIG. 4. Then, in Step S21, it generates a first random number and encodes it with the use of the server private key. Then, in Step S22, the encoded first random number and the server public key certificate are transmitted to the client apparatus 40.

In the client apparatus 40, when receiving it, validity of the server pubic key certificate is examined with the use of the root key certificate in Step S12. This processing includes not only examination as to whether or not it has been subject to damage or tamper but also examination as whether or not the server apparatus 30 is a proper communication counterpart with the use of the bibliographic information.

Then, after thus proving the validity of the server public key certificate, the first random number is decoded with the use of the server public key included in the server public key certificate in Step S13. When the decoding is completed in success, it is proved that the first random number is positively one received from the server apparatus 30 for which the server public key certificate was properly issued by CA. Also, the server apparatus 30 is thus authenticated as being a proper communication counterpart.

After that, in Step S14, second and third random numbers are generated separately. Then, in Step S15, the second random number is encoded with the use of the client private key, the third random number is encoded with the use of the server public key, and, in Step S16, they are transmitted to the server apparatus 30 together with the client public key certificate. Encoding of the third random number is performed for the purpose of avoiding leakage of the random number to any apparatus other than the server apparatus 30.

When receiving them, the server apparatus 30 uses the root key certificate and thus examines validity of the client public key certificate with the use of the root key certificate in Step S23. This processing also includes, as in Step S12, examination as to whether or not the client apparatus 40 is a proper communication counterpart. After they are validated, in Step S24, the second random number is decoded with the use of the client public key included in the client public key certificate. When the decoding is completed in success, it can be proved that the second random number is positively one received from the client apparatus 40 for which the client public key certificate was properly issued by CA. Also, the client apparatus 40 is proved as being a proper communication counterpart.

After that, in Step S25, with the use of the server private key, the third random number is decoded. Through the processing performed until then, the first through third random numbers are shared between the server and the client. At least the third random number is not known by any apparatuses other than the client apparatus 40 which created it and the server apparatus 30 which has the server private key. When the processing results in success until then, a response indicating that the authentication results in success is returned to the client apparatus 40 in Step S26.

In the client apparatus 40, after receiving it, in Step S17, a common key is generated from the first through third random numbers, and will be used for encoding data performed subsequently, and thus, the authentication processing is finished. In the server apparatus 30, the same processing is performed in Step S27, and the processing is finished. Thus, communication is established therebetween through the processing described above, and after that, data is encoded according to a common key encoding manner with the use of the common key thus generated in Steps S17 or S27.

Through the processing, the common key can be exchanged safely after the client apparatus 40 and the server apparatus 30 authenticate one another, and thus, it is possible to perform data transmission with the proper counterpart safely.

Figure 5:
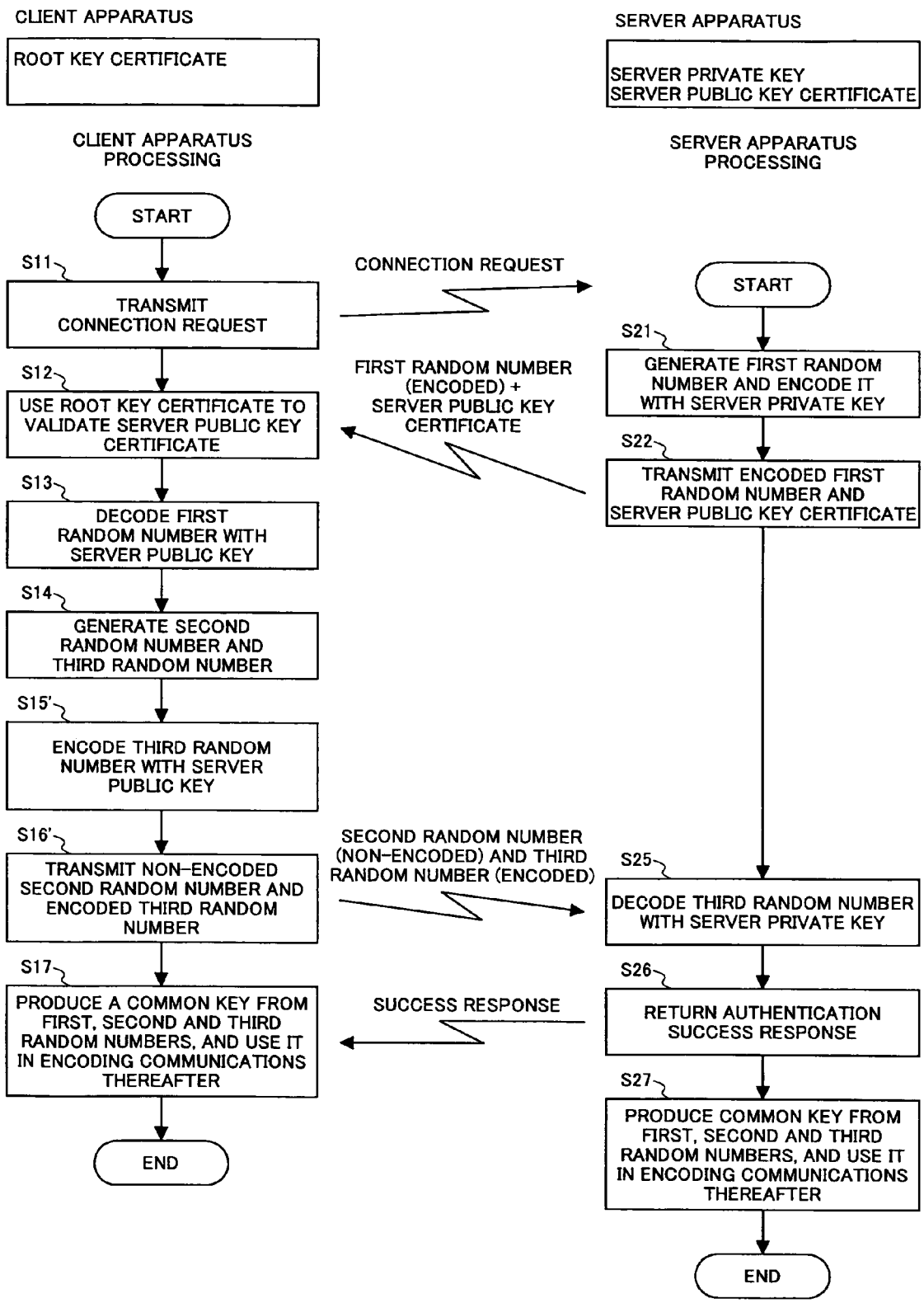
FIG. 5 shows a flow chart of operations performed by the respective apparatuses when single directional authentication according to SSL is performed between the server apparatus and the client apparatus together with information employed there.

In a case of the single directional authentication, the processing shown in FIG. 4 can be simplified into that shown in FIG. 5. Specifically, in this case, processing in which the second random number is encoded with the use of the client private key, and the public key certificate A is transmitted to the communication apparatus B is not indispensable. In this case, Steps S23 and S24 in the server apparatus 30 are not needed. In this case, although the server apparatus 30 cannot authenticate the client apparatus 40, the processing does well in a system in which it is only necessary that the client apparatus 40 can authenticate the server apparatus 30.

Also in this case, the information which should be stored in the client apparatus 40 is only the root key certificate, and the client private key and the client public key certificate are not necessary to be stored. Furthermore, in this case, it is not necessary to store the root key certificate in the server apparatus 30. Accordingly, in this case, updating of each root key certificate which will be described later can be simplified into processing of updating only the root key certificate in the client apparatus 40 and the server public key certificate in the server apparatus 30.

Next, description of root key certificate updating processing is started. In the root key updating processing according to the first embodiment of the present invention, processing illustrated in sequence diagrams shown in FIGS. 6 through 12 is executed in the order shown in a flow chart shown in FIG. 13. Accordingly, first, the processing in FIGS. 6 through 12 will be described, and after that, the execution order thereof will be described with reference to FIG. 13. Processing illustrated in each figure is performed by the CPU of each of the certificate management apparatus 10, the server apparatus 30 and the client apparatus 40 as a result of a required control program being executed by the CPU.

Processing S, i.e., root key certificate certain processing is described next with reference to FIG. 6.

In this processing, the certificate management apparatus 10 creates a pair of new root private key and root key in Step S101 for a valid root private key. The 'valid' root private key means that this key is currently used for authentication in the client and server system. More exactly, a certificate in which a digital signature is attached with the use of this root private key is stored in the server apparatus 30 or in the client apparatus 40 in a state in which it is usable for authentication currently. It is possible to determine whether or not any private key created in the past is valid, based on information such as validity dates of the public key certificate and the root key certificate, whether or not updating thereof has been made, or such, stored in the certificate management part 23, IDs of the public key certificates and the root key certificates used by the respective nodes, stored in the configuration storage part 26, identification information for the root private key used for a digital signature included in these certificates, or such. The key which should be replaced by a new key is referred to as an 'old' key, hereinafter. The same manner is applied also for a 'certificate'.

In Step S102, a digital signature is attached to the new root key created in Step S101 with the use of the old root private key, and thus, a root key certificate to be distributed which is a first proof key certificate is created.

Processing 1, i.e., root key certificate storage processing in the server apparatus is described next with reference to FIG. 7.

Figure 6:
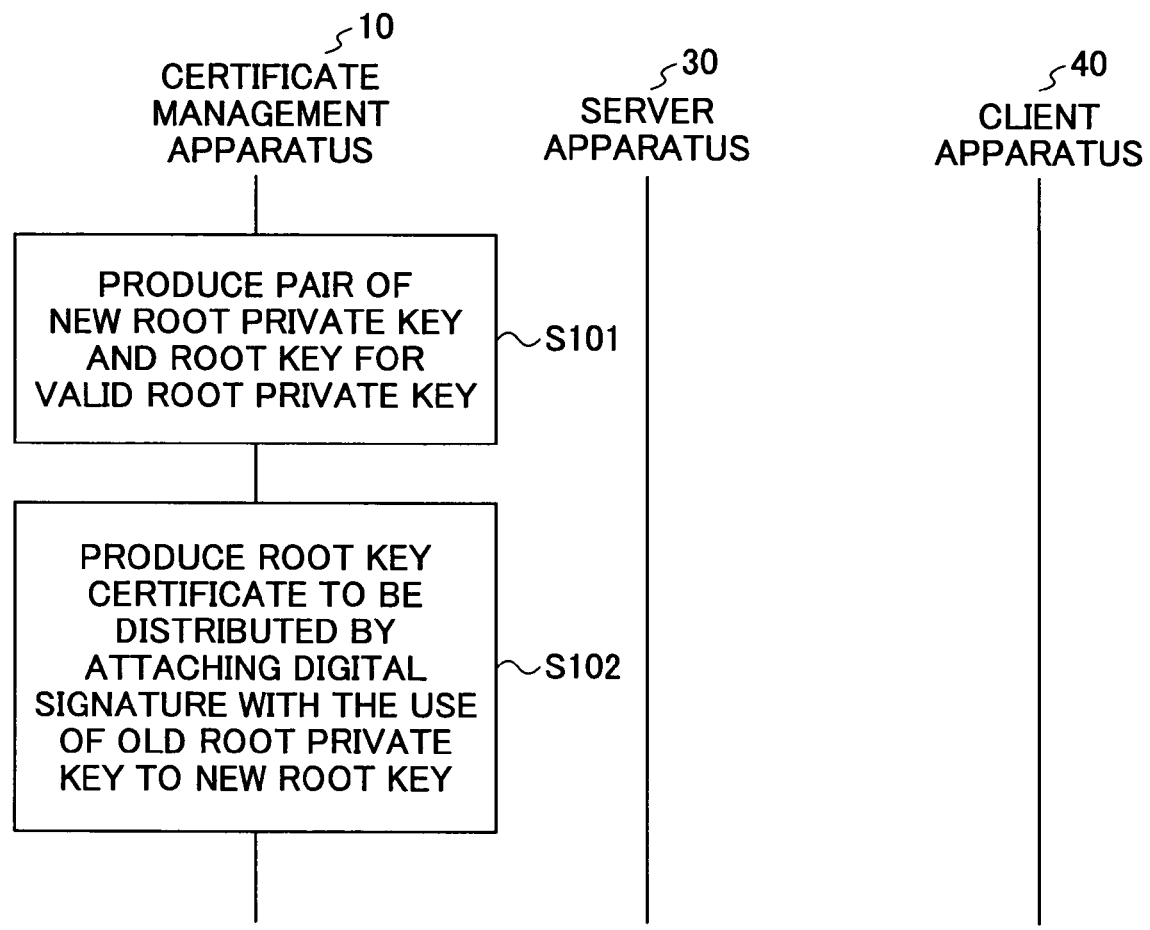
FIG. 6 shows a sequence diagram illustrating a root key certificate creation processing in root key updating processing in the digital certificate management system shown in FIG. 2.

In this processing, first in Step S111, the certificate management apparatus 10 transmits, to the server apparatus 30, the root key certificate to be distributed created in Step S102 in FIG. 6, together with an updating request therefor. In this processing, the CPU 11 in the certificate management apparatus acts as a second transmitting unit.

When receiving this request, the server apparatus 30 examines validity of the root key certificate to be distributed with the use of the old root key certificate in Step S112. As described above, the digital signature is attached to the root key certificate to be distributed with the use of the old root private key. Accordingly, the contents thereof can be decoded with the old root key, and it can be proved that the it is positively issued by the certificate management apparatus 10 originally. Further, in this case, as described above in the description of the background art with reference to FIGS. 53A and 53B, it is possible to also prove that the root key has not been subject to any damage or tamper. Accordingly, by using this root key to be distributed, it is possible to prove validity of the root key thus received without needing any human operation.

After it is validated, in Step S113, the root key certificate to be distributed is stored in the certificate storage part 31. At this time, the old root key certificate is not deleted. Accordingly, in the certificate storage part 31, the two root key certificates are stored.

When authentication processing is to be performed in this state, for proving validity of the received public key certificate, validating is tried with the use of these two (old and new) root key certificates alternately, and, when validating results in success with the use of any of these root key certificates, it is determined that the validity is proved. Accordingly, validity can be proved for the digital certificate for which either the old or the new root private key was used for the digital signature. Validating as to whether or not the root key has been subject to any damage or tamper performed when the root key certificate to be distributed is used in the authentication can be achieved with the use of the old root key certificate. In these Steps S112 and S113, the CPU in the server apparatus 30 acts as a second server updating unit.

After that, the server apparatus 30 returns a result report to the certificate management apparatus 10 in response to the updating request in Step S114. Then, when storage of the root key certificate to be distributed has been completed in success, this matter is reported. If it is failed by some cause, this matter is reported instead. This result report includes at least information indicating that the server apparatus 30 has received the root key certificate to be distributed. Each result report mentioned later also has the same meaning.

Next, processing 2, i.e., root key certificate storage processing in the client apparatus is described with reference to the sequence diagram shown in FIG. 8.

In this processing., first, in Step S121, the certificate management apparatus 10 transmits, to the server apparatus 30, the root key certificate to be distributed created in Step S102, as well as an updating request transmission request requesting the server apparatus 30 to transmit an updating request therefor. In response thereto, the server apparatus 30 transmits, to the client apparatus 40, the root key certificate to be distributed as well as the updating request therefor. However, it is not possible that a transmission request is made from the server apparatus 30 initially. Accordingly, the client apparatus 40 is made to transmit a communication request periodically to the server apparatus 30 at predetermined timing in Step S122, and, in response thereto, the root key certificate to be distributed and the updating request therefor are transmitted thereto in Step S123.

It is preferable that the communication request sent to the server apparatus 30 from the client apparatus 40 as mentioned above may be made as an HTTP request, and then, a request or data sent to the client apparatus 40 from the server apparatus 30 may be made as an HTTP response in response thereto. Thereby, even when the client apparatus 40 is installed within a firewall, it is possible that data is transferred from the server apparatus 30 to the client apparatus 40 beyond the firewall.

However, a means for transmitting beyond a firewall is not limited thereto. For example, with the use of an SMTP (simple mail transfer protocol), an electronic mail having a request or data to be transmitted attached thereto may be transmitted actually. However, HTTP is superior in terms of reliability.

Through the above-described processing, the root key certificate to be distributed and the updating request are transmitted to the client apparatus 40 from the certificate management apparatus 10, and, in processing in Step S121, the CPU 11 in the certificate management apparatus 10 acts as a first transmitting unit.

After receiving this request, the client apparatus 40 validates the root key certificate to be distributed with the use of the old root key certificate in Step S124. Then, when the validation results in success, in Step S125, the root key certificate to be distributed is stored in the certificate storage part 41. At this time, the old root key certificate is not deleted. As to details of the validation and storage, they are the same as those in Steps S112 and S113 in FIG. 7, and, in these steps, the CPU in the client apparatus 40 acts as a second client updating unit.

After that, the client apparatus 40 returns a result report to the certificate management apparatus 10 in Step S126 as a response to the updating request. However, this report is actually first transmitted to the server apparatus 30, and then the server apparatus 30 transmits it to the certificate management apparatus 10 in Step S127 acting as an intermediary.

Next, processing 3, i.e., public key certificate storage processing in the client apparatus is described with reference to FIG. 9.

In this processing, first, in Step S131, the certificate management apparatus 10 creates a new client public key certificate by attaching, with the new root private key, a digital signature to the client public key already issued for the client apparatus. Since the client private key has not been updated yet, it is not necessary to update the client public key itself.

Then, in Step S132, the certificate management apparatus 10 transmits to the server apparatus 30, the new client public key certificate created in Step S131, together with an updating request transmission request requesting the server apparatus 30 to transmit an updating request therefor to the client apparatus 40. In response thereto, as in Steps S122 and S123 in FIG. 8, the server apparatus 30 transmits the new client public key certificate and the updating request therefor to the client apparatus 40, as a response to a communication request (Step S133) sent from the client apparatus 40, in Step S134.

Through the above-described processing, the new client key certificate and the updating request therefor are transmitted to the client apparatus 40 from the certificate management apparatus 10 via the server apparatus 30. In Step S132, the CPU 11 in the certificate management apparatus 10 acts as a first transmitting unit.

In response thereto, in Step S135, the client apparatus 40 uses the root key certificate to be distributed stored in Step S125 for validating the new client public key certificate. As described above, the digital signature is attached to the new client public key certificate with the use of the new private key, and as a result, with the use of the new root key included in the root key certificate to be distributed, the contents of the new client public key certificate can be decoded and can be provided as positively having been issued for the client apparatus 40 by the certificate management apparatus 10. If it is proved, in Step S136, the new client public key certificate is stored in the certificate storage part 41. In these Steps S135 and S136, the CPU in the client apparatus 40 acts as a first client updating unit.

At this time, the old client public key certificate is not deleted. Accordingly, the two (old and new) client public keys are stored in the certificate storage part 41. then, when authentication processing is performed in this state and the public key certificate is transmitted to the communication counterpart, the new public key certificate is transmitted first.

In this case, when the communication counterpart stores the new root key already (as the root key certificate to be distributed or the new root key certificate described above), the communication counterpart can decode the digital signature of the new public key certificate therewith, and thus, authentication can be made without problem. On the other hand, when the communication counterpart has not stored the new root key, it cannot decode the digital signature of the new public key certificate, and thus, a response indicating that authentication has been failed is issued therefrom. However, even in such a case, by requesting communication again and transmitting the old public key certificate at this time, the digital signature thereof can be decoded with the use of the old root key, and thus, authentication can be made without problem finally.

Accordingly, by storing the two public key certificates, authentication can be made in the communication counterpart even when the communication counterpart has not stored the new root key, although somewhat extra overhead may be required therefor. Since the public key bodies themselves included in these two public key certificates are same as one another, decoding of the data encoded with the use of the client private key can be performed with the use of either one of these public key certificates in the same way.

After that, the client apparatus 40 returns a result report in response to the updating request to the certificate management apparatus 10 in Step S137, this is then once transmitted to the server apparatus 10 and then is transmitted to the certificate management apparatus 10 from the server apparatus 10, actually.

Next, processing 4, i.e., public key certificate storage processing in the server apparatus is described with reference to FIG. 10.

In this processing, first, in Step S141, the certificate management apparatus 10 creates a new server public key certificate by attaching with the use of the new private key a digital signature to the server public key already issued for the client apparatus 40. The server public key itself should not be updated as in the case for the client public key described above.

Then, in Step S142, the certificate management apparatus 10 transmits to the server apparatus 30 the new public key certificate together with an updating request therefor. In this processing, the CPU 11 in the certificate management apparatus 10 acts as a second transmitting unit.

Figure 7:
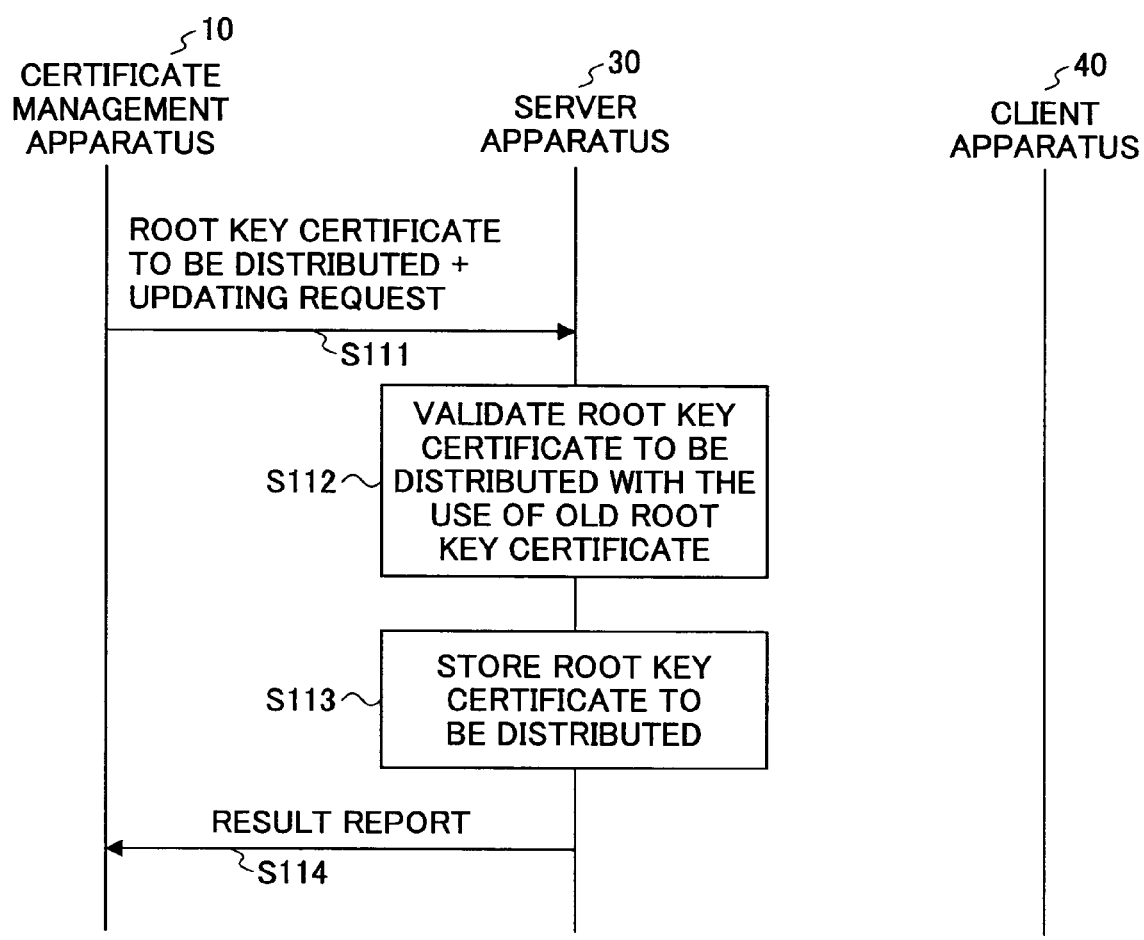
FIG. 7 shows a sequence diagram illustrating root key certificate storage processing in the server apparatus in the same.
Figure 9:
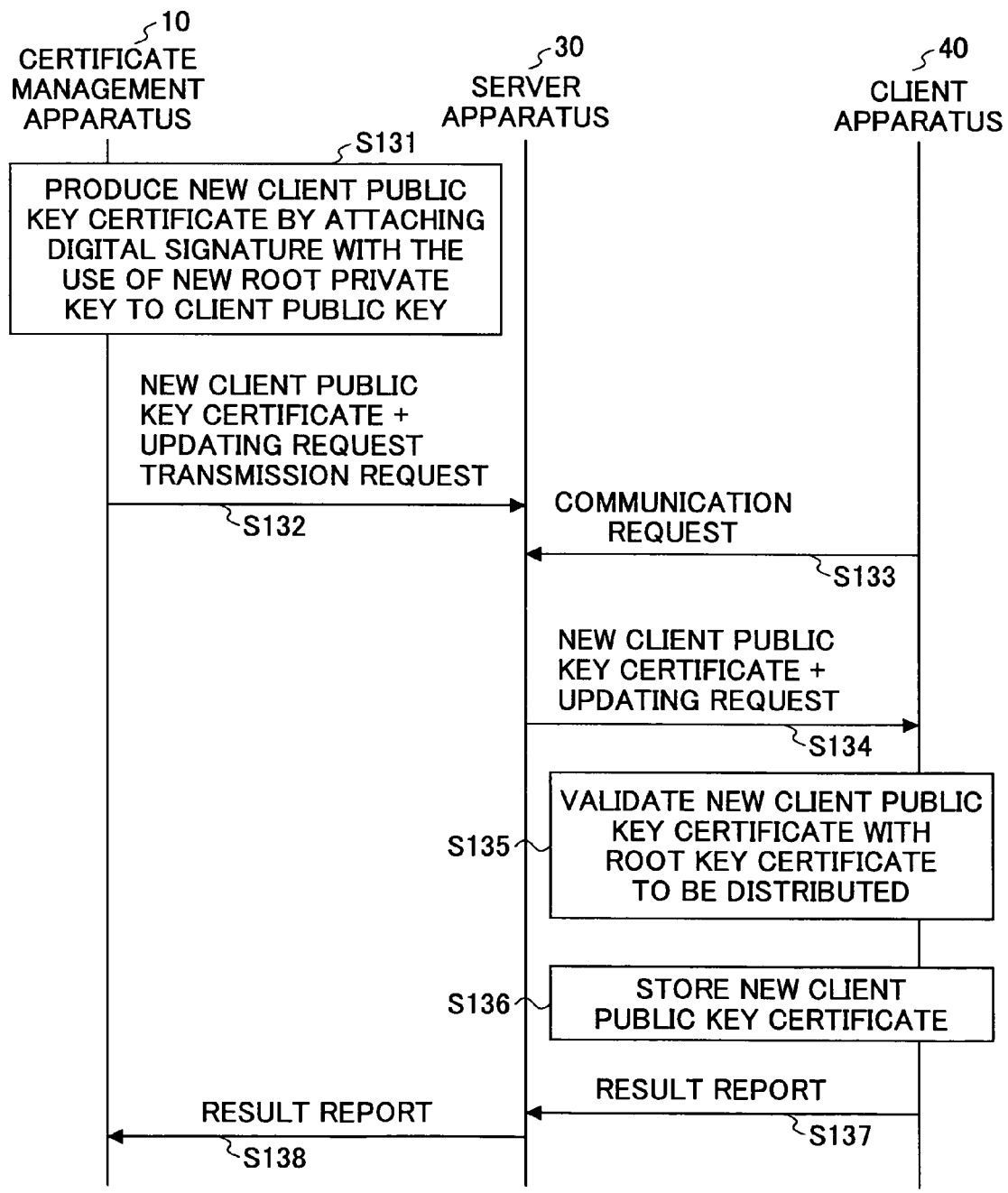
FIG. 9 shows a sequence diagram illustrating public key certificate storage processing in the client apparatus in the same.

When receiving this request, the server apparatus 30 validates the new public key certificate with the use of the root key certificate to be distributed stored in Step S113 in FIG. 7 as in Step S135 in FIG. 9. When the validation is finished in success, the new server public key certificate is stored in the certificate storage part 31 in Step S144, and is used to replace the old server public key certificate. In Steps S143 and S144, the CPU in the server apparatus 30 acts as a server updating unit.

In the case of the server apparatus 30, different from the case of the client apparatus 40, the new public key certificate is not additionally stored with the old one but is used to replace the old one. The reason therefor is described next.

In the case of the server apparatus 30, the public key certificate is transmitted to the client apparatus 40 upon receiving a connection request made by the client apparatus 40. If a plurality of server public key certificates were stored in this case, it should be necessary to select either one thereof to be transmitted. Then, if the client apparatus 40 received the server public key certificate by which a digital certificate cannot be decoded as a result, authentication would be failed in. For example, such a problem would occur in a case where the new server public key certificate were transmitted before the client apparatus 40 had not stored the new root key.

This problem might be solved by transmitting the other server public key certificate after the authentication were thus failed in. However, in case where the server apparatus received connection requests from unspecified many client apparatuses at any timing, it would not be practical to select the server public key certificate to be transmitted for each of these client apparatuses one by one. Furthermore, since the server apparatus could not know what situation each client apparatus were in until the authentication were finished, it would be also difficult to appropriately select the server public key certificate to be transmitted first. This is why it is necessary that the server apparatus stores only one server public key certificate, and then, it is always transmitted when receiving a connection request from the client apparatus.

Accordingly, in the server apparatus 30, the old server public key certificate is deleted at the time when the new server public key certificate is stored. Therefore, if this is performed before the new root key is stored in the client apparatus 40, the client apparatus 40 cannot decode a digital signature of the server public key certificate received, and thus, cannot perform authentication. In order to avoid such a problem, the public key storage processing in the server apparatus 30 should be performed after it is confirmed that the root key storage processing is completed in the client apparatus 40.

After Step S144 described above, the server apparatus 30 returns a result report to the certificate management apparatus 10 as a response to the updating request in Step S145.

There, when storage of the new server public key certificate has succeeded, this matter is reported, while, when it has been failed in due to some cause, this matter is reported instead.

Next, processing 5, i.e., root key certificate updating processing in the server apparatus is described.

In this processing, first, in Step S151, the certificate management apparatus 10 creates a new root key certificate as a second proof key certificate by attaching a digital signature with the use of the new root private key to the new root key. In Step S152, the certificate management apparatus 10 transmits to the server apparatus 30 the new root key certificate as well as an updating request therefor. Also in this processing, the CPU 11 in the certificate management apparatus 10 acts as a second transmitting unit.

When receiving the request, the server apparatus 30 validates the new root key certificate with the use of the root key certificate to be distributed in Step S153. As described above, since the new root key certificate has the digital signature attached thereto with the use of the new root private key, the contents thereof can be decoded with the use of the new root key included in the root key certificate to be distributed, and thus, the new root key certificate can be validated as positively being one issued by the certificate management apparatus 10.

After the validation is finished, the new root key certificate is stored in the certificate storage part 31 in Step S154. Then, the root key certificate to be distributed and the old root key certificate are deleted and thus discarded. And thus, the root key certificate is updated. Thereby, it becomes not possible to decode a digital certificate having a digital signature attached thereto with the use of the old root private key. However, when the actual updating processing is performed after the new client public certificate is stored in the client apparatus 40, there occurs no problem for validating the public certificate sent from the client apparatus 40 at this time. Thus, no problem occurs for performing authentication processing there.

After that, the server apparatus 30 returns a result report to the certificate management apparatus 10 as a response to the updating request in Step S155. There, when storage of the new root key certificate has been succeeded in, this mater is reported, while, when it is failed in due to some cause, this matter is reported instead.

Next, processing 6, i.e., root key certificate updating processing in the client apparatus is described.

In this processing, in Step S161, the certificate management apparatus 10 creates a new root key certificate as a second proof key certificate by attaching a digital signature with the use of the new root private key to the new root key. Since this is the same as that created in Step S151, the one created in Step S151 may be also used for Step S161. Similarly, it is also possible that the one created in Step S161 is also used for Step S151.

Then, in Step S162, the certificate management apparatus 10 transmits to the server apparatus 30 the new root key certificate created in Step S161 as well as an updating request transmission request requesting the client apparatus 40 to transmit an updating request therefor. The server apparatus 30 responds thereto and, as in Steps S122 and S123 in FIG. 8, transmits the new root key certificate as well as the updating request therefor as a response to a communication request (Step S163) made by the client apparatus 40 first.

Through the above-described processing, the new root key certificate as well as the updating request therefor are transmitted to the client apparatus 40 from the certificate management apparatus 10 via the server apparatus 30. Also in Step S162, the CPU 11 in the certificate management apparatus 10 acts as the first transmitting unit.

When receiving this request, the client apparatus 40 validates the new root key certificate with the use of the root key certificate to be distributed in Step S165. After the validation is finished, the new root key certificate is stored in the certificate storage part 41 in Step S166. Then, the root key certificate to be distributed and the old root key certificate are deleted and discarded. And thus, the root key certificate is updated to the new one. This processing is same as that in Steps S153 and S154 in FIG. 11. However, when storage of the new client public key certificate in the client apparatus 40 is finished, the old client public key certificate may also be discarded in Step S166 at the same time.

After that, the client apparatus 40 returns a result report to the certificate management apparatus 10 as a response to the updating request in Step S167. However, the result report is actually first transmitted to the server apparatus 30, and then, is transmitted to the certificate management apparatus from the server apparatus 30 acting as an intermediary.

Execution timing of the respective processing illustrated in FIGS. 6 through 12 is managed with the use of an updating procedure based on information stored in the configuration storage part 26 by the updating control part 27 in the certificate management apparatus 10. This updating procedure is such as that shown in a flow chart shown in FIG. 13. That is, when a predetermined trigger for updating a root key is detected, processing shown in FIG. 13 is started, and then, first, the processing S shown in FIG. 6 is executed. After that, the processing 1 through 6 is executed. As the trigger for updating a root key, expiration of a predetermined validity due term, instructions by a manager, or such, may be applied. As a case where a manager gives instructions, a case where it is determined that a root private key has leaked to a third person or such, may be assumed, for example.

Furthermore, in FIG. 13, processing located at a tip of an arrow is started after processing located at a root of the same arrow is completed. An arrow indicated by a broken line indicates that a relevant condition is not indispensable but is preferably considered Specifically, the processing 1 and the processing 2 are started after the processing S is finished. The processing 3 is started after the completion of the processing 2, and also, preferably after the completion of the processing 1. The processing 4 is started after the completion of the processing 1 and the processing 2. The processing 5 is started after the processing 1 and the processing 3 are finished. The processing 6 is started after the processing 2 and the processing 4 are finished. The completion of the processing 3 through the processing 6 means that updating of the root key and the public key certificate is finished.

Each processing is regarded as being completed when a response indicating updating success is received in response to a relevant updating request. This response includes information indicating that a certificate to be updated has been received, as mentioned above. In case where a response indicating failure in updating or a case where time out occurs in processing first, the same processing should be repeated again. However, in case where failure occurs successively predetermined times, it should be determined that the entire updating processing is failed in.

Figure 14:
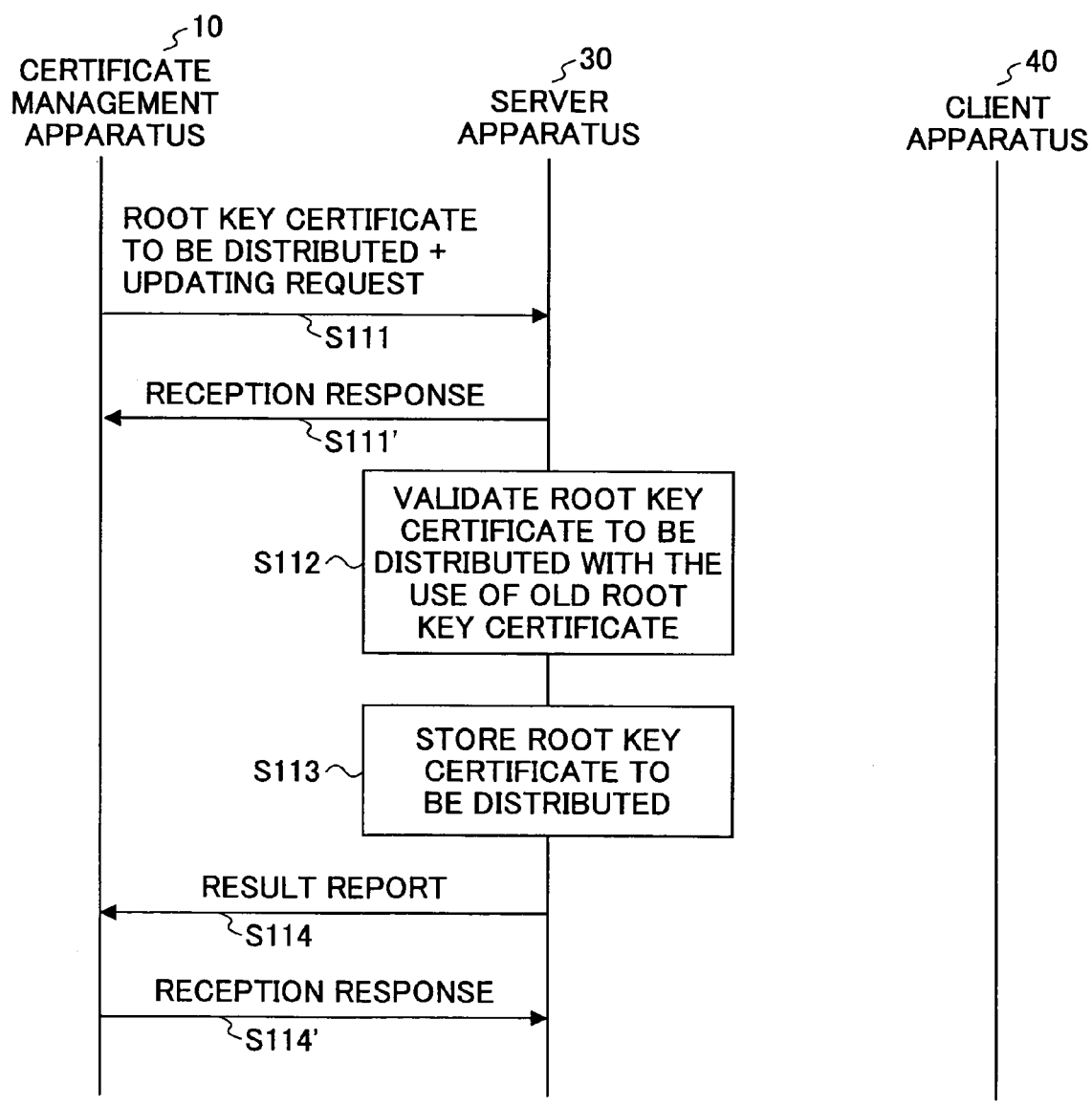
FIG. 14 shows a variant example of the sequence shown in FIG. 7.

Furthermore, as shown in FIG. 7 or such, in case where the certificate management apparatus 10 transmits the updating request to the server apparatus 30, the server apparatus 30 returns a result report after completing storage of the received certificate or such. However, it is also possible, as shown in FIG. 14, that the server apparatus 30 immediately returns a reception response when receiving the updating request (Step S111'). In this case, the reception response in Step S111' always means that the updating request and the root key certificate to be distributed transmitted from the certificate management apparatus 10 have been property received. Furthermore, a result report in Step S114 may become information informing of success/failure of updating, a cause of the failure, or such.

Furthermore, it is preferable that the certificate management apparatus 10 returns a response further to this result report (in Step S114'). Thereby, the server 30 can also recognize that the result report has been properly received by the certificate management apparatus 10.

Figure 15:
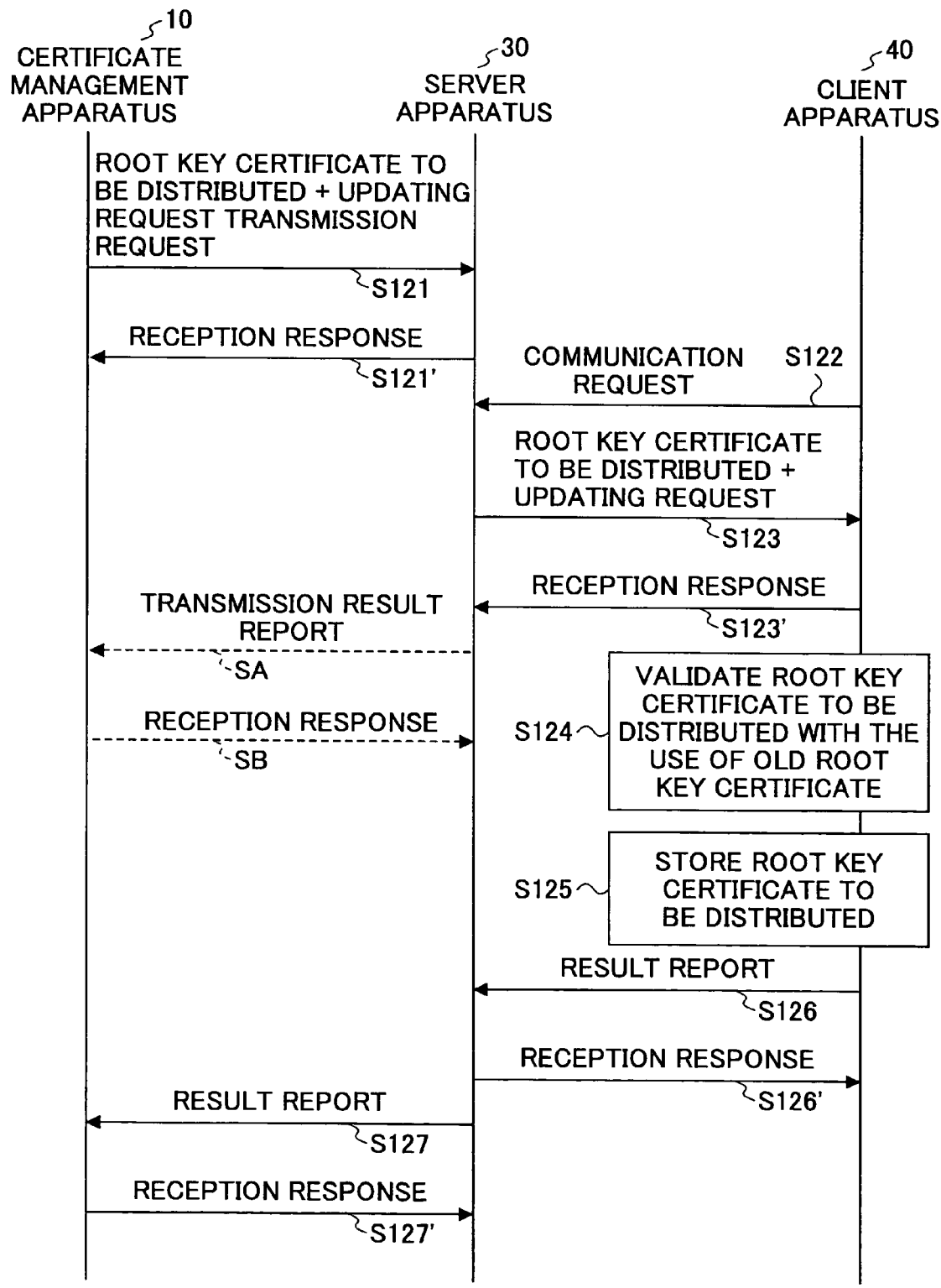
FIG. 15 shows a variant example of the sequence shown in FIG. 8.

Furthermore, the same procedure manner is applied for communication between the server apparatus 30 and the client apparatus 40. That is, when receiving any request, a reception request is returned to a transmission source immediately. Similarly, when a result report is received, a reception response thereto is returned immediately. FIG. 15 shows a sequence adding this concept to the sequence shown in FIG. 8.

A reception response in Step S123 is information indicating that the client apparatus 40 has received the root key certificate to be distributed and the updating request. However, when simply adding the above-mentioned concept to the sequence shown in FIG. 8, this information is not sent to the certificate management apparatus 10 until the server apparatus 30 sends a result report in Step S127.

Therefore, as shown by a broken line in FIG. 15, after receiving a reception response from the client apparatus 40, the server apparatus 30 may transmit a transmission result report only indicating whether or not the transmission has been succeeded in or failed in to the certificate management apparatus 10. Thereby, it becomes possible to immediately report to the certificate management apparatus 10 that the transmission to the client apparatus 40 has been succeeded in or failed in.

Furthermore, in case where a result report is sent as mentioned above, it is also possible to proceed with processing, presuming that storage or setting of the certificate is performed without delay, only when a reception response is made from a transmission destination of the certificate or such, in an execution timing management for the respective processing described above with reference to FIG. 13. Specifically, even before the processing 1 is finished actually, it is presumed that the processing 1 is finished when a reception response such as that in Step S111' of FIG. 14 is made, and then, a timing at which the processing 4 is started may be determined only based on the presumption. Furthermore, even before the processing 2 is finished yet actually, when a transmission result report such as that shown as Step SA in FIG. 15 is returned, it may be presumed that the processing 2 is finished, and based thereon, a timing of starting the processing 4 may be determined.

Figure 8:
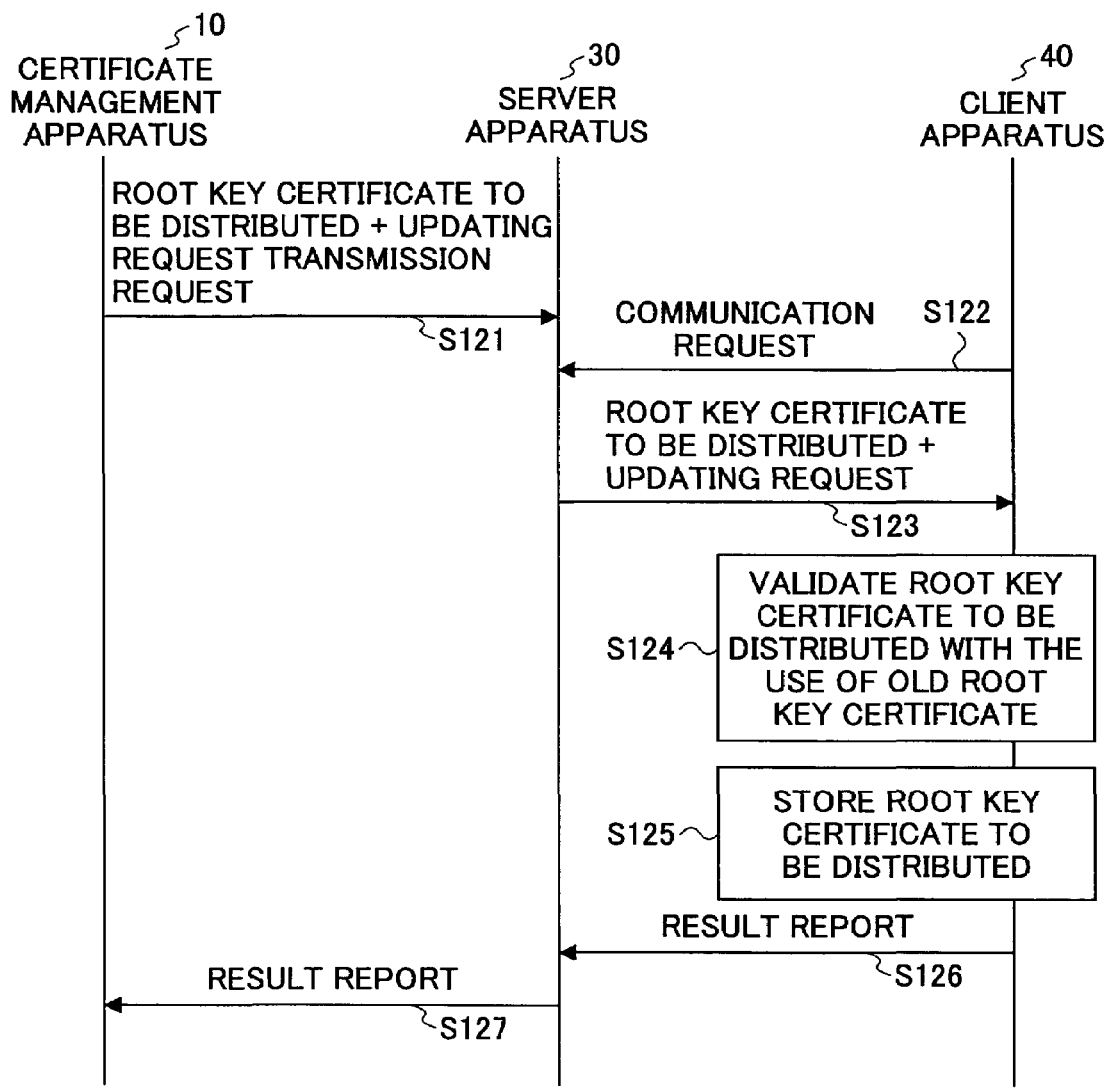
FIG. 8 shows a sequence diagram illustrating root key certificate storage processing in the client apparatus in the same.

FIGS. 14 and 15 illustrate variant examples of only the sequences shown in FIGS. 7 and 8. However, the above-described concept may also be applied to all the processing and sequences in embodiments and variant embodiments according to the present invention which will be described subsequently.

In a case where the root key updating processing is performed according to the procedure shown in FIG. 13 based on the above-described timing management, the server apparatus 30 and the client apparatus 40 can perform authentication processing according to SSL at any timing in the processing. Thereby, even when the updating processing is stopped on the way for some reason, no significant problem occurs in communication between the server apparatus 30 and the client apparatus 40. Accordingly, there occur no significant problem even when a time is required to seek a cause of a trouble in the updating processing if any, and the updating processing is started again after the cause of the trouble is removed. The same manner may also be applied to the respective embodiments according to the present invention described subsequently.

In this digital certificate management system, by execution of the root key updating processing in such a procedure, the root key can be updated under automatic control without affecting authentication processing itself between the server apparatus 30 and the client apparatus 40, as described above. Furthermore, the communication path is secured with the use of SSL through the authentication with the use of old (before being updated) root key or public key certificate, and then, the new root key or the new public key certificate used for updating can be transmitted therethrough. Furthermore, after the updating, it is possible to create a state in which the communication path according to SSL can be secured through the authentication with the use of the new root key or the new public key certificate thus obtained through the updating. Thus, by applying such a digital certificate management system, without needing a special communication path for updating the root key, the root key can be updated. Accordingly, it is possible to establish a client and server system which performs authentication according to SSL upon performing data transmission, at low costs. The same advantage can be obtained also from the respective embodiments described subsequently.

Furthermore, although it is necessary to separately provide the safe communication path between the certificate management apparatus 10 and the server apparatus 30, this communication path may be a common one which can also be used for the regular communication processing such as that for updating of the pubic key certificate for which the validity due term is expired, or such. Furthermore, such a communication path should be provided only between the certificate management apparatus 10 and another apparatus, and thus, this should not result in an especially significant burden. In fact, in a case where the certificate management apparatus 10 and the server apparatus 30 are installed physically close to one another, it is easy to provide such a communication path with the use of a special cable laid therebetween, and the present embodiment is advantageous for such a situation in particular.

In the processing procedure shown in FIG. 13, the processing 4 (public key certificate storage processing in the server apparatus) is executed after the processing 2 (root key certificate storage processing in the client apparatus), in other words, after a response indicating that the root key certificate to be distributed is received, is received from the client apparatus 40.

In the processing 4, as described above, since it is inconvenient that the two public key certificates are stored at the same time, the old one should be discarded when the new server public certificate is stored. However, even such updating is performed, no problem occurs in authentication when the updating is performed positively after the new root key is stored in the client apparatus 40.

Furthermore, it is preferable that the processing 3 (public key certificate storage processing in the client apparatus) be performed after the processing 1 (root key certificate storage processing in the server apparatus), in other words, after a response indicating that the root key certificate to be distributed is stored, is received from the server apparatus 40.

As described above in the description of the processing 3, if the new root key is not stored in the server apparatus 30 at the time when the new client public key certificate is stored in the client apparatus 40, overhead occurs in communication until the new root key is stored in the server apparatus 30, and thus, the efficiency may become degraded.

Although the processing 5 and the processing 6 are not indispensable processing, an extra storage capacity is needed if the old root key certificate or public key certificate is stored for a long time. It is preferable to apply a storage device having a high reliability for storing the key or certificate, and thus, the storage device is expensive per unit storage capacity. Accordingly, this matter (delaying discard of the old key or certificate) may cause a problem. Furthermore, since the root key certificate to be distributed is not in a self signing type (described above), it is necessary to refer to the old root key certificate each time when it is used, and thus, the efficiency is lowered. Then, it is preferable to perform the processing 5 and the processing 6 so that the root key certificate is made to be that in the self signing type, and to discard the old certificate.

Only in order to change the root key certificate into that in the self signing type, it may be performed immediately after the root key certificate to be distributed is stored. In an example of the processing 4, it may be performed immediately after the completion of the processing 1. However, in this timing, the old root key certificate may not be necessarily discarded. Further, the timing of discarding cannot be controlled by the server apparatus 30. Therefore, it becomes necessary to again make a request to discard the old root key certificate after the processing 3 is finished. Accordingly, it is preferable in terms of simplification of the processing to perform the processing 5 after the completion of the processing 1 and the processing 3. Similarly, it is preferable to perform the processing 6 after the completion of the processing 2 and the processing 4.

Once the root key is stored, there occurs no necessity to transmit it externally and thus, it can be said that any damage or tamper thereof hardly occurs after that. Therefore, not the root key certificate but the key itself may be stored. In such a case, it is necessary only to store the new root key included in the root key certificate to be distributed. Accordingly, it becomes not necessary to separately transmit the new root key certificate from the certificate management apparatus 10. Therefore, in such a case, in the processing 5 and the processing 6, it is not necessary to transmit the new root key certificate, but it is necessary to request only discard of the old root key. The same manner may also be applied in a case where no digital signature is performed when the root key is used.

Further, in the present embodiment, transmission to the client apparatus 40 from the server apparatus 30 is performed, for example, as a response to a communication request first made from the client apparatus 40. However, instead, it is possible that, the client apparatus 40 can act as a server, the server apparatus 30 can act as a client, and thus, it becomes possible that data or a request is directly transmitted from the server apparatus 30 to the client apparatus 40 initially. In such a case, a communication request made from the client apparatus 40 periodically becomes unnecessary. The same manner may also be applied to the respective embodiments described subsequently.

A digital certificate management system in a second embodiment of the present invention is described next with reference to FIGS. 16 through 23. The digital certificate management system in the second embodiment of the present invention includes a certificate management apparatus which is a digital certificate management apparatus as well as a client apparatus and a server apparatus which configure a client and a server system. Also in this embodiment, the client and server system includes the single client apparatus and the single server apparatus.

Figure 16:
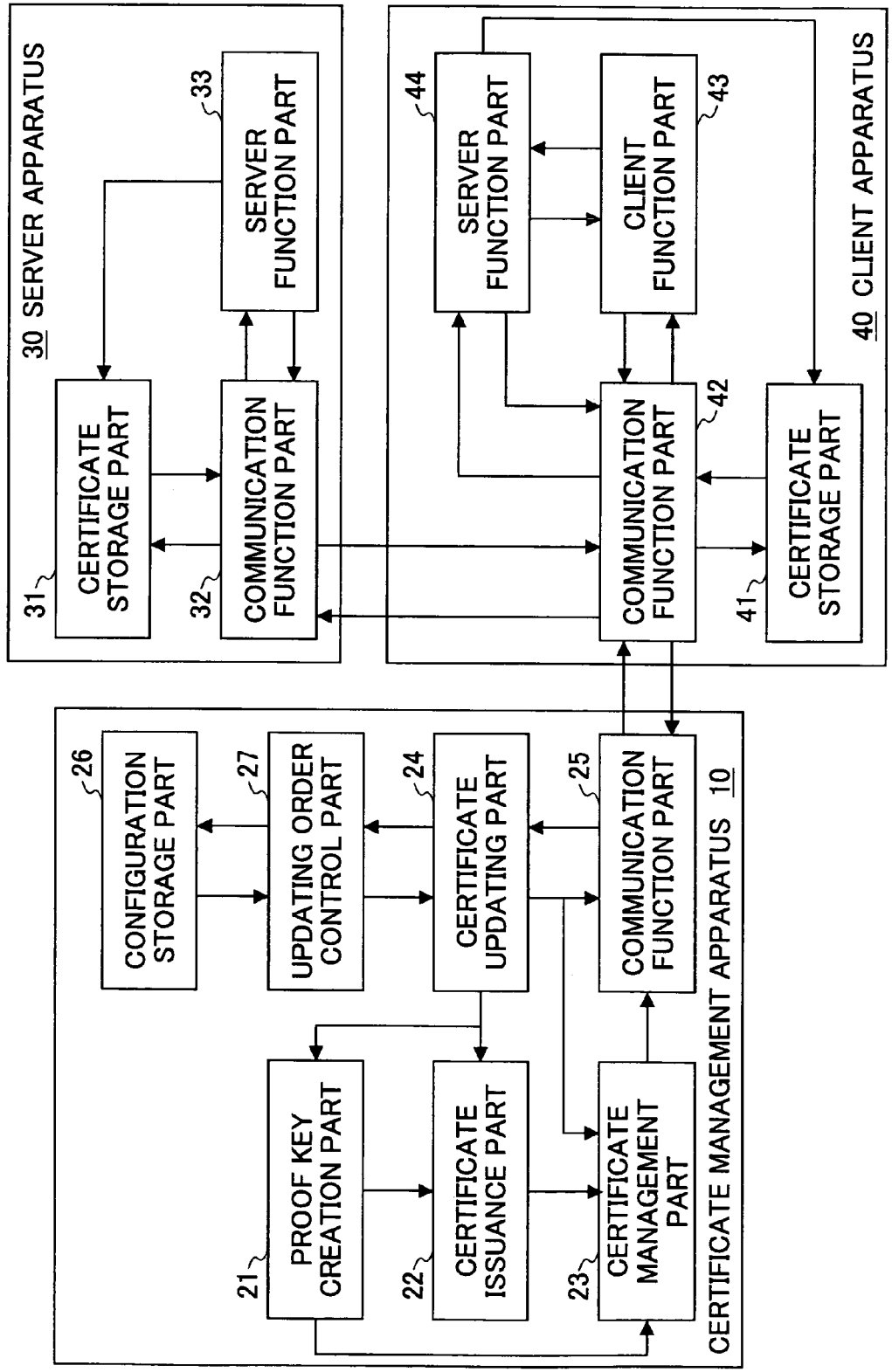
FIG. 16 shows a functional block diagram illustrating respective apparatuses in a second embodiment of a digital certificate management system according to the present invention.

Functional configurations of the respective apparatuses of the digital certificate management system are shown in FIG. 16 corresponding to FIG. 2. In the configurations, the same reference numerals are given to the same function parts as those in FIG. 2.

As can be seen from the figure, the certificate management apparatus 10 can directly communicate only with the client apparatus 40 included in the client and server system, and a request for the server apparatus 30 from the certificate management apparatus 10 is transmitted via the client apparatus 40. In this point, the second embodiment is different from the first embodiment.

Further, also as a point different from the first embodiment, a server function part 44 is provided in the client apparatus 40. The server function part 44 has a function as a server of performing required processing in response to a received request, and rerunning a response, and is provided for communication with the certificate management apparatus 10. If the client apparatus 40 has only the client function part 43, the certificate management apparatus 10 should wait for a communication request coming from the client apparatus 40 in order to transmit data or a request to the client apparatus 40.

However, since root key updating processing is not performed so frequently, for example, once per year, almost all the communications are useless if the client apparatus 40 performs a communication request periodically only for this purpose. Therefore, the server function part 44 is provided in the client apparatus 40, and thereby, a communication request can be made also by the certificate management apparatus 10. Also the function of this server function part 44 is achieved as a result of a CPU in the client apparatus 40 executing a required program, and controlling operations of the respective parts in the client apparatus 40.

The client apparatus 40 always acts as client in a relationship with the server apparatus 30 in the client and server system. Accordingly, in case the client apparatus 40 acts as an intermediary for communication between the certificate management apparatus 10 and the server apparatus 30, the server function part 44 receives data or a request received by the communication function part 42 from the certificate management apparatus 10, transfers it to the client function part 43, and then, transmits it to the server apparatus 30 by requesting communication for the server apparatus 30 according to instructions from the client function part 43. In case where a response coming from the server apparatus 30 is returned to the certificate management apparatus 10, the revere processing is performed.

Although the sequence of the root key updating processing is different from that of the first embodiment described above according to the differences therebetween described above, the second embodiment is the same as the first embodiment other than them. Accordingly, the duplicated description is omitted.

Also in the second embodiment, data transmission between the certificate management apparatus 10 and the client apparatus 40 are performed through a communication path such as a direct line or so for which a safety is secured. Although it is possible to apply SSL to communication between the certificate management apparatus 10 and the client apparatus 40 in the present embodiment, this case will be described as a variant embodiment later.

Figure 21:
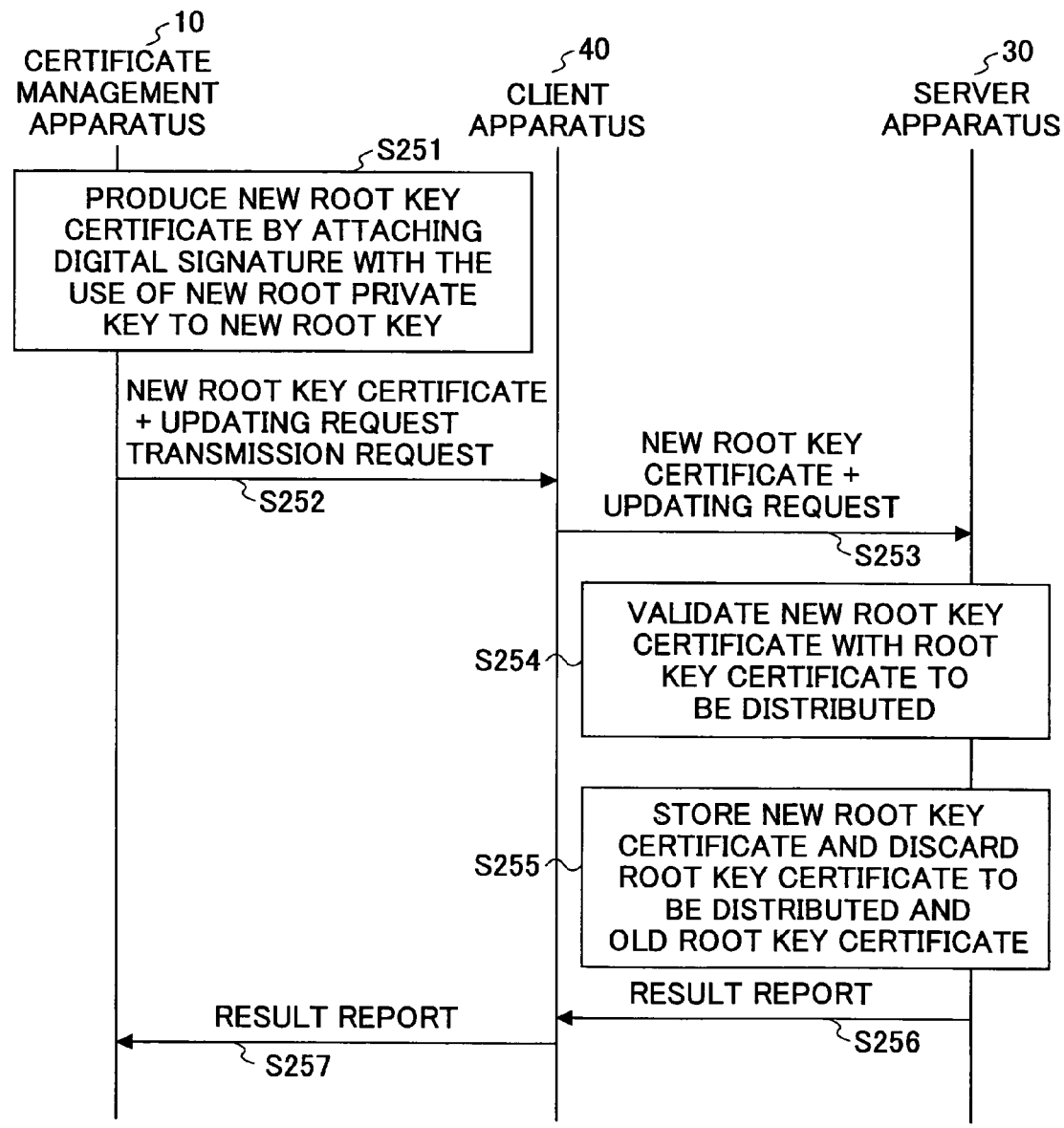
FIG. 21 shows a sequence diagram illustrating root key certificate updating processing in the server apparatus in the same.
Figure 22:
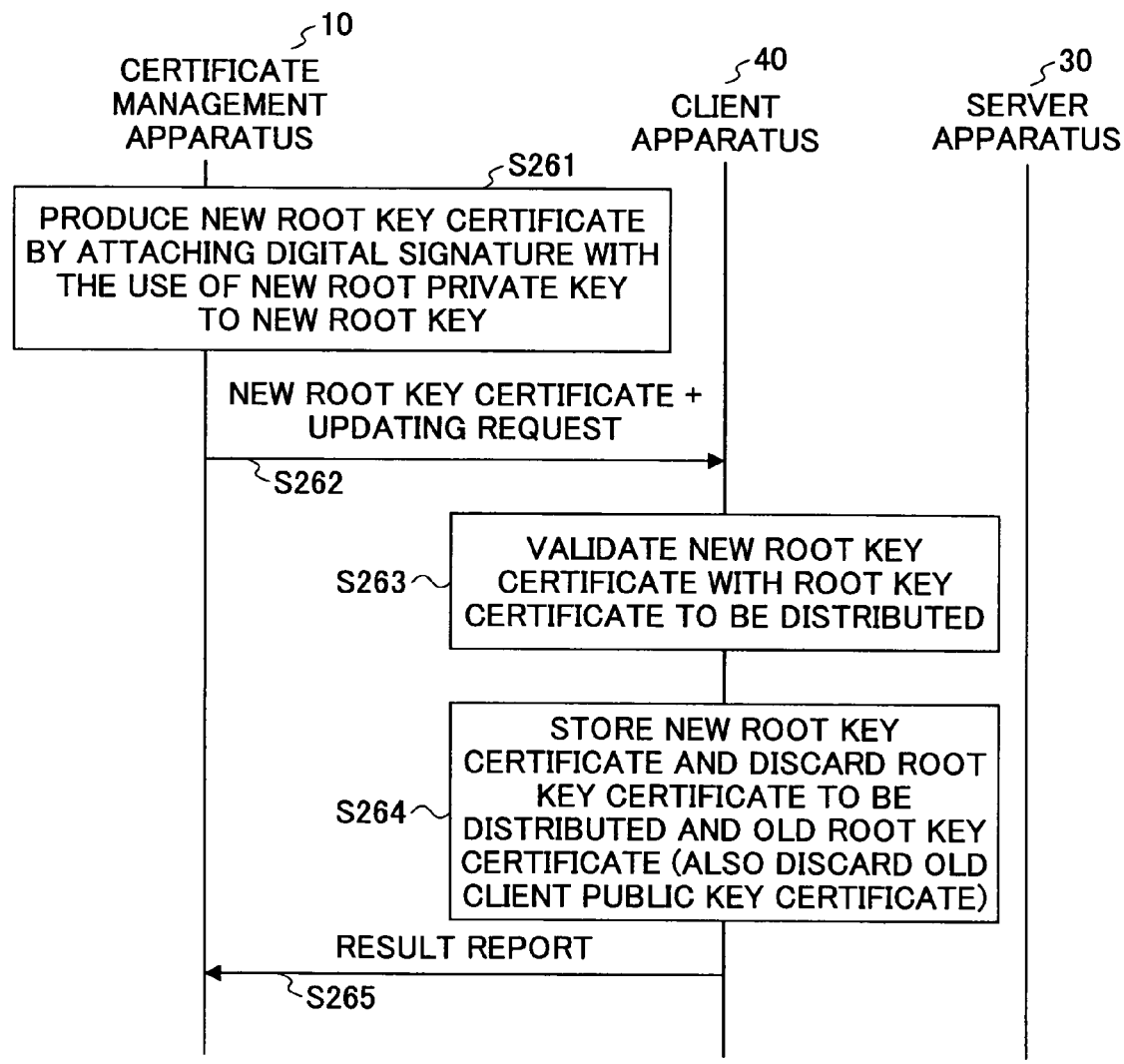
FIG. 22 shows a sequence diagram illustrating root key certificate updating processing in the client apparatus in the same.
Figure 23:
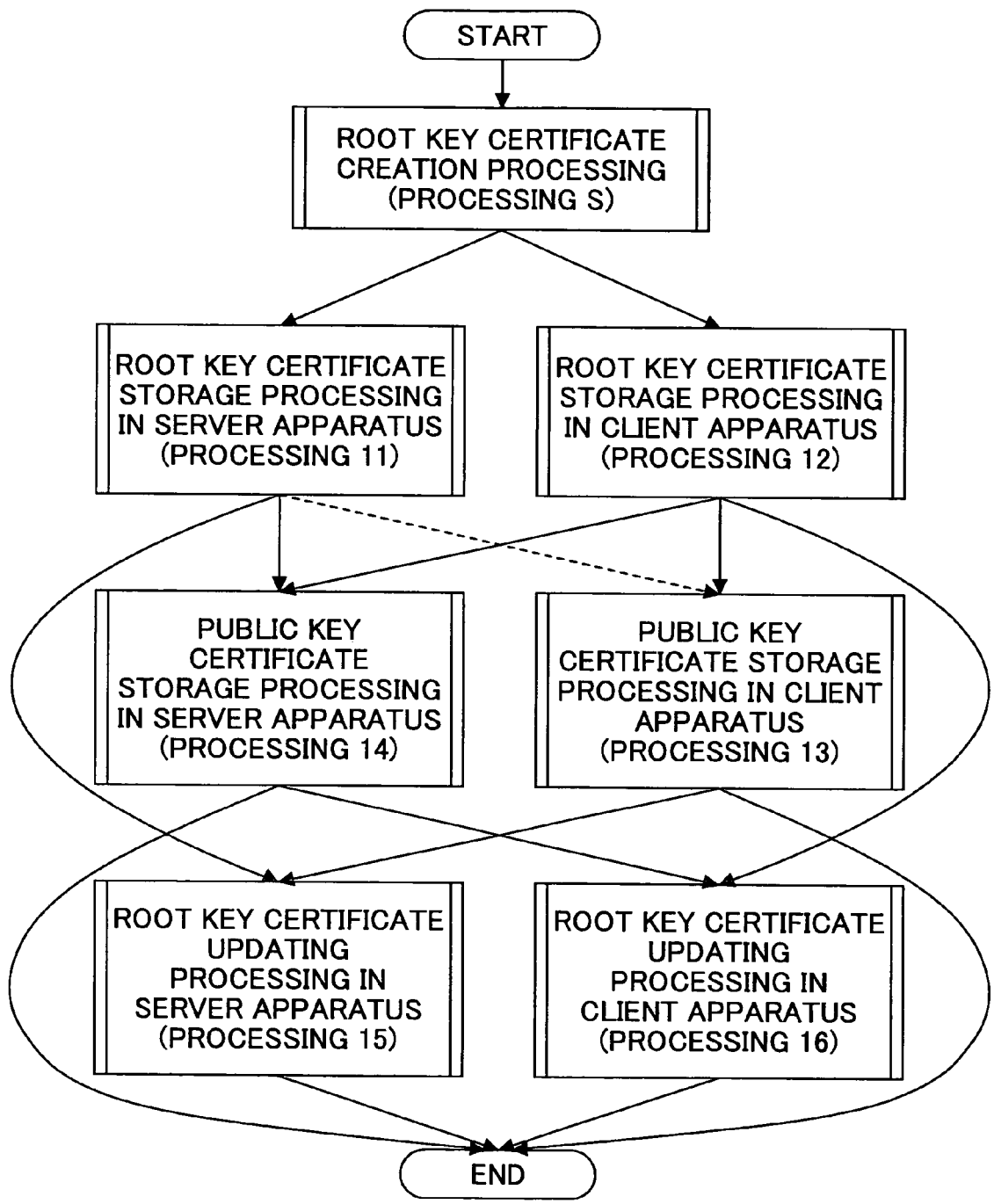
FIG. 23 shows a flow chart illustrating an order of execution of respective processing shown in the sequence diagrams shown in FIGS. 6 and 17 through 22.

Root key updating operation in the digital certificate management system is achieved as a result of processing shown in sequence diagrams in FIGS. 17 through 22 and the processing S described above with reference to FIG. 6 being executed in an order shown in a flow chart shown in FIG. 23. First, the contents of the processing in the sequence diagrams in FIGS. 17 through 22 are described, and after that, the execution order thereof is described with reference to FIG. 23. The processing shown in the respective figures are performed as a result of the respective CPUs in the certificate management apparatus 10, the server apparatus 30 and the client apparatus 40 executing required control programs.

Figure 17:
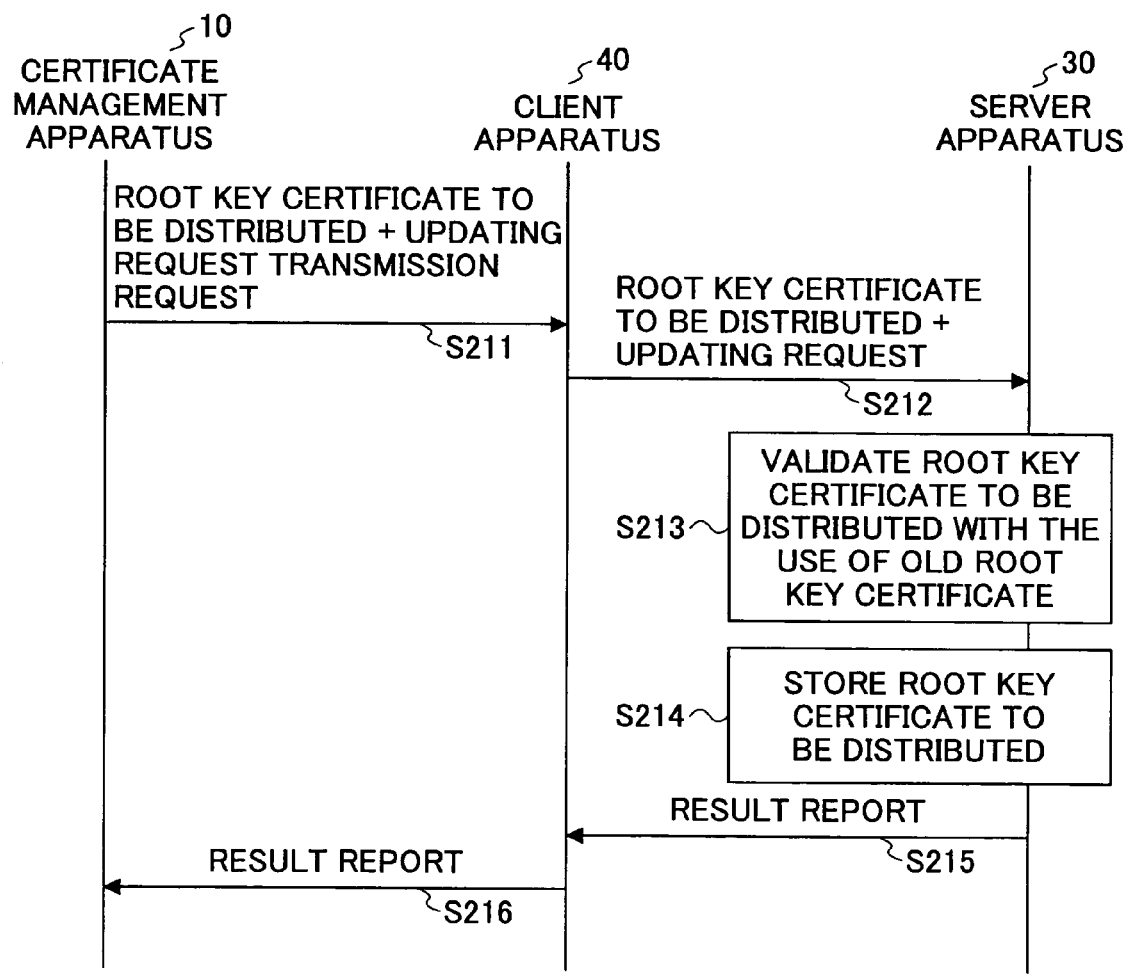
FIG. 17 shows a sequence diagram illustrating a root key certificate storage processing in the server apparatus in root key updating processing in the digital certificate management system shown in FIG. 16.

With reference to FIG. 17, processing 11, i.e., root key storage processing in the server apparatus is described next.

This processing is same as the processing 1 shown in FIG. 7. However, since the client apparatus 40 directly communicates with the certificate management apparatus 10, the procedure differs somewhat.

That is, in Step S211, the certificate management apparatus 10 transmits to the client apparatus 40 the root key certificate to be distributed created in Step S102 in FIG. 6 as well as an updating request transmission request requesting the client apparatus 40 to transmit an updating request therefor. In response thereto, the client apparatus 40 transmits the root key certificate to be distributed as well as the updating request therefor to the server apparatus 30 in Step S212. Since the client apparatus 40 can request the server apparatus 30 for communication therebetween, it is not necessary to wait for a communication request as in the case of FIG. 7.

Through the above-described processing, the root key certificate to be distributed and the updating request therefor are transmitted to the server apparatus 30 from the certificate management apparatus 10 via the client apparatus 30. In Step S212, the CPU 11 in the certificate management apparatus 10 acts as a second transmitting unit.

When receiving the updating request transmitted in Step S212, the server apparatus 30 validates the root key certificate to be distributed with the use of the old root key certificate in Step S213. When it is validated, the root key certificate to be distributed is stored in the certificate storage part 31 in Step S214. The processing is completely same as that in Steps S112 and S113 in FIG. 7.

After that, the server apparatus 30 returns a result report as a response to the updating request to the certificate management apparatus 10. However, actually, it is first transmitted to the client apparatus 40 once, which then transmits it to the certificate management apparatus 10 in Step S216 acting as an intermediary. Since this result report can be transmitted as a response to the updating request received from the client apparatus 40, it is not necessary to wait for a communication request coming from the client apparatus 40.

Figure 18:
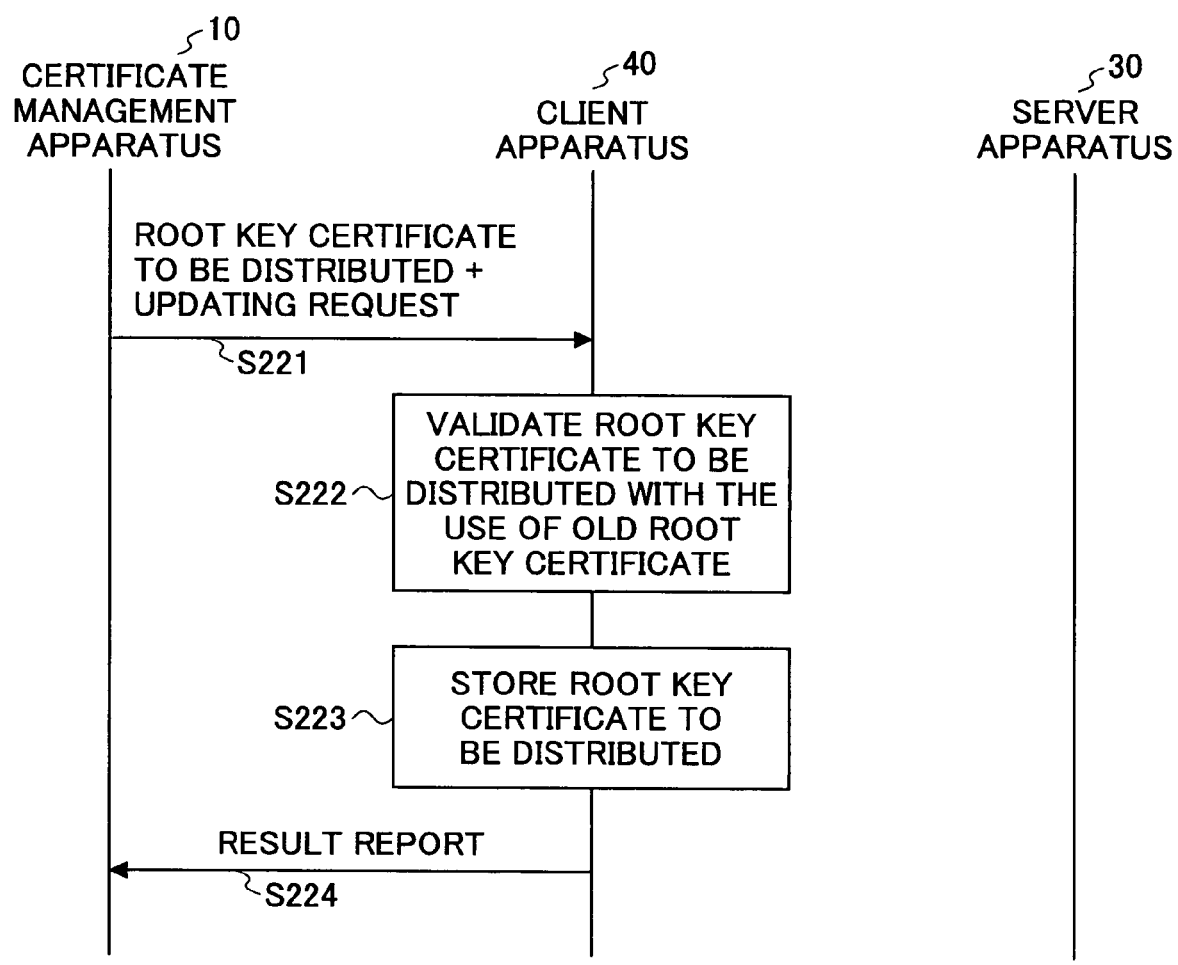
FIG. 18 shows a sequence diagram illustrating root key certificate storage processing in the client apparatus in the same.

Next, with reference to FIG. 18, processing 12, i.e., root key certificate storage processing in the client apparatus is described.

A purpose of this processing is same as that of the processing 2 in FIG. 8. However, the procedure is somewhat different, as in the case of the processing 11 described above.

First, in Step S221, the certificate management apparatus 10 transmits the root key certificate to be distributed created in Step S102 in FIG. 6 as well as an updating request therefor to the client apparatus 40. In this processing, the CPU 11 in the certificate management apparatus 10 acts as a first transmitting unit.

When receiving this request, the client apparatus 40 uses the old root key certificate for validating the root key certificate to be distributed in Step S124. When it is validated, the root key certificate to be distributed is stored in the certificate storage part 41 in Step S125. The processing is same as the processing in Steps S124 and S125 in FIG. 8.

After that, the client apparatus 40 returns a result report to the certificate management apparatus 10 as a response to the updating request in Step S224.

Figure 19:
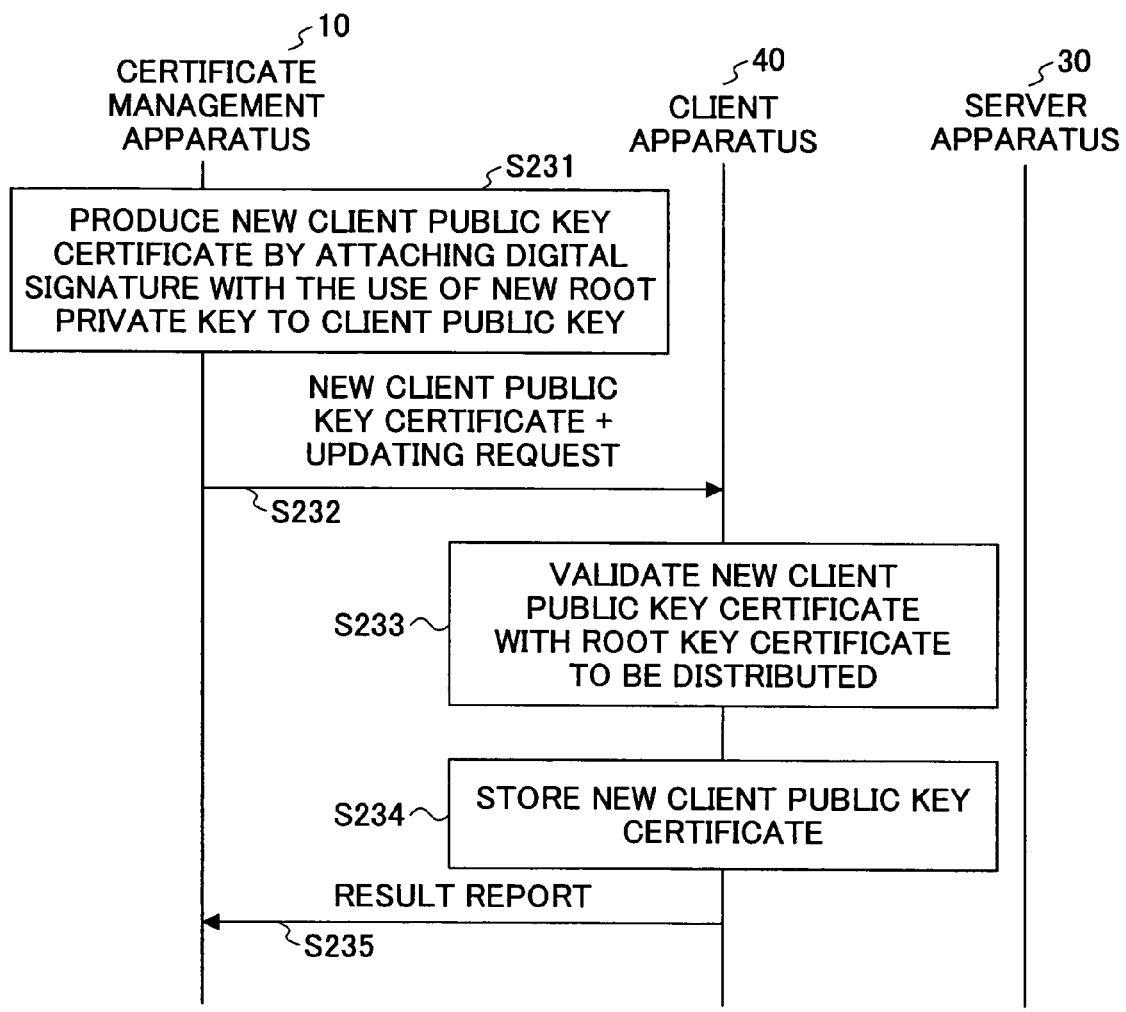
FIG. 19 shows a sequence diagram illustrating public key certificate storage processing in the client apparatus in the same.
Figure 20:
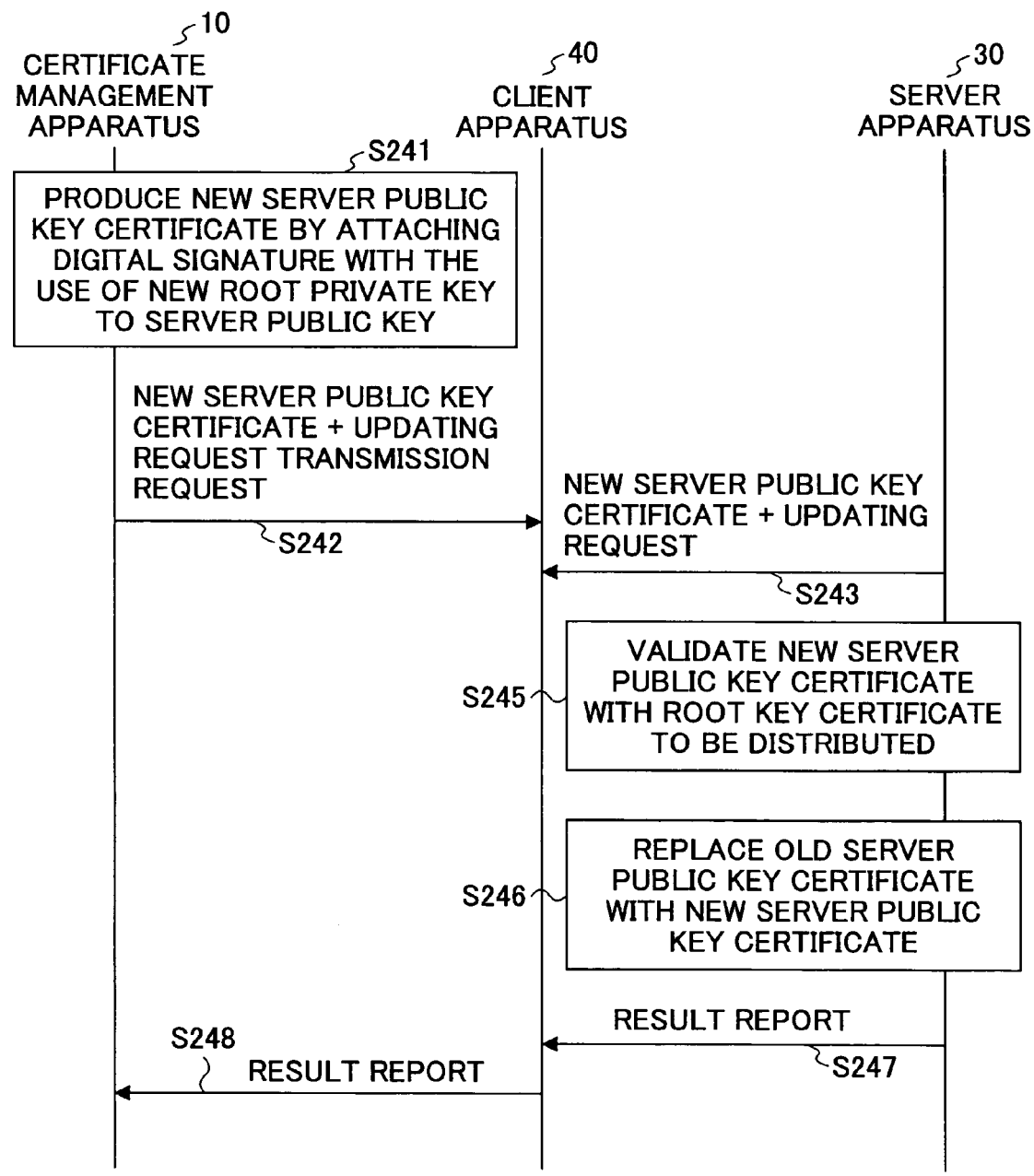
FIG. 20 shows a sequence diagram illustrating public key certificate storage processing in the server apparatus in the same.

FIG. 19 illustrates processing 13, i.e., public key certificate storage processing in the client apparatus is descried; FIG. 20 illustrates processing 14, i.e., public key certificate storage processing in the server apparatus; FIG. 21 illustrates processing 15, i.e., root key certificate updating processing in the server apparatus; and FIG. 22 illustrates processing 16, i.e., root key certificate updating processing in the client apparatus. The processing of these figures has the same purposes as those of the processing 3 through the processing 6 described above with reference to FIGS. 9 through 12 for the first embodiment. Only communication procedures are somewhat different along with the difference that the client apparatus 40 instead of the server apparatus 30 directly communicates with the certificate management apparatus 10, in the same manner in the cases of the processing 11 and the processing 12 described above. Thus, the duplicated descriptions are omitted.

The execution timing of the respective processing shown in FIGS. 17 through 22 and the processing S shown in FIG. 6 is managed according to an updating procedure created based on information stored in the configuration storage part 26 by the updating control part 27 in the certificate management apparatus 10. The updating procedure is one illustrated in the flow chart shown in FIG. 23. That is, when the root key is to be updated, first the processing S in FIG. 6 is executed, and after that the processing 11 through the processing 16 are executed.

As can be seen from FIG. 23, the root key updating processing according to the second embodiment is one in which the respective processing corresponding to that in the first embodiment shown in FIG. 13 is executed in the same order. Also, the advantage obtained therefrom is the same as that obtained from the first embodiment.

That is, in this digital certificate management system according to the second embodiment, by execution of the root key updating processing in such a procedure, a root key can be updated under automatic control without affecting authentication processing between the server apparatus 30 and the client apparatus 40, the same as in the first embodiment, even in a case where the certificate management apparatus can directly communicate only with the client apparatus 40 of the client and server system. Accordingly, by applying such a digital certificate management system, without needing a special communication path for updating a root key, a root key can be updated. Accordingly, it is possible to establish a client and server system which performs authentication according to SSL upon performing data transmission, at low costs.

Furthermore, in this embodiment, although the server function part 44 should be provided in the client apparatus 40, there is no part in which a communication request is waited for, in the procedure of the root key updating processing. Accordingly, the processing can be proceeded with quickly, and thus, the processing can be completed within a short time period in comparison.

A digital certificate management system according to a third embodiment of the present invention, including a certificate management apparatus, a client apparatus and a server apparatus both of which configure a client and server system is described next with reference to FIGS. 24 through 27.

This digital certificate management system has a configuration same as that of the first embodiment described above, and thus, duplicated description thereof is omitted, while the digital certificate management system according to the third embodiment performs root key updating processing different from that of the first embodiment.

Root key updating operation in this digital certificate management system is achieved as a result of processing shown in sequence diagrams shown in FIGS. 24 through 27 is executed in this order. The processing shown in the respective figures is achieved as a result of the respective CPUs in the certificate management apparatus 10, the server apparatus 30 and the client apparatus 40 executing required control programs.

Figure 24:
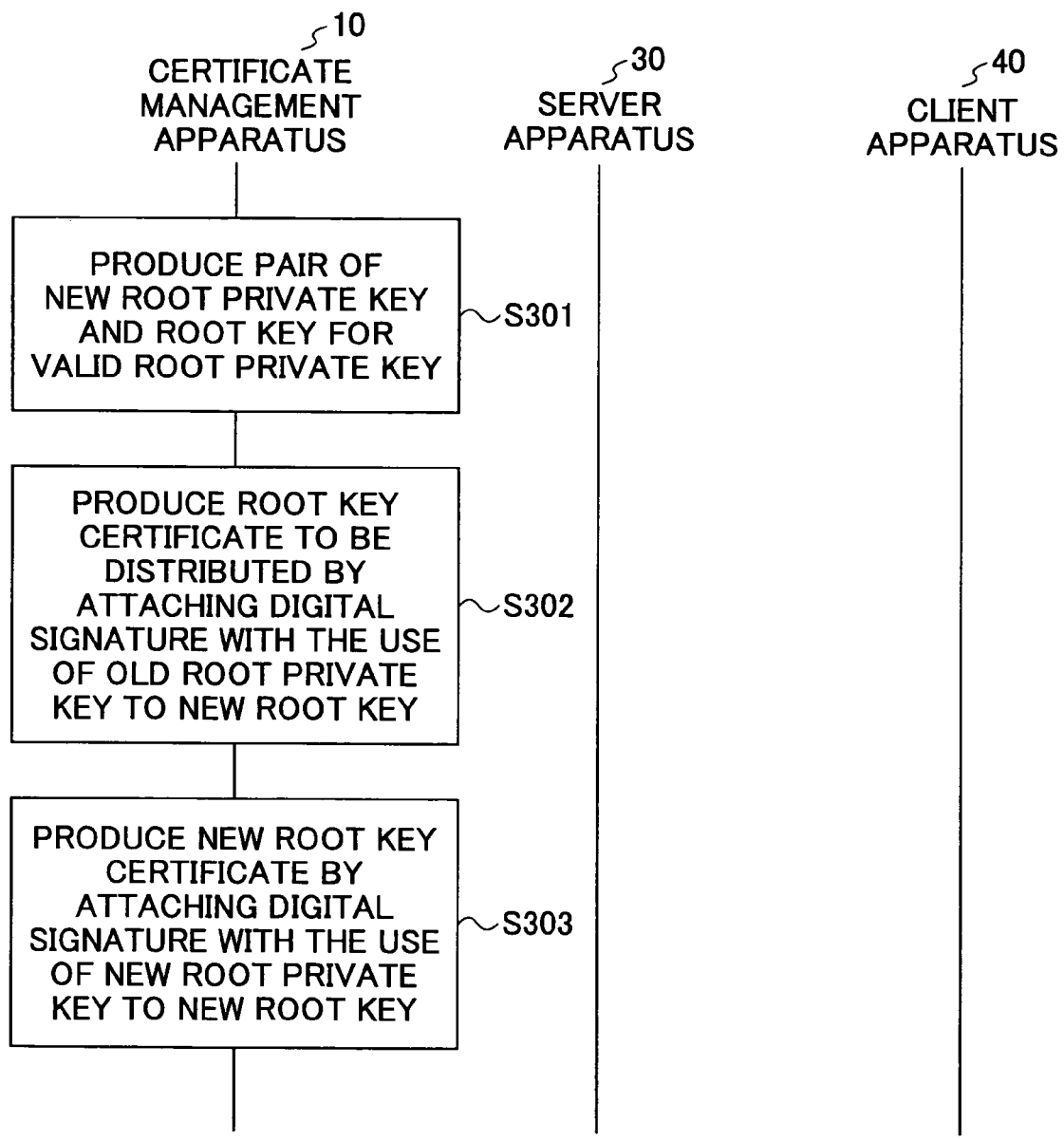
FIG. 24 shows a sequence diagram illustrating a part of root key updating processing in a third embodiment of a digital certificate management system according to the present invention.

When detecting a predetermined root key updating trigger, the certificate management apparatus 10 starts the processing illustrated in the sequence diagram shown in FIG. 24.

The processing T shown in FIG. 24 corresponds to the processing S described with reference to FIG. 6. First, in Steps S301 and S302, the same as in Steps S101 and S102 in FIG. 6, a new pair of root private key and root key are created for a valid root private key, and also, a root key certificate to be distributed, which is a first proof key certificate is created as a result of a digital signature being attached to the new root key with the use of the old root private key.

Figure 11:
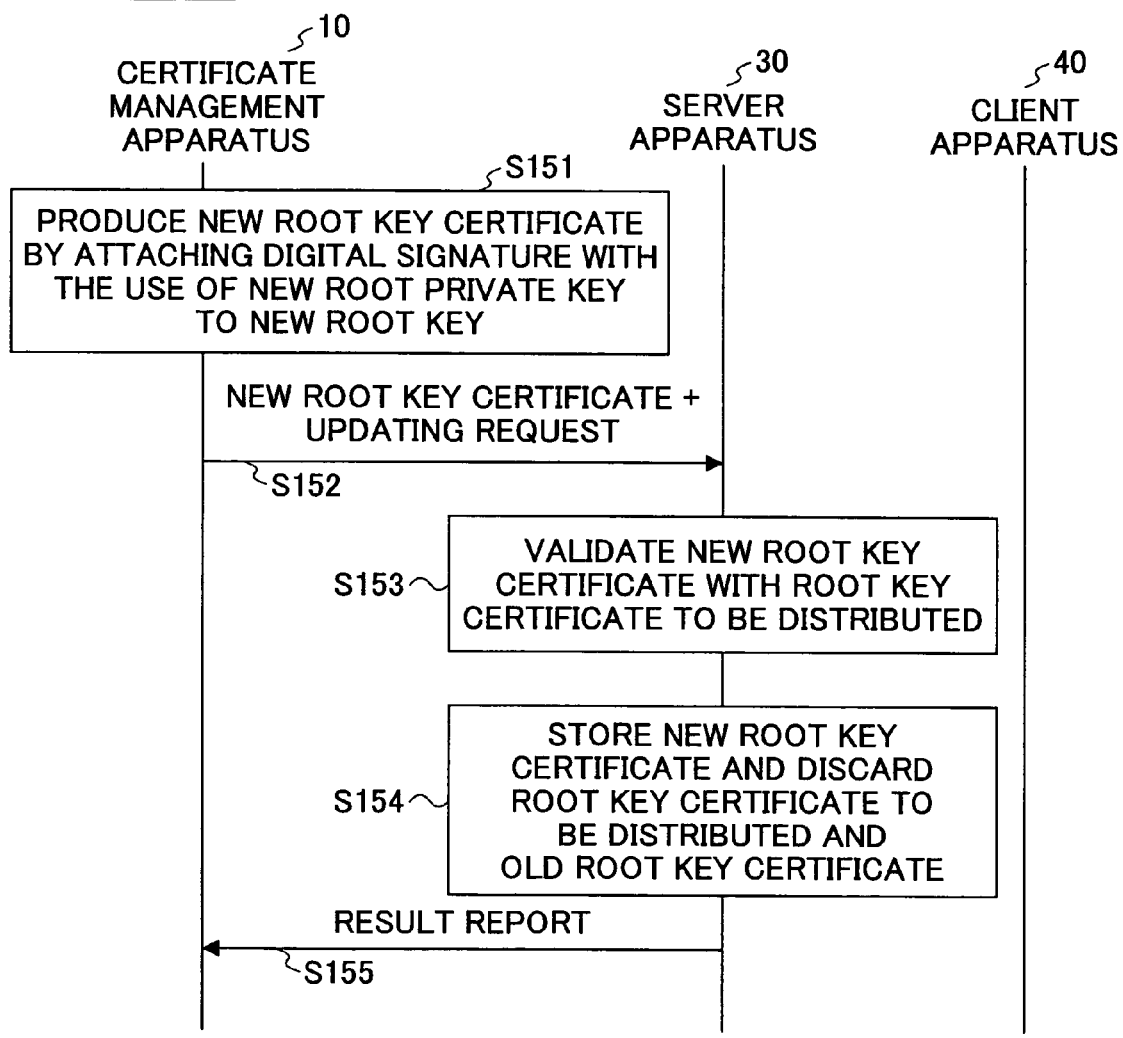
FIG. 11 shows a sequence diagram illustrating root key certificate updating processing in the server apparatus in the same.

Then, in Step S303, the same as in Step S151 in FIG. 11, a new root key certificate, which is a second proof key certificate, is created as a result of a digital signature being attached to the new root key with the use of the new root private key.

Figure 25:
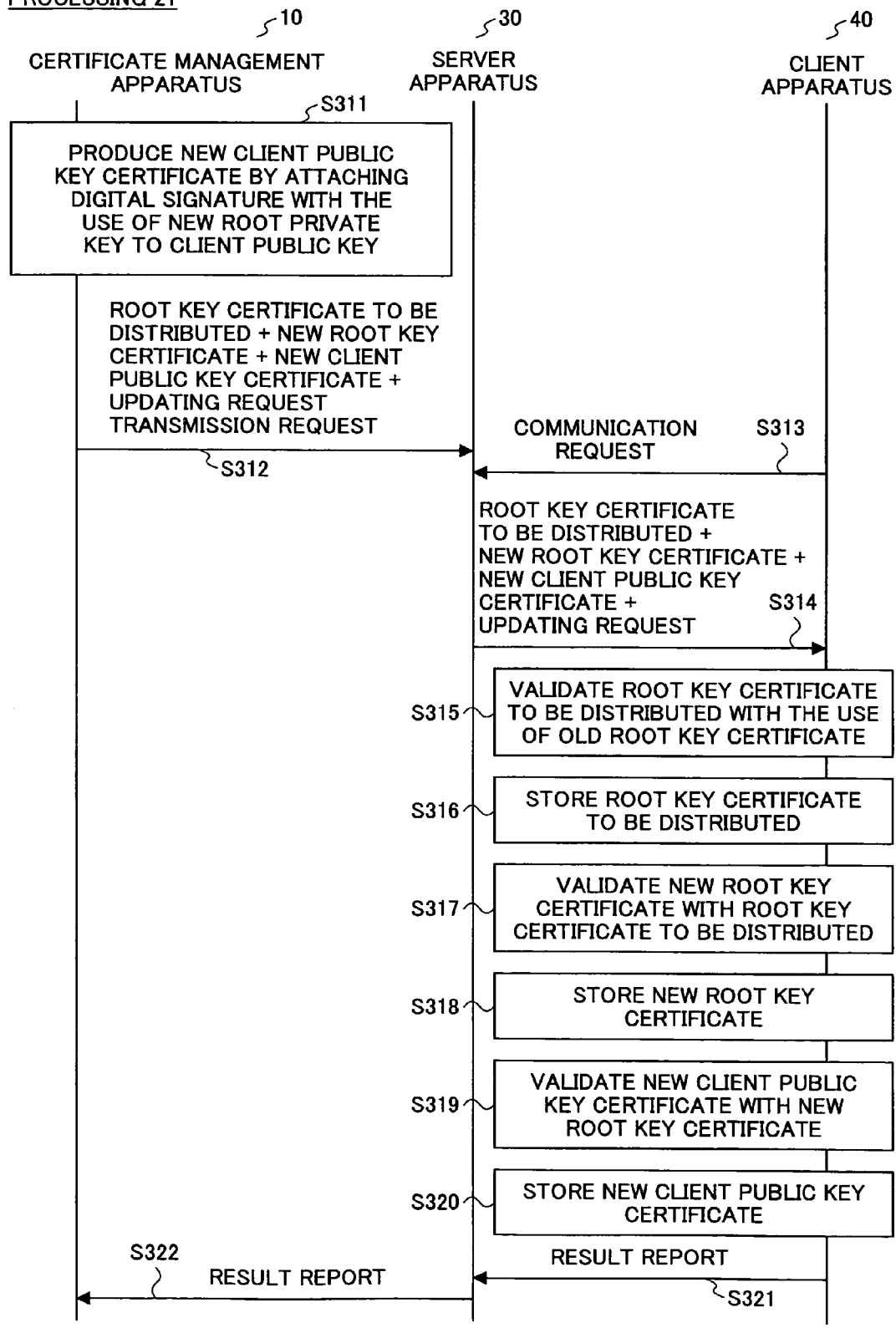
FIG. 25 shows a sequence diagram subsequent to the same shown in FIG. 24.

After that, the processing 21 shown in FIG. 25 is performed. This processing corresponds to processing including the processing 2 described above with reference to FIG. 8 and the processing 3 also described above with reference to FIG. 9 in the description of the first embodiment, and also, a part of the processing 6 described above with reference to FIG. 12.

First, in Step S311, the same as in Step S131 in FIG. 9, the certificate management apparatus 10 creates a new client public key certificate by attaching a digital signature to a client public key with the use of the new root private key.

Then, in Step S312, the certificate management apparatus 10 transmits to the server apparatus 30 the root key certificate to be distributed created in Step S302 in FIG. 24, the new root key certificate created in Step S303 in FIG. 24 and the new client public key certificate created in FIG. 311, as well as an updating request transmission request requesting the server apparatus 30 to transmit an updating request therefor to the client apparatus 40. in response thereto, as in the case of Steps S122 and S123 in FIG. 8, the server apparatus 30 transmits, to the client apparatus 40, as a response to a communication request coming from the client apparatus 40 (in Step S313), these certificates as well as the updating request therefor, in Step S314.

Through the processing, the respective certificates mentioned above and the updating request therefor are transmitted to the client apparatus 40 from the certificate management apparatus 10 via the server apparatus 30. In Step S312, the CPU 11 in the certificate management apparatus 10 acts as a first transmitting unit.

When receiving this request, as in the case of Steps S124 and S125 in FIG. 8, the client apparatus 40 uses the old root key certificate for validating the root key certificate to be distributed, and, when it is validated, the root key certificate to be distributed is stored in the certificate storage part 41, in Steps S315 and S316. At this time, the old root key certificate is not deleted.

Figure 12:
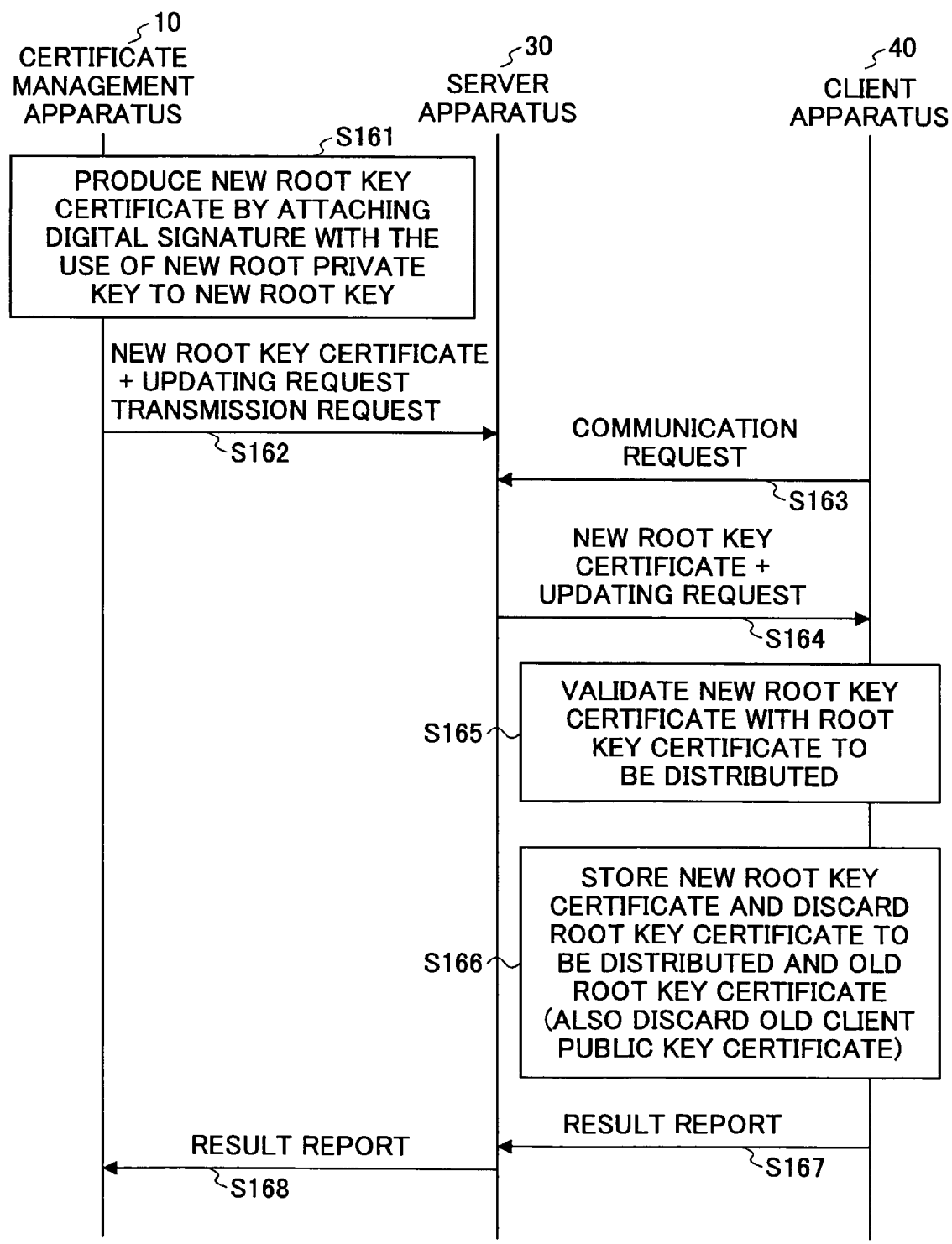
FIG. 12 shows a sequence diagram illustrating root key certificate updating processing in the client apparatus in the same.
Figure 13:
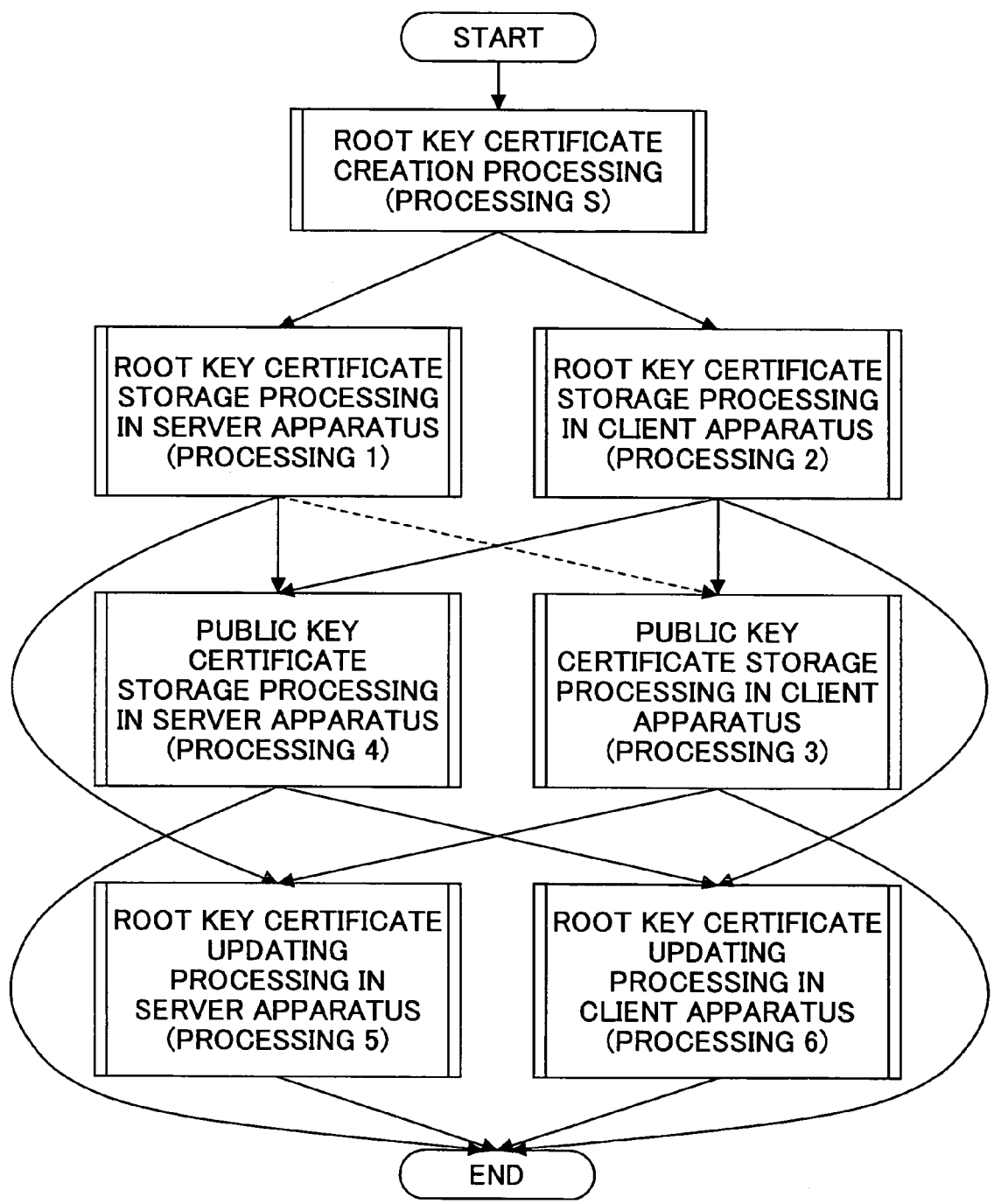
FIG. 13 shows a flow chart illustrating an order of execution of respective processing shown in the sequence diagrams shown in FIGS. 6 through 12.

Further, in Step S317, the same as in the case of FIG. S165 in FIG. 12, the stored root key certificate to be distributed is used for validating the new root key certificate. When it is validated, the new root key certificate is stored in the certificate storage part 41 in Step S318. At this time, the root key certificate to be distributed may be deleted. However, in this case, it is assumed that it is still stored.

In Steps S315 and S316, the CPU in the client apparatus 40 acts as a second client updating unit.

Next, in Steps S319 and S320, the same as in the case of Steps S135 and S136 in FIG. 9, the new client public key certificate is validated, and, when it is validated, the new client public key certificate is stored in the certificate storage part 41. However, since the new root key certificate is already stored, not the root key certificate to be distributed but the new root key certificate may be used for the validation of the new client public key certificate. In Steps S319 and S320, the CPU in the client apparatus 40 acts as a first client updating unit.

At this time the old client public key certificate is not deleted yet. Accordingly, the two client public key certificates are stored in the certificate storage part 41. In this state, when a public key certificate is transmitted to a communication counterpart, the new public key certificate is transmitted first. Since the new root key has not been stored in the server apparatus 30 yet, the server apparatus 30 cannot decode a digital signature in the new public key certificate, and thus a response indicating authentication failure is issued therefrom. However, even in such a case, a communication request is made to be issued again, and in this occasion, the old public key certificate should be transmitted at this time, whereby the old root key can be used to decode a digital signature attached thereto, and thus, authentication can be finally achieved without serious problem.

The processing in Steps S319 and S320 may be performed in prior to the processing in Steps S317 and S318. In this case, the root key certificate is used for validation in Step S319.

After that, the client apparatus 40 returns to the certificate management apparatus 10 a response to the updating request, in Step S321. However, actually, first it is transmitted to the server apparatus 30, and then, is transmitted to the certificate management apparatus from the server apparatus 30 in Step S322.

Figure 26:
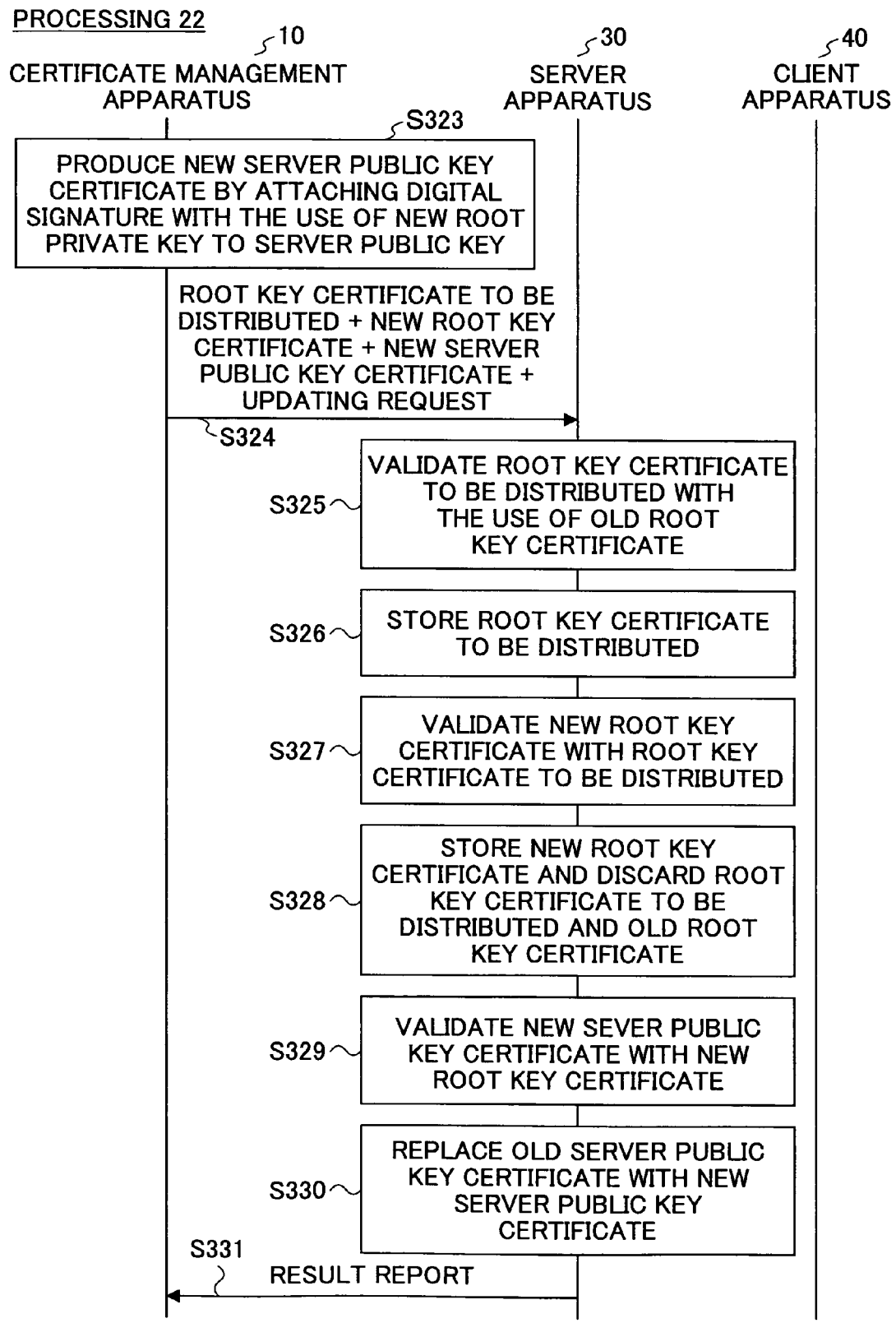
FIG. 26 shows a sequence diagram subsequent to the same shown in FIG. 25.

After that, the processing 22 shown in FIG. 26 is performed. This processing corresponds to processing including the processing 1 shown in FIG. 7 and the processing 4 shown in FIG. 10 for the first embodiment, as well as a part of the processing 5 shown in FIG. 11.

Figure 10:
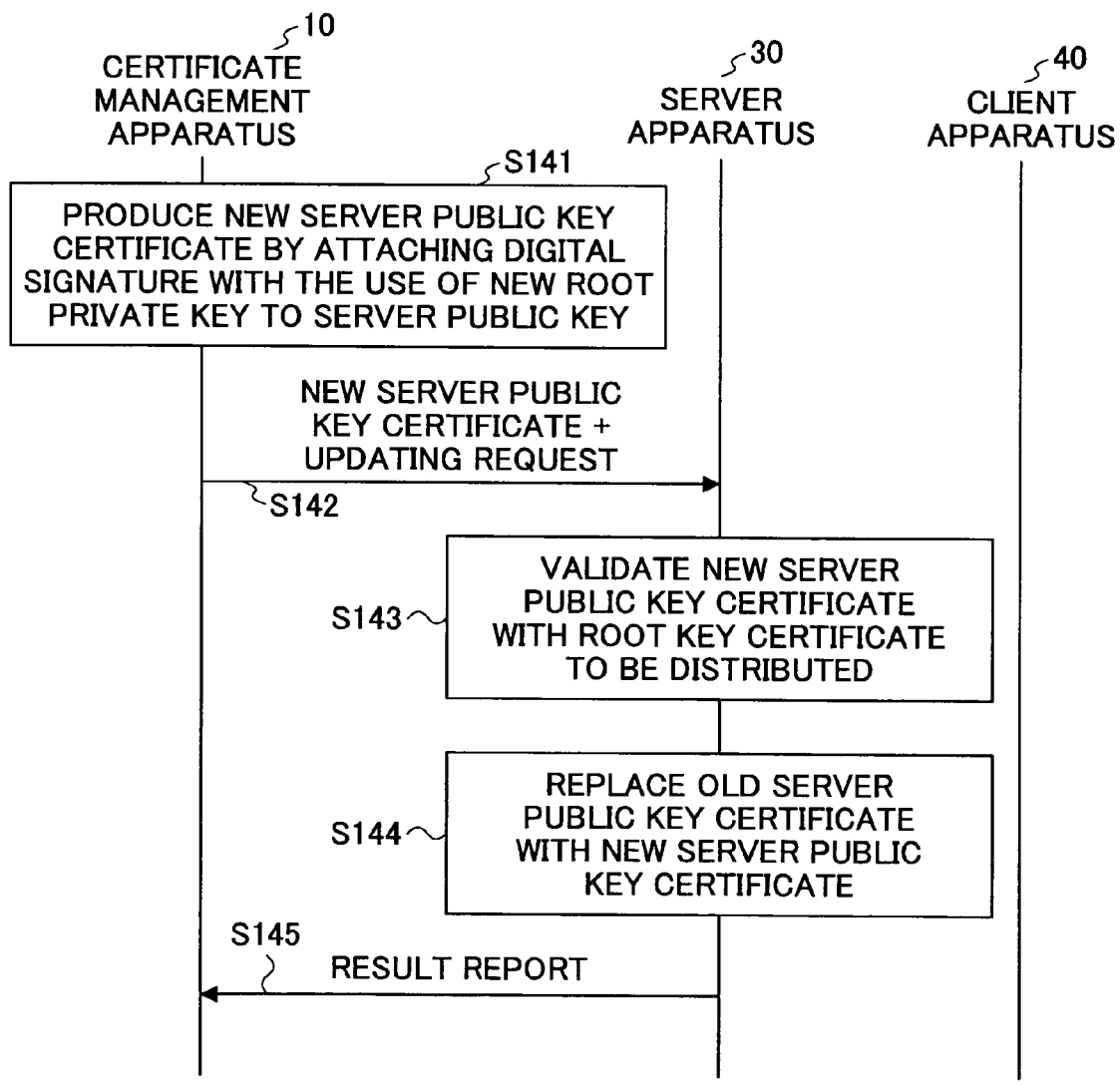
FIG. 10 shows a sequence diagram illustrating public key certificate storage processing in the server apparatus in the same.

First, in Step S323, the same as in Step S141 in FIG. 10, the certificate management apparatus 10 creates a new server public key certificate by attaching a digital signature to a server public key with the use of the new root private key.

Then, in Step S324, the certificate management apparatus 10 transmits to the server apparatus 30 the root key certificate to be distributed created in Step S303 in FIG. 24 and the new server public key certificate created in Step S323, as well as an updating request therefor. In Step S324, the CPU 11 in the certificate management apparatus 10 acts as a second transmitting unit.

When receiving this request, as in Steps S325 and S326, as in the Steps S112 and S113 in FIG. 7, the server apparatus 30 uses the old root key certificate to validate the root key certificate to be distributed, and when it is validated, the root key certificate to be distributed is stored in the certificate storage part 31. At this time, the old root key certificate is not deleted yet.

Further, in Step S327, the same as in Step S153 of FIG. 11, the stored root key certificate to be distributed is used for validating the new root key certificate. When it is validated, the new root key certificate is stored in the certificate storage part 31, and also, the old root key certificate is discarded in Step S328. At this time, since the client apparatus 40 has the new client public key certificate stored therein already, the old root key is not needed. Accordingly, the processing can be simplified by discarding it at this time in comparison to a case where a discarding request may be issued separately. However, it is also possible to issue the discarding request separately.

In Steps S324 through S328, the CPU in the server apparatus 30 acts as a second server updating unit.

Next, in Steps S329 and S330, the same as in the case of Steps S143 and S144 in FIG. 10, the new server public key certificate is validated, and, when it is validated, the new server public key certificate is stored in the certificate storage part 31, and also, is used to replace the old server public key certificate. However, since the new root key certificate has been already stored, not the root key certificate to be distributed but the new root key certificate may be used to the validation. In Steps S329 and S330, the CPU in the server apparatus 30 acts as a first server updating unit.

The reason why the old server public key certificate is thus discarded is same as that described in the description made with reference to FIG. 9 for the first embodiment. Since the new root key certificate has been already stored in the client apparatus at the time of Step S330, authentication processing can be performed without problem when the new server public key certificate is stored in the server apparatus 30.

The processing in Steps S329 and S330 may be performed in prior to the processing in Steps S327 and S328. In this case, validation in Step S329 is performed with the use of the root key certificate to be distributed.

After that, the server apparatus 30 returns a result report to the certificate management apparatus 10 in response to the updating request.

Through the above-described processing, the root key updating is completed in the server apparatus 30.

Figure 27:
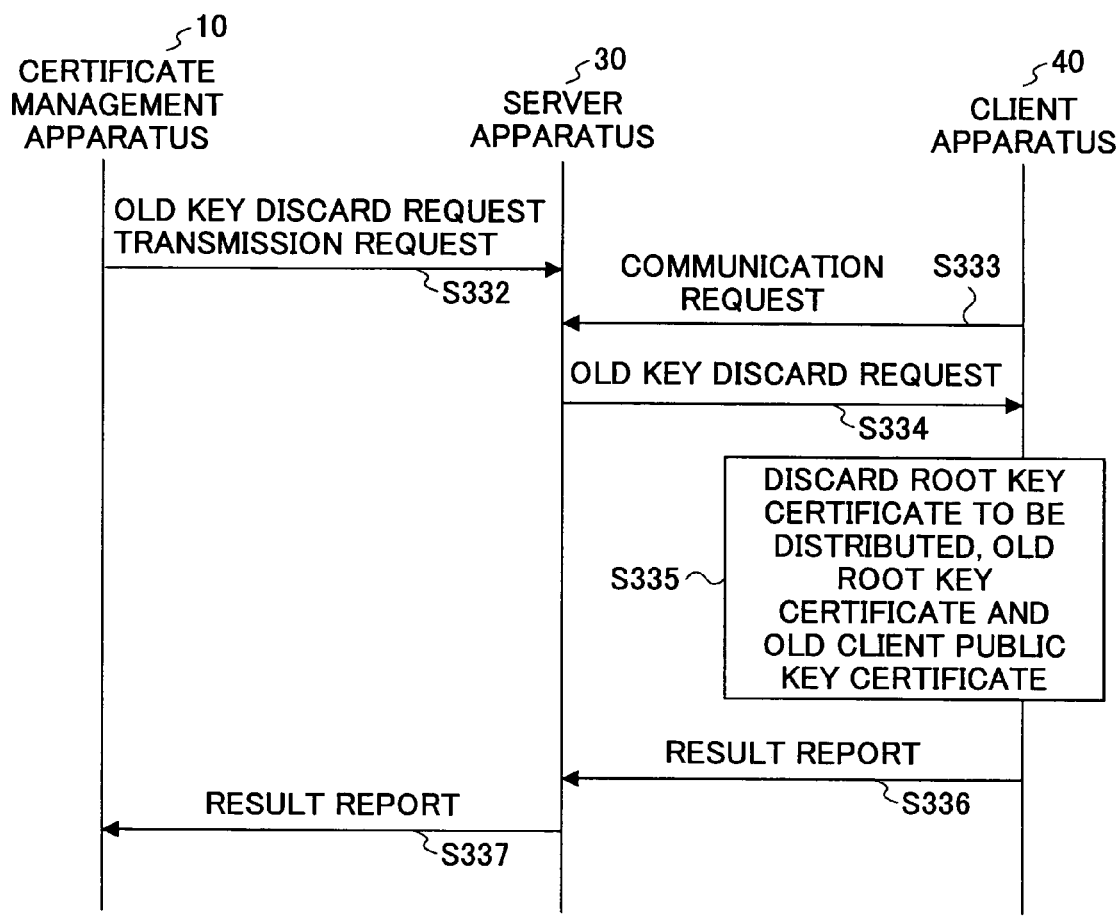
FIG. 27 shows a sequence diagram subsequent to the same shown in FIG. 26.
Figure 28:
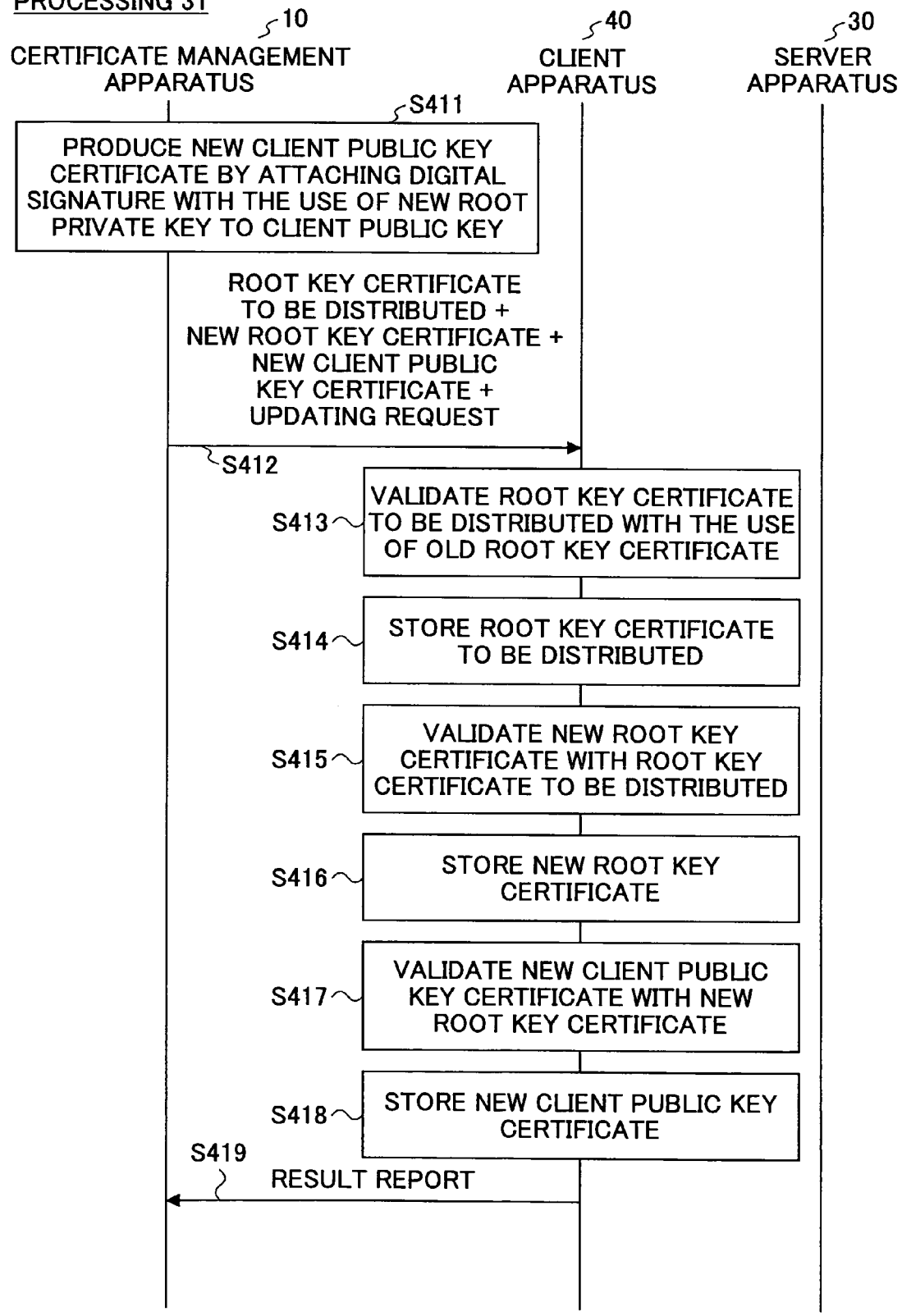
FIG. 28 shows a sequence diagram illustrating root key updating processing subsequent to the same shown in FIG. 24 according to a fourth embodiment of a digital certificate management system according to the present invention.

Then, the processing 23 shown in the sequence diagram shown in FIG. 27 is performed next.

First, in Step S332, the certificate management apparatus 10 transmits to the server apparatus 30 an old key discarding request transmission request requesting the server apparatus 30 to transmit the old key discarding request to the client apparatus 40. In response thereto, the server apparatus 30 transmits the old key discarding request to the client apparatus 40 as a response to a communication request coming from the client apparatus 40 (in Step S333), in Step S334.

After receiving this request, the client apparatus 40 discards, in Step S335, the root key certificate to be distributed, the old root key certificate and the old client public key certificate stored in the certificate storage part 41. Since the server apparatus 30 has the new root key certificate and the new server public key certificate already stored therein at this time, no problem occurs in authentication processing even when these certificates are thus discarded.

After that, the client apparatus 40 returns a result report of the certificate management apparatus 10. However, actually, first, it is transmitted the server apparatus 30 once in Step S336, sand then, it is transmitted to the certificate management apparatus 10 from the server apparatus 30 in Step S337.

Thus, the root key updating processing is finished.

Also in this digital certificate management system, by execution of the root key updating processing in such a procedure, a root key can be updated under automatic control without affecting authentication processing between the server apparatus 30 and the client apparatus 40, as in the first embodiment described above. Accordingly, it is possible to establish a client and server system which performs authentication according to SSL upon performing data transmission, at low costs, since no special communication path is needed for the root key updating.

In this embodiment, since the new client public key certificate is stored in the client apparatus 40 before the new root key is stored in the server apparatus 30, overhead occurs in communication since the server apparatus 30 cannot decode a digital signature in the new client public key certificate until the new root key is stored in the server apparatus 30. However, on the other hand, it becomes possible to achieve the root key updating processing only through total three times of request transmission operations from the certificate management apparatus 10 to the server apparatus 30 (or, to the client apparatus 40 via the server apparatus 30). Accordingly, in comparison to the first embodiment in which the total six times of request transmission operations are needed for achieving the root key updating, the third embodiment is advantageous in terms of management of processing procedure or program designing. In case where the number of server apparatuses and client apparatuses is large for which root key certificates should be updated respectively, this advantage increases accordingly, and thus the present embodiment becomes much superior in this term.

Furthermore, in the processing 21 or the processing 22, by configuring so that necessary ones are stored together at once after the respective certificates are validated, it is possible to effectively reduce the number of times of accessing operations to a non-volatile memory which is provided to store the certificates, and also, to reduce the processing load as well as to increase the processing speed accordingly.

A fourth embodiment of the present invention is described next with reference to FIGS. 24, 28 through 30.

A digital certificate management system according to the fourth embodiment of the present invention includes a certificate management apparatus (digital certificate management apparatus), a client apparatus and a server apparatus, both of which configure a client and server system.

This digital certificate management system has a configuration same as that in the second embodiment described above except the contents of root key updating processing, and thus, duplicated description of the configuration is omitted.

Root key updating operation in this digital certificate management system is same as the operation in the fourth embodiment described above, and is achieved as a result of the processing T as well as processing 31 through processing 33 illustrated in the sequence diagrams shown in FIGS. 24 and 28 through 30 being executed in the stated order. The processing is performed as a result of the CPUs in the certificate management apparatus 10, the server apparatus 30 and the client apparatus 40 executing required control programs.

Furthermore, this processing is same in a part shown in FIG. 24 as in the case of the third embodiment described above, and also, as to parts shown in FIGS. 28 through 30, the relevant processing has the same purpose as that of the processing described above with reference to FIGS. 25 through 27 for the third embodiment. Thus, along with the configuration in which not the server apparatus 30 but the client apparatus 40 directly communicates with the certificate management apparatus 10, the processing procedure is somewhat changed as in the case of the processing 11 and the processing 12 described above with reference to FIGS. 17 and 18 for the second embodiment. Therefore, details of the processing are omitted.

Also in this digital certificate management system according to the fourth embodiment, by execution of the root key updating processing in such a procedure, a root key can be updated under automatic control without affecting authentication processing between the server apparatus 30 and the client apparatus 40, the same as in the third embodiment, even in a case where the certificate management apparatus 10 can directly communicate only with the client apparatus 40 of the client and server system. Accordingly, by applying such a digital certificate management system, without needing a special communication path for updating a root key, the root key can be updated. Accordingly, it is possible to establish a client and server system which performs authentication according to SSL upon performing data transmission, at low costs.

A fifth embodiment of the present invention is next described with reference to FIGS. 31 through 35.

Also a digital certificate management system according to the fifth embodiment includes a certificate management apparatus (digital certificate management apparatus), client apparatuses and a server apparatus both of which configure a client and server system.

Figures 31, 32:
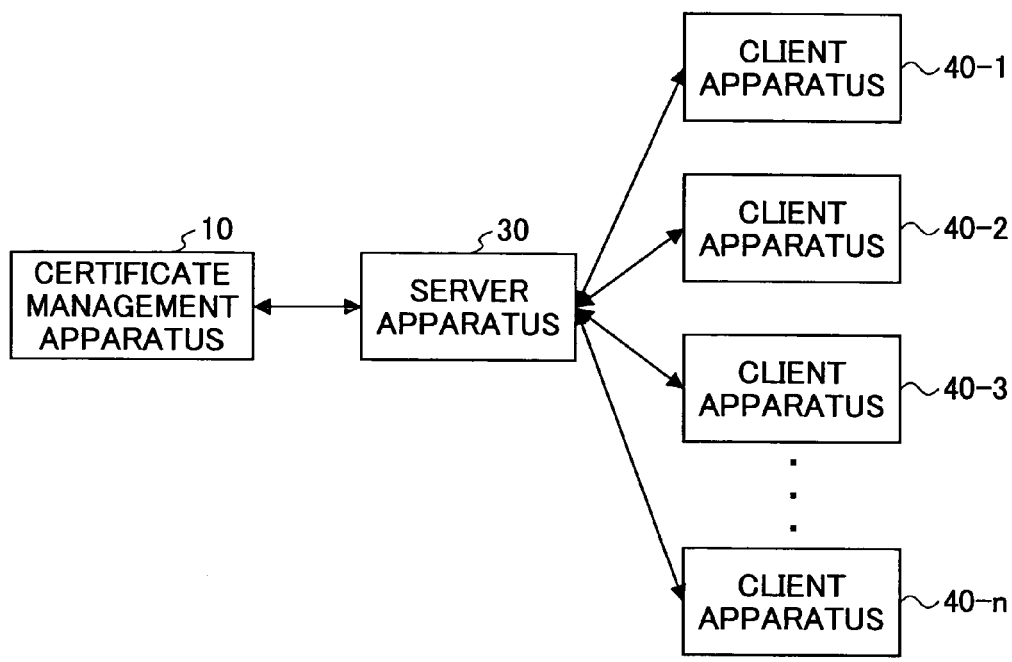
FIG. 31 shows a block diagram illustrating relationship between respective apparatuses included in a fifth embodiment of a digital certificate management system according to the present invention.
FIG. 32 shows an information storage format in each node storing in configuration storage part shown in FIG. 2.

In this digital certificate management system, as shown in FIG. 31, the client and server system includes the single server apparatus 30 and the plurality of client apparatuses 40-1, 40-2, . . . , **40-*n*. As configurations of the certificate management apparatus 10, the server apparatus 30 and each of the client apparatuses 40-1 through 40-*n* are same as those in the above-described first embodiment, respectively, details thereof are omitted. Each of the plurality of client apparatuses 40-1 through 40-*n* has a function of communicating with the server apparatus 30. The server apparatus 30 acts as an intermediary for communication between the certificate management apparatus 10 and each of the client apparatuses 40-1 through 40-*n***.

In this digital certificate management system, in the configuration storage part 26 in the certificate management apparatus 10, information of the respective nodes included in the client and server system is stored in a form shown in FIG. 32. that is, for each node, availability of communication with the digital certificate management apparatus (CA) 10, an ID of a node which acts as a communication counterpart of the relevant node, information as to whether the relevant node acts as a client or a server when communicating with the communication counterpart, information as to the root key used for the communication with the communication counterpart, and information indicating updating states of the root key certificate and the public key certificate for the communication counterpart. The 'communication counterpart' means a counterpart with which data transmission is performed after authentication is performed therefor. Although not shown, it is possible that, as information for each node, an ID of the root key certificate or the public key certificate is stored together with validity due term thereof.

FIG. 33A shows a specific example of information stored in the form shown in FIG. 32 for the server apparatus 30. That is, as the node ID, 'server apparatus 30' is stored, and also, a fact that it can directly communicate with the certificate management apparatus 10 is stored. As to information of the node which acts as a communication counterpart thereof, information of the client apparatuses 40-1 through 40-n is stored. Further, since the server apparatus 30 acts as a server in communication with each node of communication counterparts, this matter is stored. As to information of the root key used, 'root key A' is stored. Furthermore, assuming that the root key A needs to be updated, this matter is also stored, as shown.

As to each of the client apparatuses 40-1 through 40-n, either one of recording manners shown in FIGS. 33B and 33C, respectively, may be expected. The figures illustrate example assuming that the relevant node is the client apparatus 40-1. In this case, as shown, 'client apparatus 40-1' is stored as information of node ID. Since communication with the certificate management apparatus 10 is achieved via the server apparatus 30, and thus, direct communication is not available therewith, this matter is stored in either one, as shown. However, the recording manners of information concerning the node acting as a communication counterpart are different from one another as shown.

That is, in the example shown in FIG. 33B, since the matter that the server apparatus 30 and the client apparatus 40-1 are communicatable with one another is already stored in as the information concerning the server shown in FIG. 33A, and also whether the relevant node acts as a server or a client is available from this information, no information is stored specifically for the client apparatus 40-1. On the other hand, in the example of FIG. 33C, as information concerning the client apparatus 40-1, the fact that the server apparatus 30 and the client apparatus 40-1 are communicatable with one another is separately stored there.

In the case of the examples of FIG. 33B, the required storage capacity can be effectively reduced accordingly, while in the example of FIG. 33C, it is possible to know the communication counterpart only with reference to the information for the relevant node itself. However, in either case, since information concerning the communication counterpart of the relevant node and the matter as to whether the relevant node acts as a client or a server is stored anywhere, a proof key updating procedure can be determined based thereon.

Root key updating processing in the digital certificate management system in the fifth embodiment is described next.

Figure 35:
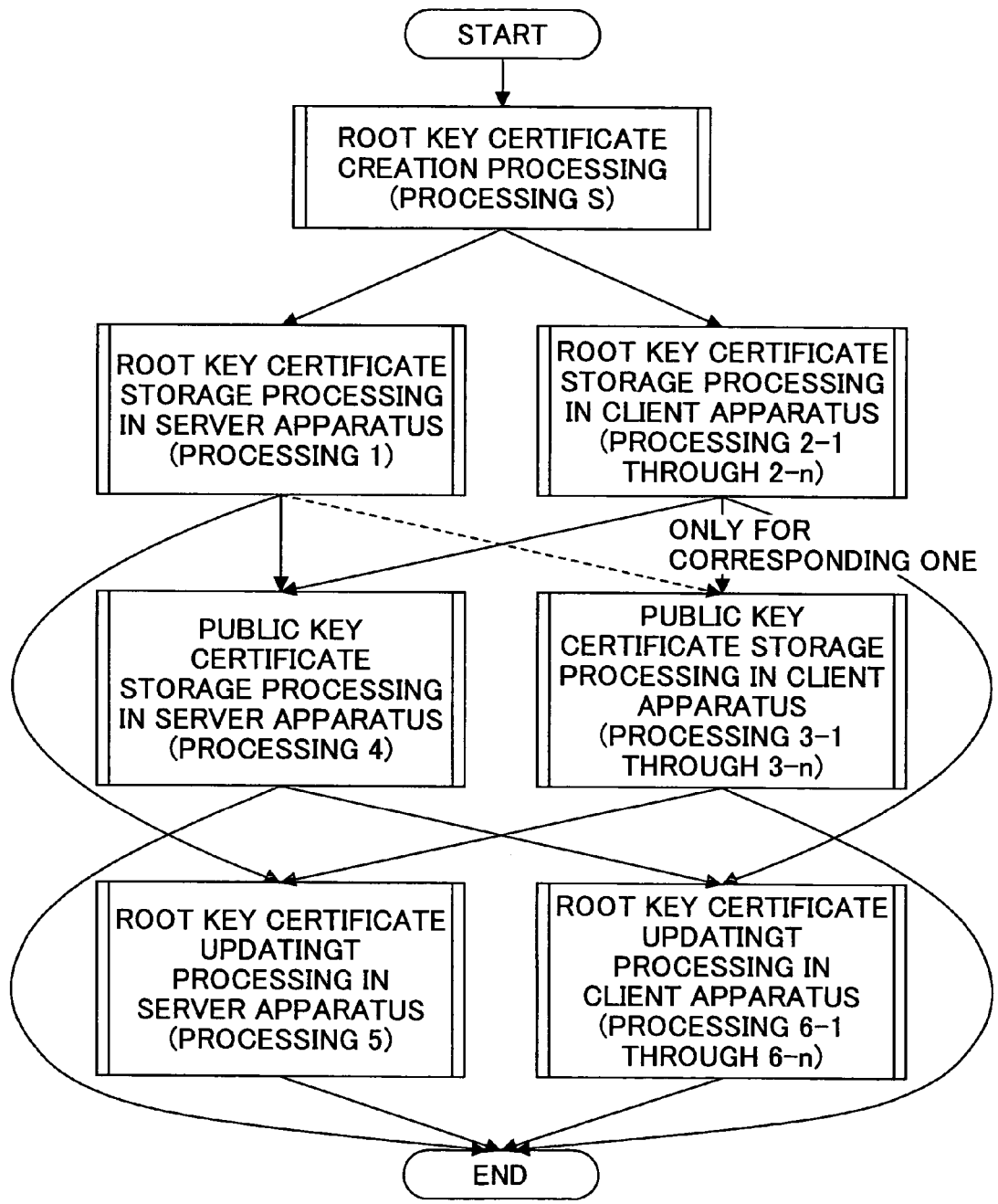
FIG. 35 shows a flow chart corresponding to FIG. 13 illustrating execution order of respective processing in root key updating processing in the fifth embodiment.

In this processing, basically, the processing S and the processing 1 through processing 6 described above for the first embodiment are executed in the order shown in a flow chart of FIG. 35. This processing is achieved as a result of the CPUs of the certificate management apparatus 10, the client apparatuses 40-1 through 40-n and the server apparatus 30 executing required control programs.

However, in this embodiment, since the plurality of client apparatuses are provided, the processing performed on the client apparatuses 40-1 through 40-n are somewhat different from the case of the first embodiment. That is, it is necessary that the root key certificate to be distributed, the new client certificate or the new client key certificate is stored in each of the client apparatuses 40-1 through 40-n, individually.

FIG. 34 shows a sequence diagram which illustrates processing 3-1 performed in a case where public key certificate storage processing shown in FIG. 9 is performed for the client apparatus 40-1. As can be seen therefrom, processing flow itself is same as that of the processing shown in FIG. 9. Respective steps of the processing shown in FIG. 34 correspond to those in the processing shown in FIG. 9 with the step numerals same in the last two digits. However, the new client public key certificate created in Step S531 is one used by the client apparatus 40-1, and also, in Step S532, the updating request transmission request requests the server apparatus 30 to transmit the updating request to the client apparatus 40-1.

The same processing is performed also for each of the other client apparatuses 40-2 through 40-n, where when the other conditions are satisfied, processing for a subsequent client apparatus may be performed in prior to processing to the first client apparatus when the response to the public key certificate storage processing is returned first. Furthermore, it is also possible to perform the public key certificate storage processing for the plurality of client apparatuses together, and, in Step S532, the corresponding respective new client public key certificates and the corresponding respective updating requests are transmitted to the server apparatus 30 in a form of a single message including all of them. Also in this case, the process in Steps S533 through S527 is performed for each of the client apparatuses. As to the result reports in Step S538, they may be transmitted one by one for the respective client apparatuses, separately, from the server apparatus 30, or they may be transmitted to the server apparatus 30 in a form of a single message which includes the result reports from a plurality of the client apparatuses.

Also for the processing 2 shown in FIG. 2 and the processing 6 shown in FIG. 12, the processing is different from the case of the first embodiment in the same point. Since only the single server apparatus 30 is provided in the fifth embodiment, the processing 1, the processing 4 and the processing 5 in the fifth embodiment are the same as that in the first embodiment.

The number '3-1' of the above-mentioned processing 3-1 means that the relevant processing corresponds to the processing 3 performed for the client apparatus 40-1. Also in the subsequent descriptions, the number of the processing is determined as adding the suffix same as the suffix of the number of the relevant apparatus. For example, the processing corresponding to the processing 3 for the client apparatus 40-n is referred to as the processing 3-n, the processing corresponding to the processing 6 for the client apparatus 40-1 is referred to as the processing 6-1, and so forth.

Execution timing for the respective processing in this digital certificate management system is such as that illustrated in the flow chart shown in FIG. 35 in the fifth embodiment. That is, when root key updating is performed, the proceeding S shown in FIG. 6 is performed first, and then, the processing 1 through the processing 6 are performed.

As can be seen from FIG. 35, the root key updating processing according to the fifth embodiment has execution timing same as that in the case of the first embodiment. However, since the processing 2, 3 and 6 should be performed for each client apparatus, the processing becomes somewhat different accordingly.

Specifically, the processing 1 and the processing 2-1 through 2-n are started after the processing S is completed. The processing 3-1 through 3-n are started after the completion of the respective one of the processing 2-1 through 2-n (For example, the processing 3-1 is started after the completion of the processing 2-1). However, it is preferable that this processing is started also after the completion of the processing 1 as shown by a broken arrow. The processing 4 is started after the completion of all the processing 2-1 through 3-*n* as shown the processing 5 is started after the completion of all the processing 3-1 through 3-*n* as shown. The processing 6-1 through 6-*n* is started after the completion of the respective one of the processing 2-1 through 2-*n* and the processing 4. When the processing 3-1 through 3-*n*, the processing 4, the processing 5 and the processing 6-1 through 6-*n* are finished, it can be said that updating of the root keys and the public key certificates is finished.

As to the processing 2-1 through 2-*n*, the processing 4-1 through 4-*n*, and the processing 6-1 through 6-*n*, they may be executed in any order among the client apparatuses as long as the other conditions for starting are satisfied.

In the processing procedure shown in FIG. 35, as a feature of the fifth embodiment, the processing 4 (public key certificate storage processing in the server apparatus) is performed after the completion of all the processing 2-1 through 2-*n* (root key certificate storage processing in the client apparatuses), i.e., after responses indicating that the root key certificates have been stored come from all the client apparatuses 40-1 through 40-*n* which act as communication counterparts of the server apparatus 30. As described above for the first embodiment, since the old one should be discarded when the new server public key certificate is stored for the server apparatus 30, authentication would have problem if the discarding were performed before all the client apparatuses 40-1 through 40-*n* have the new root keys stored therein. Conversely, after all the client apparatuses 40-1 through 40-*n* have the new root key stored therein, no problem occur in authentication processing even when the old server public key certificate is discarded.

Furthermore, it is preferable that, the processing 3-1 through 3-*n* (public key certificate storage processing in the client apparatuses) are performed after the processing 1 (root key certificate storage processing in the server apparatus), i.e., after a response indicating that the root key certificate to be distributed has been stored comes from all the server apparatus (in this case, only the single one) which acts as a communication counterpart of the respective client apparatuses 40-1 through 40-*n* (according to the broken arrow). As described for the first embodiment, if the new root key were not stored in the server apparatus 30 which acts as a communication counterpart when the new client public key certificates are stored in the client apparatuses, overhead occurs in communication until the new root key is stored in the server apparatus 30, and thus, the efficiency would be degraded.

As to the other points, although differences occur somewhat along with the fact that the plurality of the client apparatuses are provided, the processing in the fifth embodiment is almost same as the processing in the first embodiment, and thus, the root keys can be updated under automatic control without affecting authentication processing between the server apparatus 30 and the respective client apparatuses 40-1 through 40-*n*, as in the first embodiment, as a result of the root key updating processing is performed in the above-described procedure.

Accordingly, by applying such a digital certificate management system, root keys can be updated without providing a special communication path. Thereby, it is possible to operate a client and server system performing authentication processing with the use of SSL at low costs, even in a case where a plurality of client apparatuses are applied.

There, it is preferable that the processing 5 (root key certificate updating processing in the server apparatus) is performed after the processing 3-1 through 3-*n*, in other words, after responses come from the client apparatuses 40-1 through 40-*n* acting as communication counterparts of the server apparatus 30 indicating that the new client public key certificates have been stored there. Furthermore, it is preferable that the processing 6-1 through 6-*n* (root key certificate replacement process in the client apparatuses) is performed after the processing 4, i.e., after a response comes from all the server apparatus 30 (in this case, only single server apparatus) which acts a communication counterpart indicating that the new server public key certificate has been stored for the respective client apparatuses 40-1 through 40-*n*.

The processing procedure shown in FIG. 35 is produced by the updating order control part 27 in the certificate management apparatus 10 based on information stored in the configuration storage part 26 and is managed by the same. Specifically, in this embodiment, first, with reference to the information concerning the server apparatus 30 which can communicate with the certificate management apparatus 10 directly, it is seen therefrom that the server apparatus 30 acts as a server, and the server apparatus 30 is communicatable with the client apparatuses 40-1 through 40-*n*. also, it is seen that the root key A is commonly used for communication with all these nodes, and updating thereof is needed. Furthermore, with reference to the information concerning the respective client apparatuses 40-1 through 40-*n*, there are no other nodes in the client and server system. Then, from the information, the updating procedure can be produced appropriately.

That is, first, the server apparatus 30 and the client apparatuses 40-1 through 40-*n* are made to store the root key certificate to be distributed, and after all this processing is finished, the server apparatus 30 is made to store the new server public key certificate, . . . , and so forth. Thus, an execution order of respective processing necessary for updating, such as that to satisfy the requirements shown in FIG. 35, should be determined. Alternately, it is also possible to determine the updating procedure to perform control such as that to satisfy execution requirements determined for each of the respective processing such that all the processing 1 and processing 2-1 through 2-*n* should be completed before execution of the processing 4, or such.

Variant embodiments of the above-described fifth embodiment are next described with reference to FIGS. 36 through 38.

In the fifth embodiment described above, the root key updating processing is performed according to the procedure shown in FIG. 35. This processing procedure defines the requirements which are the minimum necessary ones. When only these requirements are satisfied, the amount of information to be managed for determining execution order of respective processing, progress state management, and so forth, may increase to some degree. Alternatively, the root key updating processing may be executed according to a procedure shown in FIG. 36 or a procedure shown in FIG. 37 instead. The meaning of each arrow in these figures is same as that in the case of FIG. 35.

Figure 36:
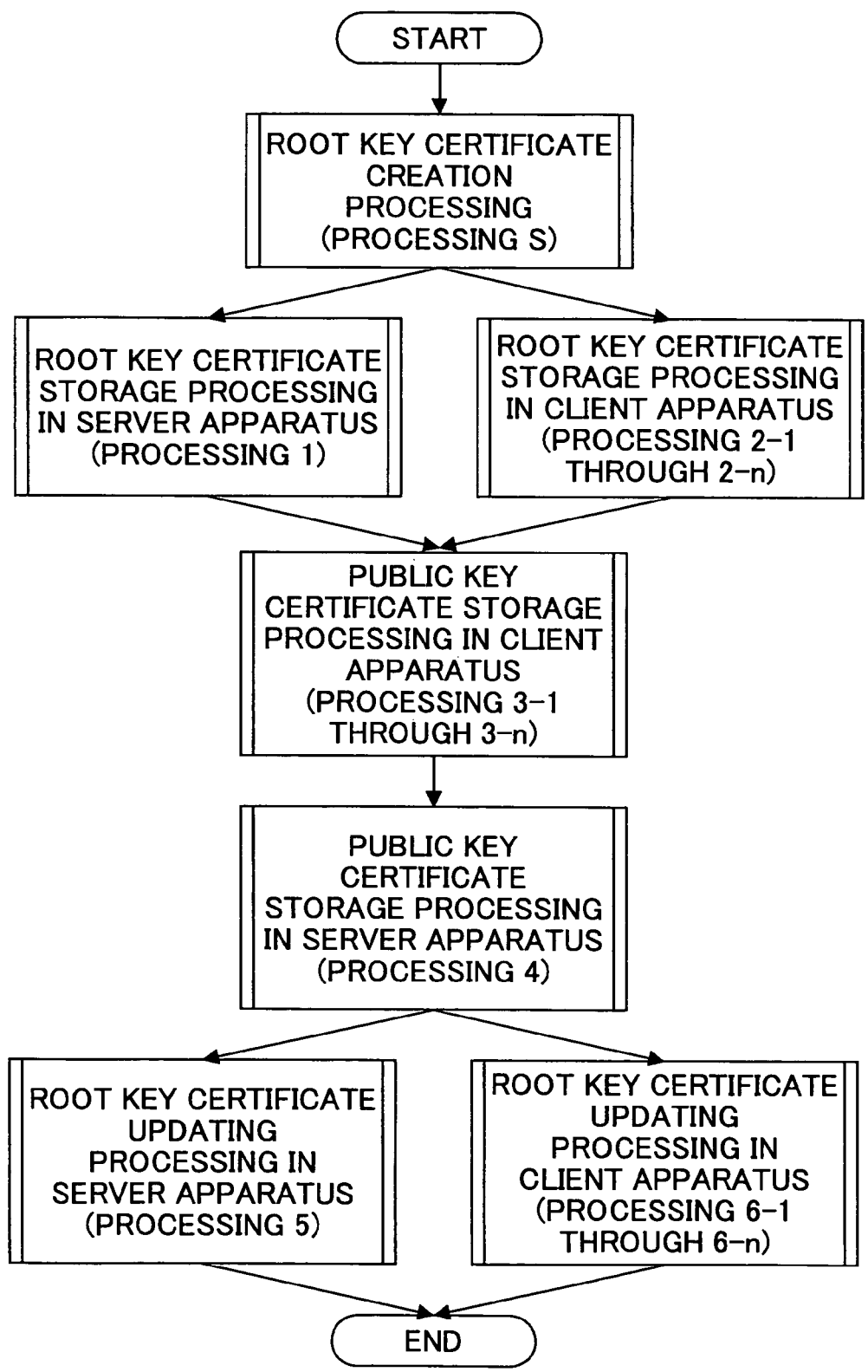
FIG. 36 shows a flow chart illustrating execution order of respective processing in root key updating processing in a variant embodiment.

In an example shown in FIG. 36, the processing 1 and the processing 2-1 through 2-*n* are started after the completion of the processing S, and the processing 3-1 through 3-*n* is started after the completion of the entire processing S, 1 and 2-1 through 2-*n* as shown. The processing 4 is started after the completion of the processing 3-1 through 3-*n*. The processing 5 and the processing 6-1 through 6-*n* are started after the completion of the processing 4. After the completion of all the processing 5 and the processing 6-1 through 6-*n*, it can bb said that updating of the root keys and the public key certificates has been finished.

Thereby, it is not necessary to monitor execution state of the processing 1 or the processing 2 for execution of the processing 5 or the processing 6. This is because, after the processing 4 is completed, it can be proved that the processing 1 and the processing 2 have been completed, from the execution requirement for the processing 4. Also, for execution of the processing 4, only the completion of the processing 3-1 through processing 3-*n* should be proved. Thus, management for progress state of the processing can be effectively simplified.

Also when determining execution order of the respective processing, it is necessary to only determine that, after all the nodes are made to store the new root key certificates, the new public key certificates are stored in the order from the client apparatus to the server apparatus. Thus, it is possible to simplify the processing, and thus, it is possible to effectively reduce the development costs for the apparatuses or the control programs.

Figure 37:
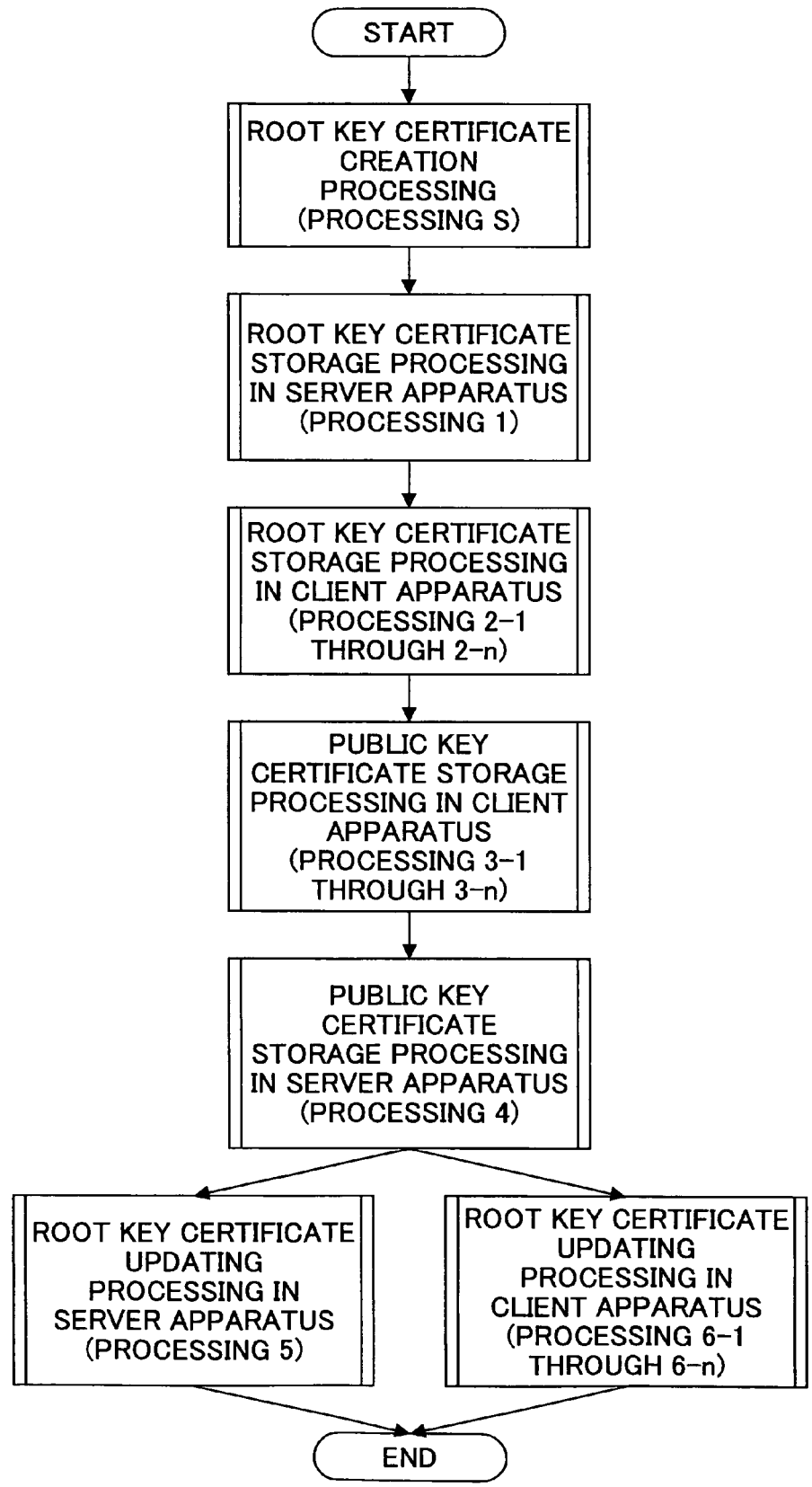
FIG. 37 shows a flow chart illustrating execution order of respective processing in root key updating processing in another variant embodiment.
Figure 38:
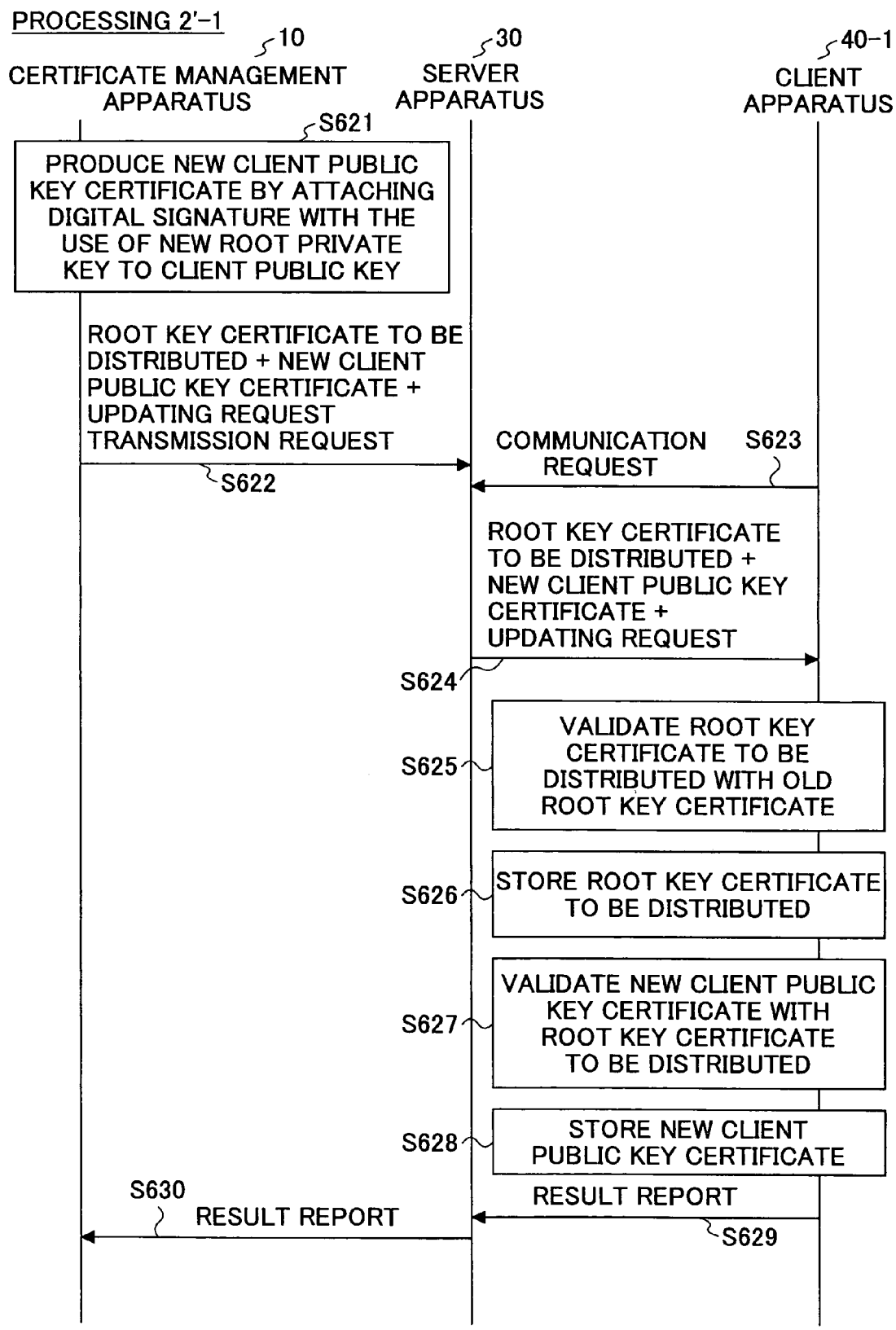
FIG. 38 shows a sequence diagram of processing in case where root key certificate storage processing and public key certificate processing in the client apparatus are performed together in processing shown in FIG. 37.

In the example shown in FIG. 37, the processing S, the processing 1, the processing 2-1 through 2-*n*, the processing 3-1 through 3-*n* and the processing 4 are executed in the stated order. The processing 5 and the processing 6-1 through 6-*n* are started after the completion of the processing 4. Then, when the processing 5 and the processing 6-1 through 6-*n* are all completed, it can be said that updating of the root keys and the public key certificates is finished.

Thereby, it is possible to further simplify the processing also in comparison to the case of FIG. 36.

Even in the procedure shown in each of FIGS. 36 and 37, since the requirements for the execution order including those indicated by the broken lines in FIG. 35 are all satisfied, the same advantage as that in the fifth embodiment described above is obtained in terms of securing the authentication processing function in the client and server system.

In case where the procedure shown in FIG. 37 is applied, it is possible to execute the processing 2-1 through 2-*n* and the processing 3-1 through 3-*n* together for each of the same client apparatuses. FIG. 38 shows a sequence diagram illustrating a processing example in this case. Processing performing for the client apparatus 40-1 in which the root key certificate storage processing and the public key certificate storage processing are performed together is referred to as processing 2'-1.

In this processing, the certificate management apparatus 10 creates a new client certificate for the client apparatus 40-1 as in the Step S531 of FIG. 34, in Step S621. Then, in Step S622, the certificate management apparatus 10 transmits to the server apparatus 30 the root key certificate to be distributed created in Step S102 of FIG. 6, the new client pubic key certificate created in Step 621 and an updating request transmission request requesting the server apparatus 30 to transmit an updating request therefor to the client apparatus 40-1.

In response thereto, the server apparatus 30 transmit these certificates and the updating request to the client apparatus 40-1 as in Steps S122 and S123 of FIG. 8, as a response to a communication request (S623) coming from the client apparatus 40-1, in Step S624.

Through the processing, the respective certificates mentioned above and the updating request are transmitted to the client apparatus 40-1 from the certificate management apparatus 10 via the server apparatus 30. In Step S622, the CPU 11 in the certificate management apparatus 10 acts as a first transmitting unit.

Upon receiving this request, the old root key certificate is used to validate the new root key certificate to be distributed, and after it is validated, the root key certificate to be distributed is stored in the certificate storage part 41 in Steps S625 and S626 as in Steps S124 and S125 of FIG. 8. At this time, the old root key certificate is not deleted. In the processing, the CPU in the client apparatus 40-1 acts as a second client updating unit.

Next, in Steps S627 and S628, as in Steps S135 and S136 of FIG. 9, the root key certificate to be distributed is used to validate the new client public key certificate, and after it is validated, the new client public key certificate is stored in the certificate storage part 41. At this time, the old client public key certificate is not deleted. In this processing, the CPU in the client apparatus 40-1 acts as a first client updating unit. After that, the client apparatus 40-1 returns a result report for the certificate management apparatus 10 as a response to the updating request in Step S629. However, actually, it is once transmitted to the server apparatus 30, and then, it is transmitted to the certificate management apparatus 10 from the server apparatus 30 in Step S630.

By thus performing each of the processing 2-1 through 2-*n* and the respective one of the process 3-1 the 3-*n* together as in the respective one of the processing 2'-1 through 2'-*n*, an advantage is obtained that, as in the third embodiment described above, management of the processing procedure and designing of the program becomes easier. Since the processing in each of the client apparatuses is not one to be performed together, as in the server apparatus, this advantage is still smaller than a seventh embodiment which will be described later. However since each of the client apparatuses 40-1 through 40-*n* are made to store the new public key certificate after the server apparatus is made to store the new root key, it is possible to avoid overhead from occurring in communication.

A sixth embodiment of the present invention is next described with reference to FIGS. 39 through 42.

Figure 39:
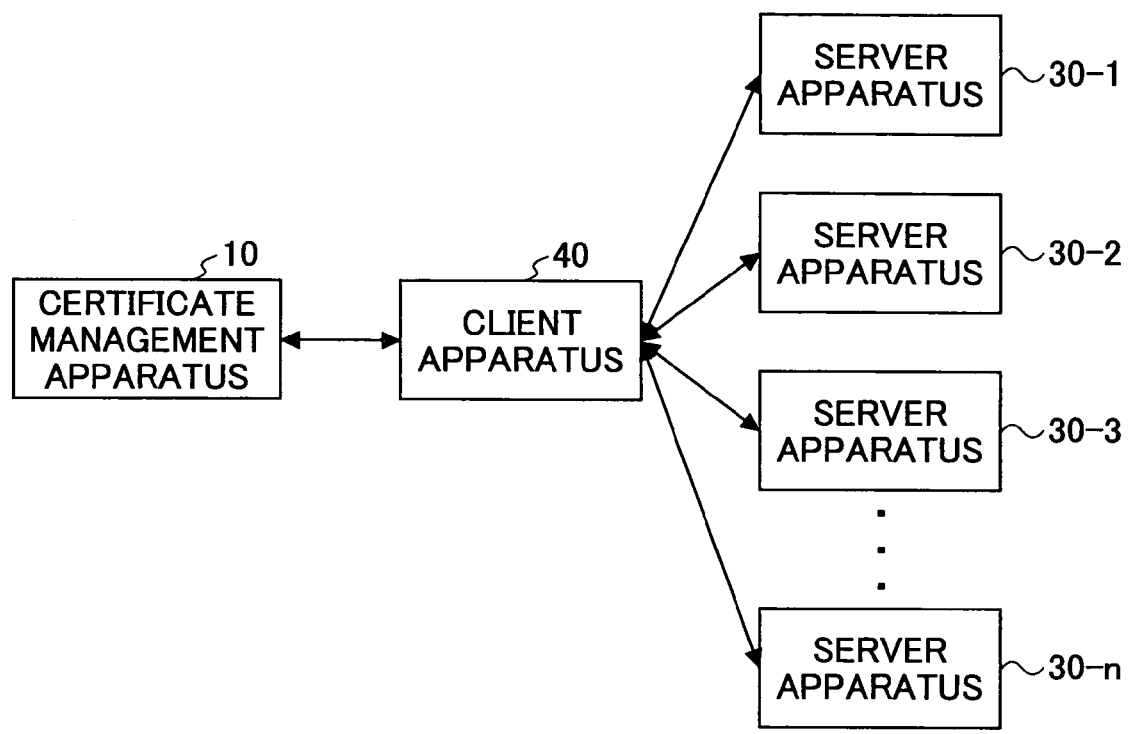
FIG. 39 illustrates relationship among respective apparatuses included in a sixth embodiment of a digital certificate management system according to the present invention.

A digital certificate management system according to the sixth embodiment of the present invention includes, as shown in FIG. 39, a certificate management apparatus (digital certificate management apparatus) and a client apparatus and server apparatuses both of which configure a client and server system.

In this system, the client and server system includes the plurality of server apparatuses 30-1 through 30-*n* as well as the single client apparatus 40. Since the respective apparatuses, i.e., the certificate management apparatus 10, each of the server apparatuses 30-1 through 30-*n* and the client apparatus 40 has the same configuration as those in the second embodiment described above, the details are omitted. In this system, the plurality of server apparatuses 30-1 through 30-*n* are provided as communication counterparts of the client apparatus 40. The client apparatus 40 acts as an intermediary in communication between the certificate management apparatus 10 and the respective server apparatuses 30-1 through 30-*n*.

In the case where the client and server system is established as described above, the configuration storage part 26 in the certificate management apparatus 10 stores information for the respective nodes included in the client and server system as shown in FIGS. 40A, 40B and 40C.

That is, for the client apparatus 40, as shown in FIG. 40A, 'client apparatus 40' is stored as a node ID, and also, information indicating that this node can directly communicate with the certificate management apparatus 10 is stored. Further, as information of nodes which act as communication counterparts of this node, information of the server apparatuses 30-1 through 30-*n* is stored, respectively. Also, since the client apparatus 40 acts as a client when communicating with these communication counterparts, this matter is also stored. As information of a root key used, 'root key A' is stored there. Also information indicating that the root key A needs to be updated is stored.

For each of the server apparatuses 30-1 through 30-$n$, either one of recording manners shown in FIGS. 44B and 44C may be applied, as in the fifth embodiment described above. The figures show examples for the server apparatus 30-1, and as a node ID, 'server apparatus 30-1' is stored, and also, information indicating that it cannot communicate with the certificate management apparatus 10 directly is stored as shown.

With reference to the information, the updating order control part 27 in the certificate management apparatus 10 determines an updating procedure for the proof keys.

In a case of the client apparatus 40, the root keys used for authentication processing may be different from each other for the respective server apparatuses acting as communication counterparts. In this case, updating processing is performed for each group using a common root key. That is, with those described later, the first through eighth embodiments and the variant embodiments thereof are applied for each group, and thereby, updating processing may be performed for each group individually.

Root key updating processing in the digital certificate management system in the sixth embodiment shown in FIG. 39 is described next.

Figure 42:
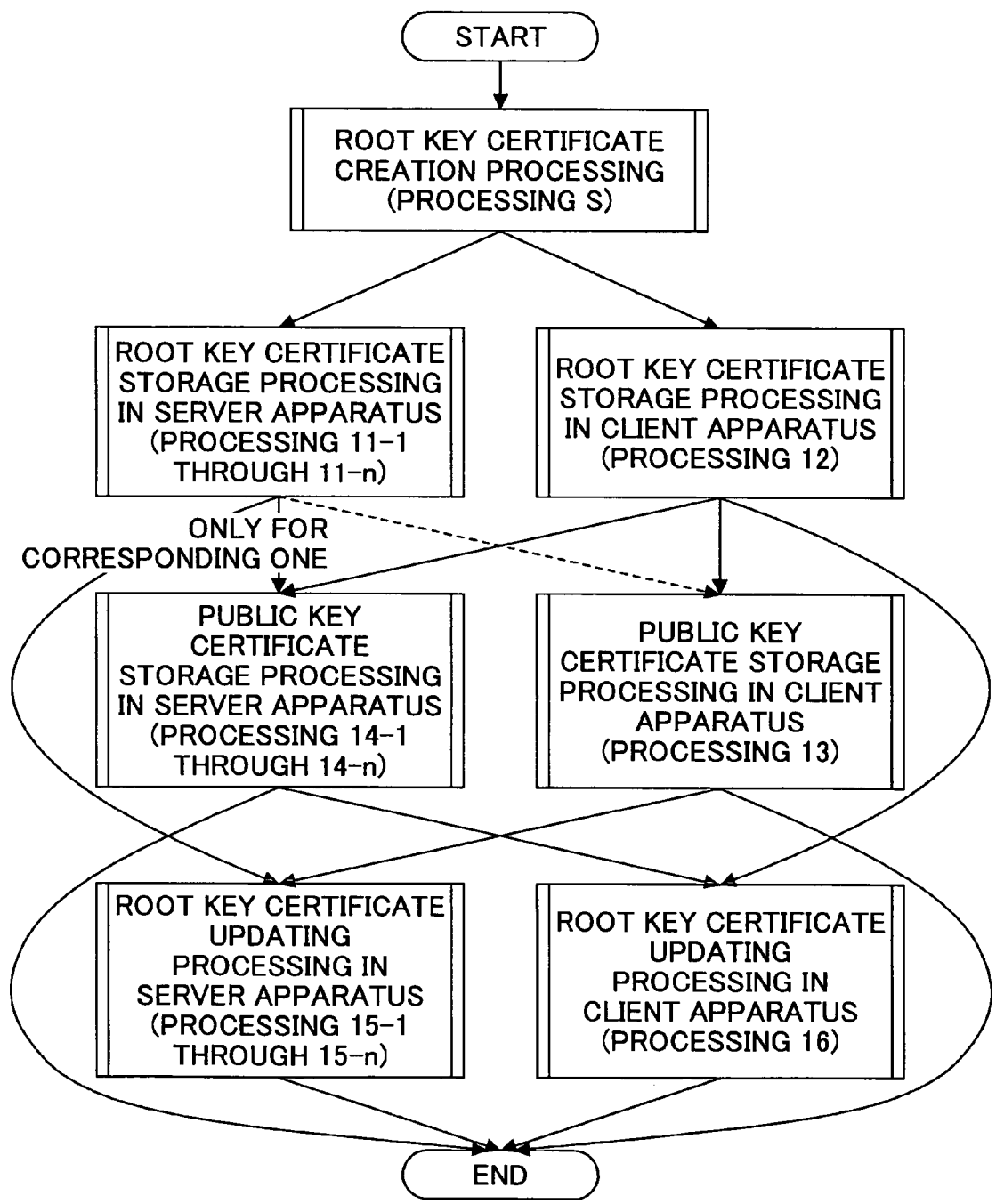
FIG. 42 shows a flow chart, corresponding to FIG. 23, illustrating execution order of respective processing in root key updating processing in the sixth embodiment.

Basically, in this processing, the processing S and the processing 11 through 16 described for the second embodiment above are executed in an order shown in a flow chart shown in FIG. 42. This processing is achieved as a result of CPUs in the certificate management apparatus 10, the server apparatuses 30-1 through 30-$n$ and the client apparatus 40 executing required control programs.

However, in this embodiment, since the plurality of server apparatuses 30-1 through 30-$n$ are provided, processing performed for the server apparatuses becomes somewhat different. In other words, it is necessary that the root key certificate to be distributed, the new client key certificate and the new root key certificate are stored in each of these server apparatuses 30-1 through 30-$n$, individually.

Figure 41:
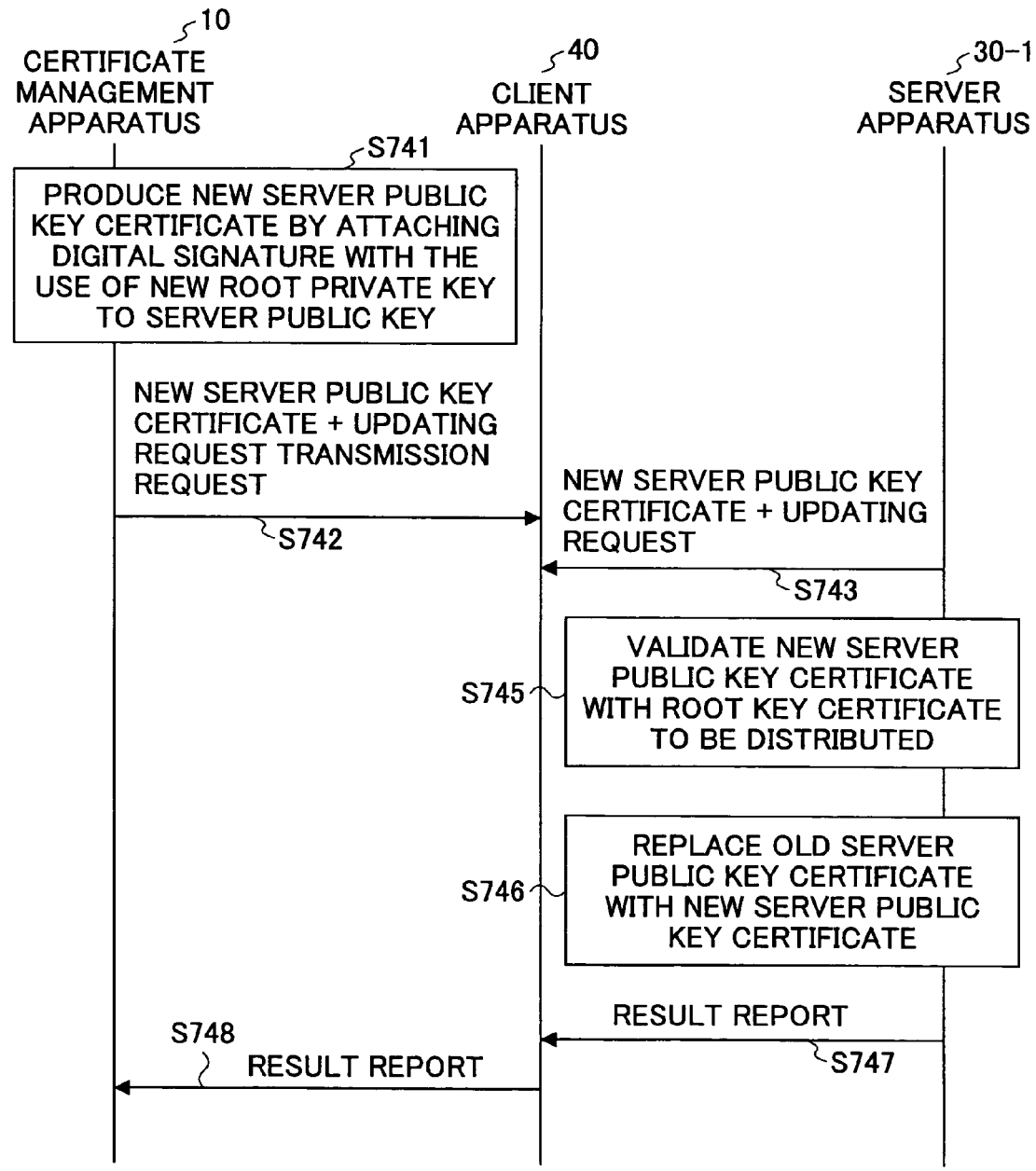
FIG. 41 illustrates points of change performed when the processing according to the second embodiment is applied to the sixth embodiment.

FIG. 41 shows a sequence diagram illustrating processing 14-1 which is public key certificate storage processing in the server apparatus performed for the server apparatus 30-1 as a typical example. As can be seen from this figure, a processing flow is the same as that shown in FIG. 20. Each of the respective processing shown in FIG. 41 corresponds to that shown in FIG. 20 the same in the last two digits of the step number. However, a new client public key certificate created in Step S741 is one used by the server apparatus 30-1, and also, in an updating request transmission request transmitted in Step S742, the relevant updating request is directed to the server apparatus 30-1 as a transmission destination.

Thus, correspondence relationship between the processing 14 shown in FIG. 20 and the processing 14-1 shown in FIG. 41 is the same as that between the processing 3 and the processing 3-1 described above for the fifth embodiment. Also, other different points in comparison to the processing 14 are the same as those described above for the processing 3-1 in the fifth embodiment.

Also for the processing 11 shown in FIG. 17 and the processing 15 shown in FIG. 21, the processing is different from that in the second embodiment in the same points. Since only single client apparatus 40 is provided in the sixth embodiment, the processing 12, 13 and 14 performed for the client apparatus 40 is same as that in the second embodiment.

The number '14-1' of the processing 14-1 means that the relevant processing corresponds to the processing 14 performed for the server apparatus 30-1, and, also for the subsequent descriptions, the suffix is added to the reference numerals in the same way.

Execution timing of the respective processing in this digital certificate management system in the sixth embodiment is such as that shown in a flow chart shown in FIG. 42. That is, when root key updating is to be performed, the processing S shown in FIG. 6 is executed first, and then, the processing 11 through the processing 16 are executed.

As can be seen from FIG. 42, the root key updating processing in the sixth embodiment has execution timing approximately same as that of the second embodiment shown in FIG. 23. However, since the processing 11, 14 and 15 should be performed for each server apparatus, somewhat different processing is performed.

Specifically, the processing 11-1 through 11-$n$ is started after the completion of the processing S. The processing 13 is started after the completion of the processing 12. However, it is preferable that the processing 13 is started further after the completion of the processing 11-1 through 11-$n$. Each of the processing 14-1 through 14-$n$ is started after the completion of the processing 12 and the respective one of the processing 11-1 through 11-$n$ (for example, the processing 14-1 is started after the completion of the processing 11-1). Each of the processing 15-1 through 15-$n$ is started after the completion of the respective one of the processing 11-1 through 11-$n$ and the processing 13. The processing 16 is started after the completion of the processing 12 and the processing 14-1 through 14-$n$. When the processing 13, the processing 14-1 through 14-$n$, the processing 15-1 through 15-$n$ and the processing 16 are entirely completed, it can be said that updating of the root keys and the public key certificates is finished.

Although some differences occurs since not the server apparatus 30 but the client apparatus 40 directly communicates with the certificate management apparatus 10, and also, the plurality of the server apparatuses 30-1 through 30-$n$ are provided, the processing corresponding to that in the fifth embodiment shown in FIG. 35 is executed in the same order, basically, in the processing according to the sixth embodiment. Also the same advantages as those in the fifth embodiment are obtained from the sixth embodiment.

That is, in the digital certificate management system according to the sixth embodiment, by execution of the root key updating processing in the above-described procedure, root keys can be updated under automatic control without affecting authentication processing between the server apparatuses 30-1 through 30-$n$ and the client apparatus 40, the same as in the fifth embodiment, even in a case where the certificate management apparatus can directly communicate only with the client apparatus 40 of the client and server system and also the number of server apparatuses included in the client and server system is plural. Accordingly, by applying such a digital certificate management system, without needing a special communication path for updating root keys, the root keys can be updated. Accordingly, it is possible to establish a client and server system which performs authentication according to SSL upon performing data transmission, at low costs.

Furthermore, in this embodiment, since there is no part in which a communication request is waited for, in the procedure of the root key updating processing, the processing can be proceeded with quickly, and thus, the processing can be completed within a short time period, as in the second embodiment described above.

Furthermore, the same variant embodiments as those of the fifth embodiment described above may be applied also to the sixth embodiment.

A seventh embodiment of the present invention is next described with reference to FIG. 43.

A digital certificate management system according to the seventh embodiment includes a certificate management apparatus (digital certificate management apparatus), a server apparatus and client apparatuses both of which configure a client and server system.

This digital certificate management system has the same configuration as that in the fifth embodiment described above while only the contents of root key updating processing are different from that of the fifth embodiment, thus duplicated descriptions being omitted.

Root key updating operation in this digital certificate management system is achieved basically as a result of the processing T shown in FIG. 24 and the processing 21 through the processing 23 shown in FIGS. 25 through 37 described above for the third embodiment being executed in the stated order. This processing is achieved as a result of respective CPUs in the certificate management apparatus 10, the server apparatus 30 and the client apparatuses 40-1 through 40-$n$ executing respective control programs.

Since this system includes the plurality of client apparatuses 40-1 through 40-$n$, the processing performed therefor becomes somewhat different. That is, the same as in the fifth embodiment, it is necessary to transmit the root key certificate to be distributed, the new client certificate and the new root key certificate and cause them to be stored for each of these client apparatuses 40-1 through 40-$n$, individually.

Specifically, the processing 21 shown in FIG. 21 and the processing 23 shown in FIG. 27 are performed for each client apparatus. Since the contents of change in the processing and the steps numbers provided according thereto are the same as those in the correspondence relationship between the processing 3 and the processing 3-1 in the case of the fifth embodiment, details are omitted. For example, the new client public key certificate is one used by the client apparatus 40-1, and also, in an updating request transmission request in the processing corresponding to Step S312, the client apparatus 40-1 is directed to as a transmission destination of the updating request, in a typical example.

Figure 43:
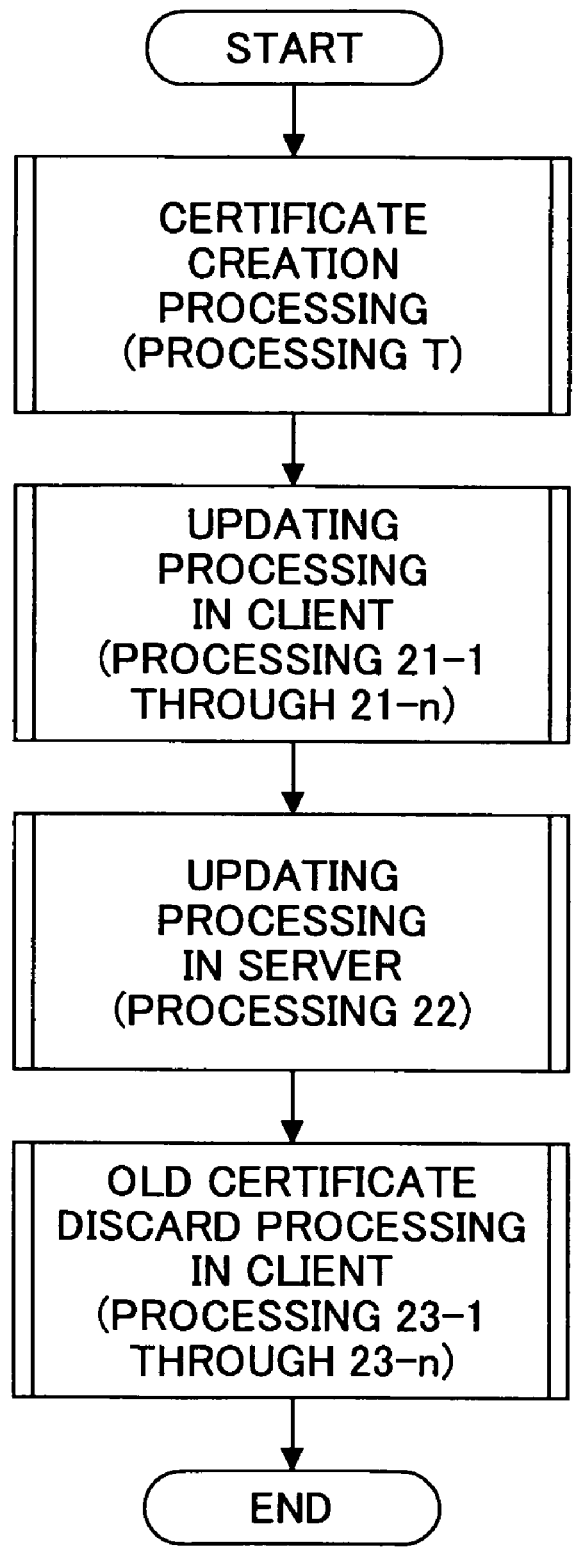
FIG. 43 illustrates execution order of respective processing in root key updating processing in a seventh embodiment.

In the root key updating processing, the respective processing is executed in the timing shown in a flow chart shown in FIG. 43.

That is, first the processing T is started, then after the completion thereof, the processing 21-1 through the processing 21-$n$ are started in any order. After all this processing is completed, the processing 22 is started, and after the completion thereof, the processing 23-1 through 23-$n$ are started in any order. When the processing is entirely finished, it can be said that updating of the root keys and the public key certificates is finished.

Such an updating procedure is produced by the updating order control part 27 in the certificate management apparatus 10 based on information stored in the configuration storage part 26, and is managed by the same. In this embodiment, since, with reference to the information concerning each node, it is seen that nodes functioning as clients in the client and server system are the client apparatuses 40-1 through 40-$n$, the updating procedure should be determined so that, updating processing is performed therefor first, and, after the completion thereof, updating processing for the server apparatus 30 acting a server is performed. Then, after the completion for the server apparatus 30, old key discarding processing for the client apparatuses should be performed.

By performing updating processing according to such a procedure, as in the third embodiment, although overhead occurs in part of communication, management in processing procedure and program designing become easier in comparison to the case of the fifth embodiment. This advantage increases as the number of nodes for which root key certificates should be updated increases, and thus, this embodiment becomes more advantageous accordingly.

An eighth embodiment of the present invention is described next with reference to FIG. 44.

A digital certificate management system according to the eighth embodiment includes a certificate management apparatus (digital certificate management apparatus), server apparatuses and a client apparatus both of which configure a client and server system.

This digital certificate management system has the same configuration as that in the sixth embodiment described above while only the contents of root key updating processing are different from that of the sixth embodiment, thus duplicated descriptions being omitted.

Root key updating operation in this digital certificate management system is achieved basically as a result of the processing T and the processing 31 through the processing 33 described above for the fourth embodiment being executed in the stated order. This processing is achieved as a result of respective CPUs in the certificate management apparatus 10, the server apparatuses 30-1 through 30-$n$ and the client apparatus 40 executing respective control programs.

Since this system includes the plurality of server apparatuses 30-1 through 30-$n$, the processing performed therefor becomes somewhat different. That is, the same as in the sixth embodiment, it is necessary to transmit the root key certificate to be distributed, the new client certificate and the new root key certificate and cause them to be stored for each of these server apparatuses 30-1 through 30-$n$, individually.

Figure 29:
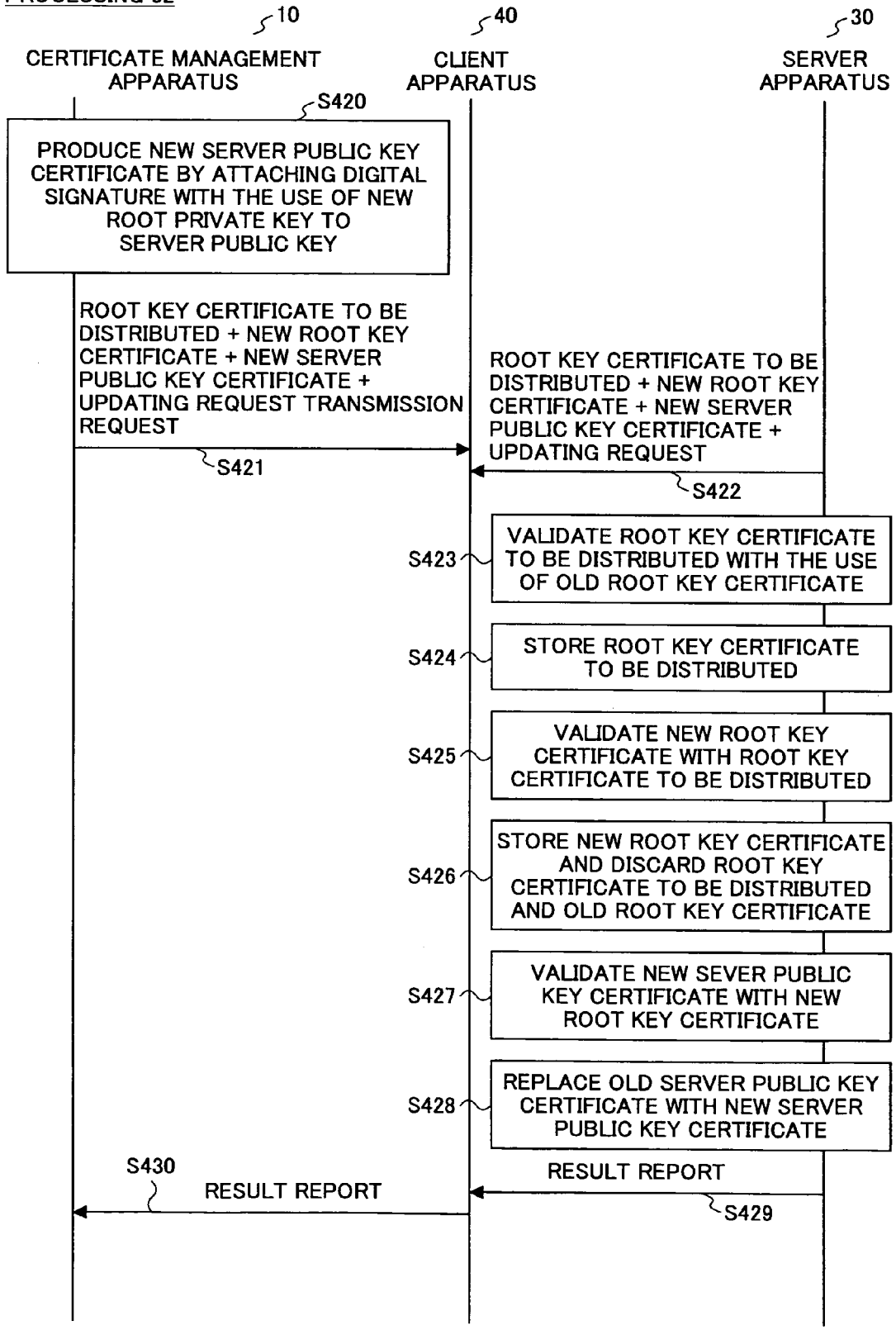
FIG. 29 shows a sequence diagram subsequent to the same shown in FIG. 28.
Figure 30:
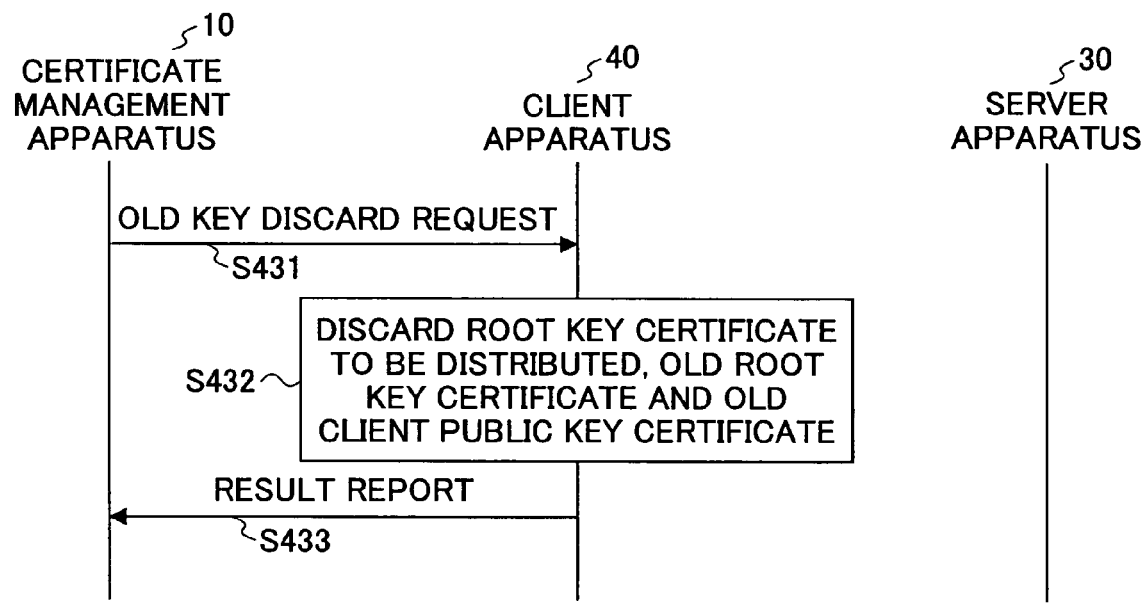
FIG. 30 shows a sequence diagram subsequent to the same shown in FIG. 29.

Specifically, the processing 32 shown in FIG. 29 is performed for each client apparatus. Since the contents of change in the processing and the steps numbers provided according thereto are the same as those in the correspondence relationship between the processing 14 and the processing 14-1 in the case of the sixth embodiment, details are omitted. For example, the new client public key certificate is one used by the server apparatus 30-1, and also, in an updating request transmission request in the processing corresponding to Step S421, the server apparatus 30-1 is directed to as a transmission destination of the updating request, as a typical example.

Figure 44:
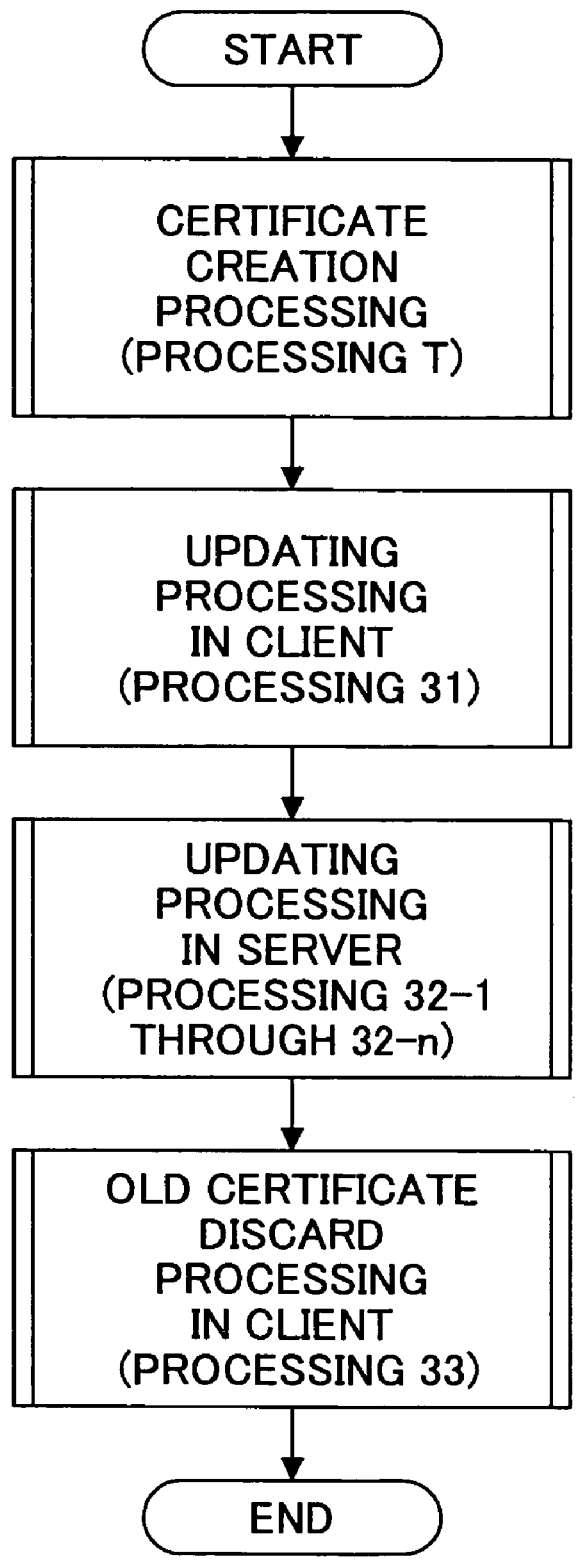
FIG. 44 illustrates execution order of respective processing in root key updating processing in an eighth embodiment.

In the root key updating processing, the respective processing is executed in the timing shown in a flow chart shown in FIG. 44.

That is, first the processing T is started, then after the completion thereof, the processing 31 is started. After this processing is completed, the processing 22-1 through the processing 22-$n$ are started in any order, and after the completion thereof entirely, the processing 23 is started. When this processing is finished, it can be said that updating of the root keys and the public key certificates is finished.

Such an updating procedure is produced by the updating order control part 27 in the certificate management apparatus 10 based on information stored in the configuration storage part 26, and is managed by the same. In this embodiment, since, with reference to the information concerning each node, it is seen that a node functioning as a client in the client and server system is the client apparatuses 40, the updating procedure should be determined so that, updating processing is performed therefor first, and, after the completion thereof, updating processing for the server apparatuses 30-1 through 30-*n* acting servers is performed. Then, after the completion for the server apparatuses, old key discarding processing for the client apparatuses should be performed.

By performing updating processing according to such a procedure, as in the fourth embodiment, although overhead occurs in part of communication, management in processing procedure and program designing become easier in comparison to the case of the sixth embodiment. This advantage increases as the number of nodes for which root key certificates should be updated increases, and thus, this embodiment becomes more advantageous accordingly.

Variant embodiments of the fifth through eighth embodiments of the present invention described above are described next with reference to FIGS. 45 through 48.

In each of the above-described fifth through eighth embodiments, the client and server system is configured by the single node and the plurality of nodes acting as communication counterparts thereof both of which communicate with one another directly. However, the present invention may also be applied to another case where a plurality of servers and a plurality of clients are included in a client and server system, and, a plurality of these nodes are made communicatable directly with a certificate management apparatus, as shown in FIG. 45 or 46.

A root key updating procedure for such a case is described next. In the client and server system shown in each of FIGS. 45 and 46, it is assumed that the same root key is used for authentication between each pair of these nodes in all cases.

Figure 45:
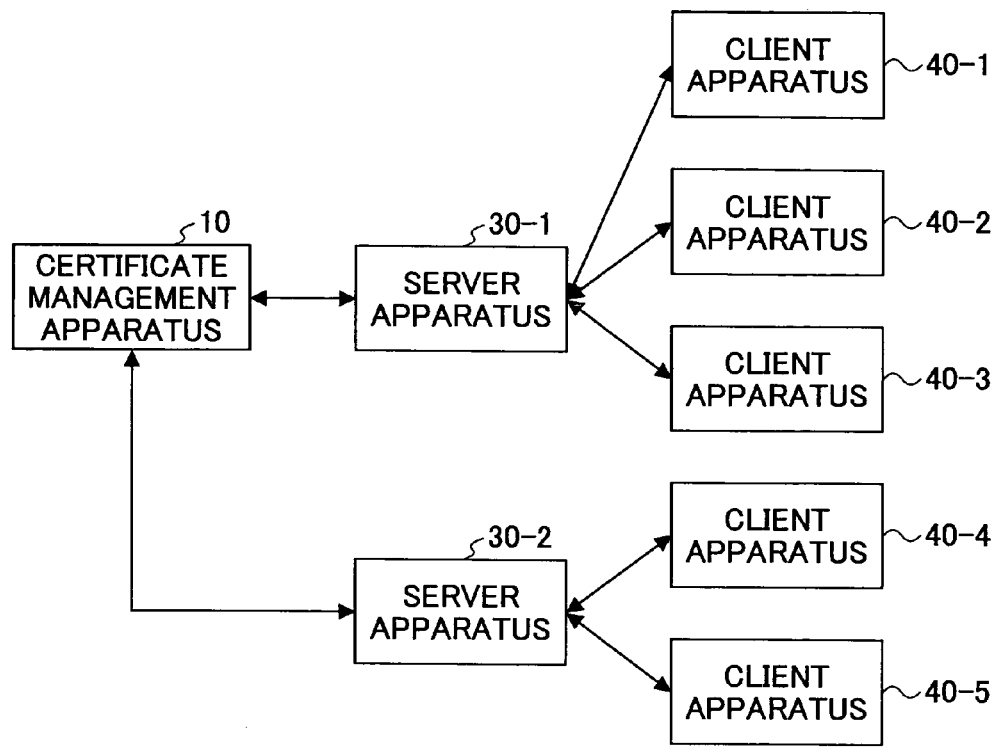
FIG. 45 shows a block diagram illustrating relationship among respective apparatuses included in a variant embodiment applicable to any of the fifth through eighth embodiments of the digital certificate management system according to the present invention.
Figure 46:
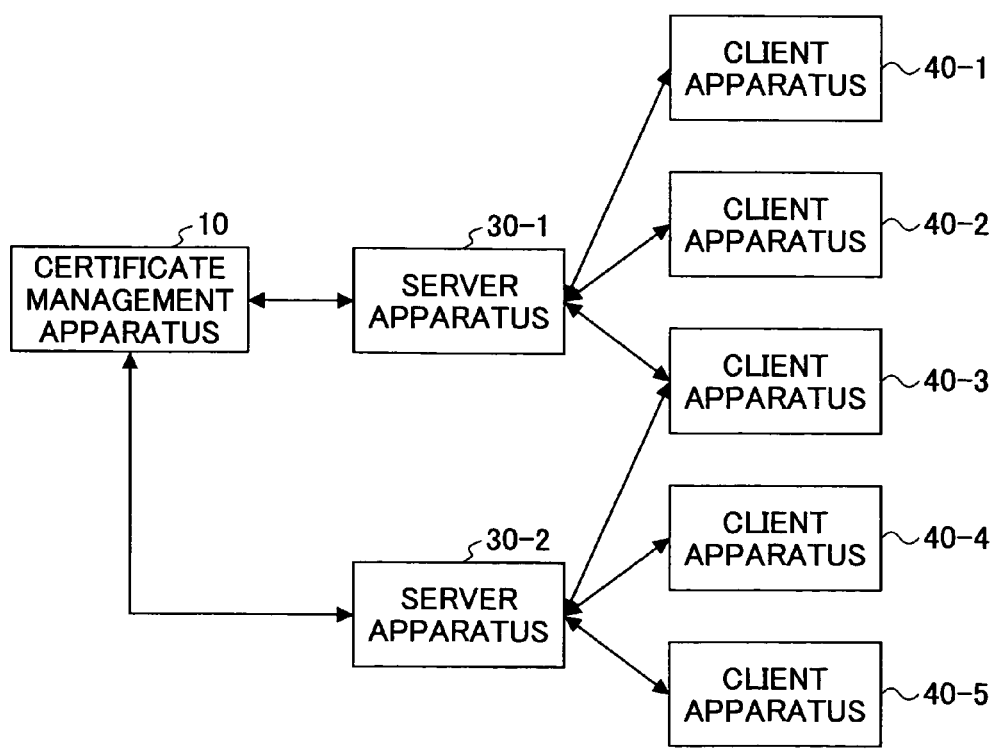
FIG. 46 shows a block diagram illustrating relationship among respective apparatuses included in another variant embodiment.

First, in the case of FIG. 45, a plurality of server apparatuses 30-1 and 30-2 are communicatable with a certificate management apparatus 10 directly, and each of all the client apparatuses 40-1 through 40-5 communicates with a single server apparatus thereof. In such a case, updating processing may be performed regarding that separate client and server systems exist for the respective server apparatuses.

That is, in the example shown in FIG. 45, root key updating processing may be performed individually for each of a client server system including the server apparatus 30-1 and the client apparatuses 40-1 through 40-3 and another client and server system including the server apparatus 30-2 and the client apparatuses 40-4 and 40-5. Even though such a manner is applied, since no authentication processing is performed involving different client and server systems in a mixed manner, root key updating processing can be achieved without significant problem occurring in authentication processing between each pair of nodes, as a result of updating processing being performed according to the updating procedure described above for the fifth or seventh embodiment for each of these client and server systems regarded.

FIG. 46 shows a case where a client apparatus (in this case, a client apparatus 30-1) exists which communicates with a plurality of server apparatuses regarding as communication counterparts. In such a case, it is necessary to perform root key updating processing regarding that a single client and server system includes all the nodes. However, even in such a case, the same as in the fifth and seventh embodiments described above, processing of causing each server apparatus to store a new server certificate should be performed after all the client apparatuses which act as communication counterparts thereof is caused to store a new root key.

Figure 47:
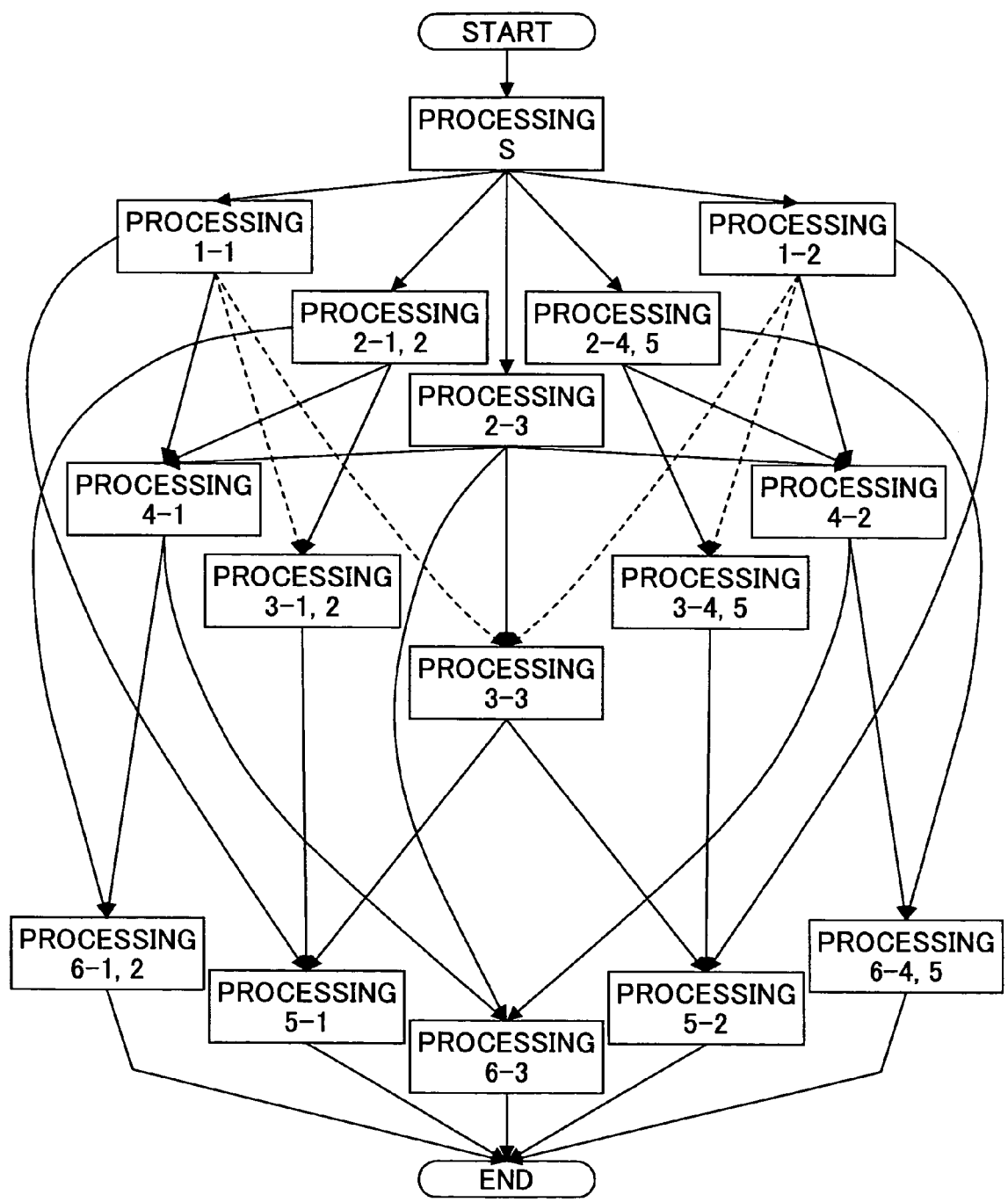
FIG. 47 illustrates start requirements for respective processing of the root key updating processing in the digital certificate management system shown in FIG. 46.

FIG. 47 shows requirements for starting each processing needed for updating processing in this example. In this figure, the meanings of each arrow and each number of processing are same as those in the case of FIG. 35 described above for the fifth embodiment. Since the configuration in the client and server system becomes somewhat complicated, the contents of the starting requirements become complicated accordingly in comparison to FIG. 35, as shown. However, the starting requirements for each processing is based on the same rules as those in the case of FIG. 35, i.e., for example, processing 4-1 which is public key certificate storage processing for the server 30-1 is started after the completion of all the processing 1-1 and processing 2-1 through 2-3 which are root key certificate storage processing for the server 30-1 itself and the client apparatuses 40-1 through 40-3 acting as communication counterparts thereof. Also from the same rules as those in the case of FIG. 35, it can be seen that processing 3-3 which is public key certificate storage processing for the client apparatus 40-3 should be started preferably after the completion of all the processing 2-3 and processing 1-1 and 1-2 which are root key certificate storage processing for the client apparatus 40-3 itself and the server apparatuses 30-1 and 30-2 acting as communication counterparts thereof.

However, for a relationship between nodes which do not act as communication counterparts of one another, such as that between the server apparatus 30-1 and the client apparatus 40-4, or such, since there is no expectation that authentication processing is succeeded in therebetween, and there is no necessity to provide proper relationship in storage states of certificates therebetween, it is not necessary to mange a processing order therefor.

Figure 48:
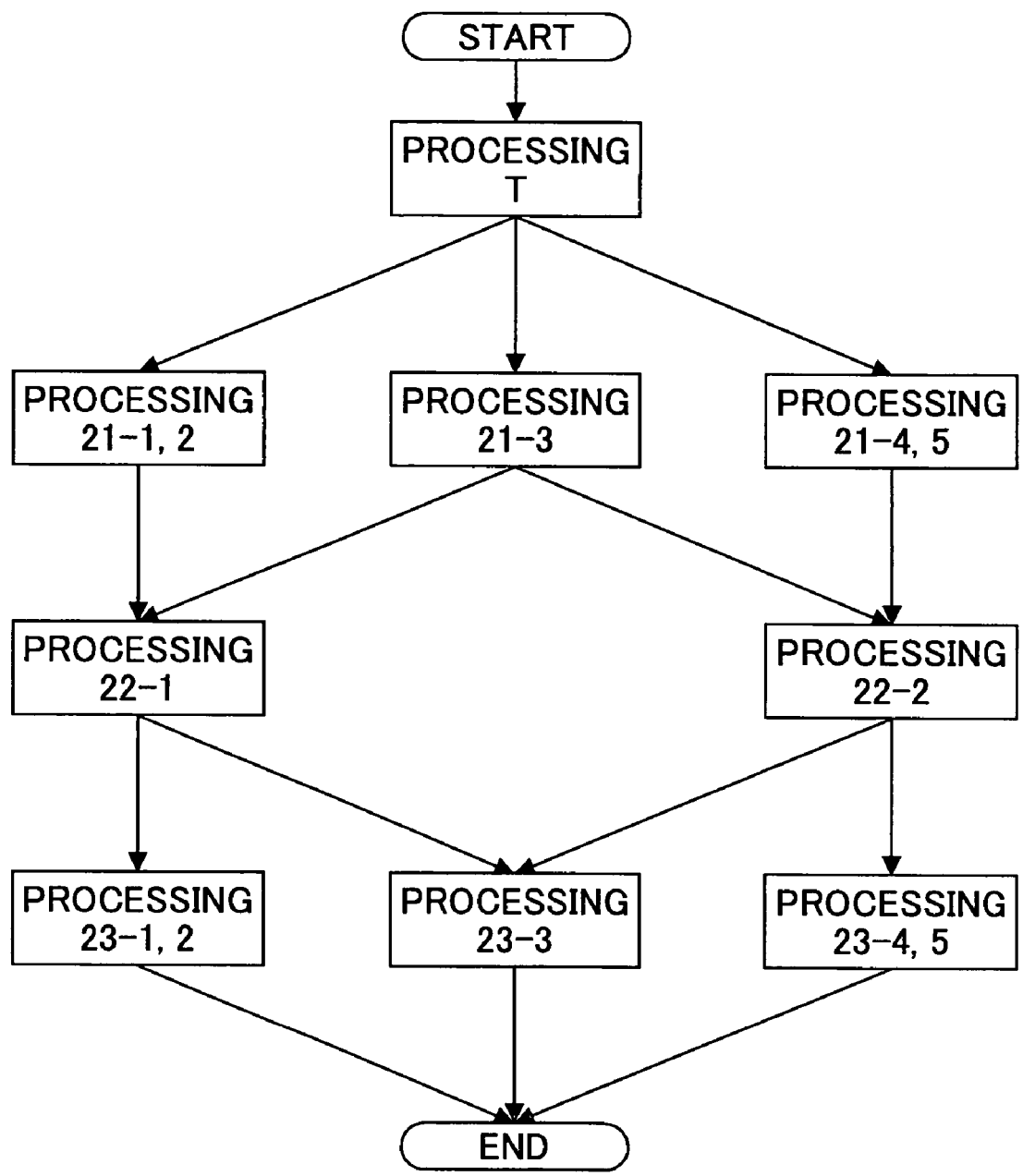
FIG. 48 illustrates start requirements for respective processing in case where the root key certificate and the public key certificate are stored together in each node.

In case where root key certificates and public key certificates are stored together in each of the respective nodes as in the seventh embodiment, starting requirements for respective processing are those shown in FIG. 48. FIG. 48 corresponds to FIG. 43, and the same as in FIG. 43, the updating procedure may be determined according to requirements that updating processing for a server apparatus should be started after the completion of updating processing for all the client apparatuses which act as communication counterparts thereof.

The same as in the case of the fifth or the seventh embodiment described above, the updating procedure shown in FIG. 47 or 48 is produced by the updating order control part 27 in the certificate management apparatus 10 with reference to information stored in the configuration storage part 26, and is managed by the same. Even though the configuration of the client and server system is such as that shown in FIG. 46, the function of each node included therein can be known from the information concerning the relevant node stored in the configuration storage part 26, and based thereon, the updating procedure can be produced properly.

It is also possible that, in case where the updating procedure is produced, a request for a node such as the client apparatus 40-3 communicatable with the plurality of server apparatuses 30-1 and 30-2 may be transmitted thereto via either one of the server apparatuses 30-1 and 30-2.

The variant embodiments described above are examples in which a node(s) which is(are) directly communicatable with the certificate management apparatus 10 is the server apparatus(es). However, the same variations may also be applied for a case where a node(s) which is(are) directly communicatable with the certificate management apparatus 10 is a client apparatus(es) in the same way. In this case, the variation described above is applied to the sixth or eighth embodiment.

Other variant embodiments of the respective embodiments described above are described next.

In the above-described embodiments, the client apparatus(es) 40 and the server apparatus(es) 30 perform authentication processing by SSL. However, the present invention works on, also with the use of authentication processing other than such.

TLS (Transport Layer Security) derived from SSL is known, and the present invention may also be applied to a case where authentication based on this protocol is employed.

Furthermore, although the certificate management apparatus 10 is provided separately from the server apparatus 30 or from the client apparatus 40, it is also possible to provide the certificate management apparatus within either of the server apparatus 30 and the client apparatus 40. In this case, components such as CPU, ROM, RAM, and so forth may be provided specially for achieving the functions of the certificate management apparatus 10. However, it is also possible that the CPU, the ROM, the RAM and so forth of the server apparatus 30 or the client apparatus 40 are utilized for both the functions of the certificate management apparatus and the server apparatus or the client apparatus, and the, the CPU is made to execute software such as to cause the apparatus to function as the certificate management apparatus 10 as well as the original apparatus such as the server apparatus or the client apparatus.

In such a case, communication between the certificate management apparatus 10 and the server apparatus 30 or the client apparatus 40 which integrally includes the certificate management apparatus 10 includes inter-process communication between a process which causes the hardware to function as the certificate management apparatus 10 and another process which causes the hardware to function as the server apparatus 30 or the client apparatus 40.

Furthermore, in the respective embodiments described above, the certificate management apparatus 10 creates a proof key or a digital certificate by itself. However, it is also possible to provide an apparatus separate from the certificate management apparatus 10 which performs the function of the proof key creation part 21 or the function of the certificate issuance part 22, and the certificate management apparatus 10 obtains a proof key or a digital certificate provided by this separate apparatus.

Further, the certificate management apparatus 10 may be configured to be communicatable directly with both the client apparatus(es) 30 and the server apparatus(es) 40. In this case, the communication sequences shown in FIGS. 7 through 12 and so forth become somewhat different since the certificate management apparatus 10 thus become directly communicatable with both. However, the same processing order as that in each of the above-described respective embodiments may be applied. Also by providing such a configuration, the same advantages as those in the above-described respective embodiments can be obtained.

Furthermore, it is possible to provide a configuration such that, in each of the second and fourth embodiments, authentication processing by SSL is performed when data transmission is performed between the certificate management apparatus 10 and the client apparatus 40.

Figure 49:
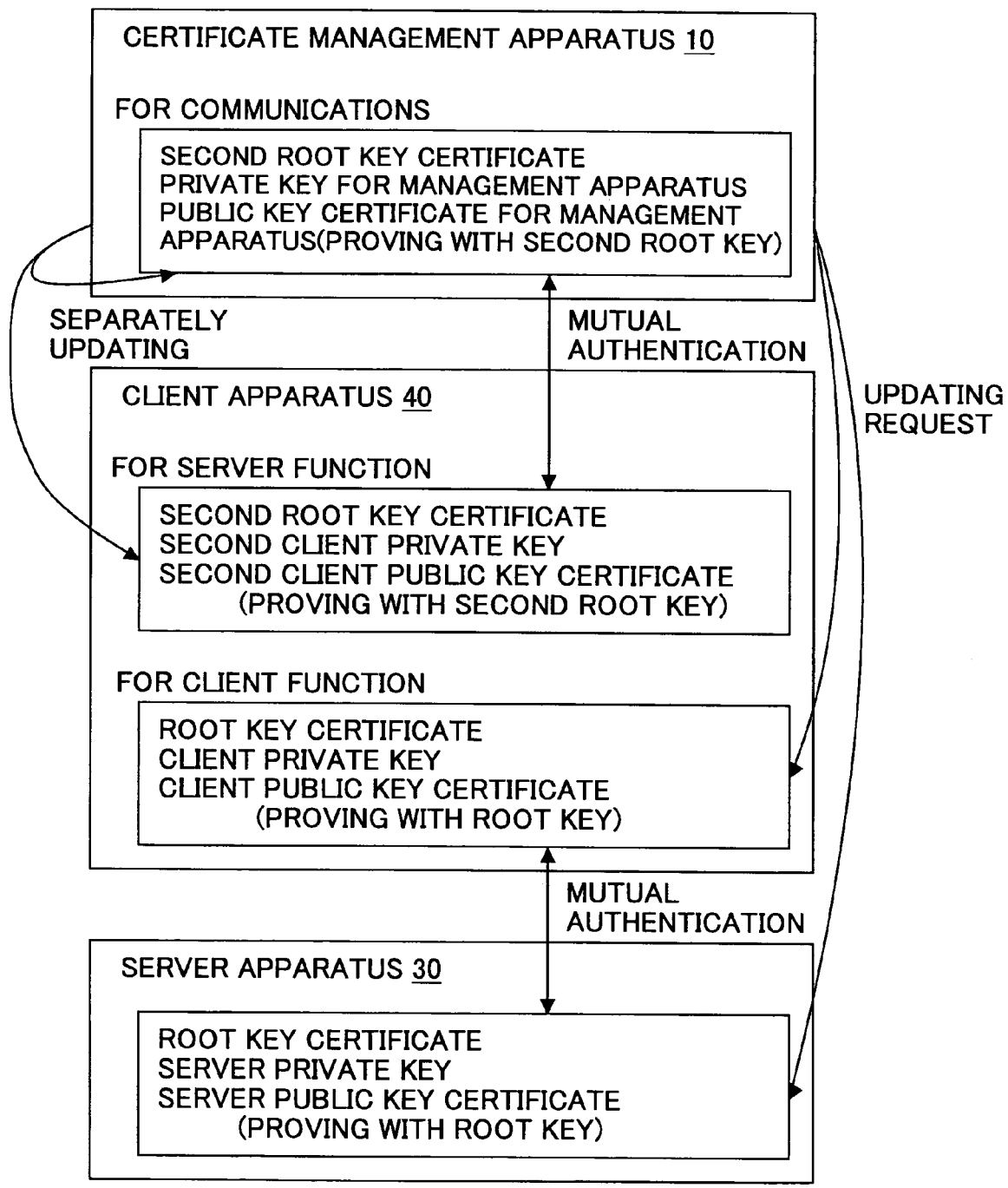
FIG. 49 illustrates root key updating processing in another variant embodiment together with storage states for the keys and certificates

For this purpose, as shown in FIG. 49, in the client apparatus 40, in addition to the client private key, the client public key certificate and the root key certificate (described above for the relevant embodiment) used for authentication processing with the server apparatus 30, another set of a private key, a public key certificate and a root key certificate (referred to as 'a second client private key', 'a second client public key certificate' and 'a second root key certificate') are stored, and they are used for authentication processing with the certificate management apparatus 10.

In this case, also in the certificate management apparatus 10, a management apparatus private key, a management apparatus public key certificate and the above-mentioned second root key certificate are stored, and are used for authentication. Then, the second client public key certificate and the management apparatus public key certificate are those, the contents of which can be checked with the use of a second root key included in the second root key certificate. In other words, a digital signature is made with the use of a root private key (second root private key) corresponding to the second root key.

Thereby, it becomes possible to completely individually perform authentication processing between the certificate management apparatus 10 and the client apparatus 40 and authentication processing between the client apparatus 40 and the server apparatus 30.

The client apparatus 40 in the second or fourth embodiment performs data transmission with the certificate management apparatus 10 with the use of the server function part 44, while performing data transmission with the server apparatus 30 with the use of the client function part 43 via the communication function part 42. Accordingly, it is possible to clearly distinguish communication requested by the certificate management apparatus 10 and communication requested by the server apparatus 30. Thereby, it is possible to perform authentication processing with the use of the separate keys or the separate certificates therewith.

In such a case, even after the root key certificate or the public key certificate used for authentication between the client apparatus 40 and the server apparatus 30 is updated according to a request from the certificate management apparatus 10, this matter never affects authentication processing between the certificate management apparatus 10 and the client apparatus 40.

By performing updating processing in a procedure described above for each embodiment, as described above, the updating processing can be performed without significantly affecting the authentication processing between the client apparatus 40 and the server apparatus 30. Accordingly, by providing a configuration such as that shown in FIG. 49, the root key can be updated while securing the authentication processing between each pair of the nodes.

In order to update the second root key certificate, the certificate management apparatus 10 is made to act as a client while the client apparatus 40 is made to act as a server, and then, updating processing is performed according to the procedure in any of the above-described embodiments. Even performing the updating processing in this manner, it never affects the authentication processing between the client apparatus 40 and the server apparatus 30.

Also in case where the number of the server apparatuses 30 is plural as in the sixth or eighth embodiment described above, the same manner can be applied.

Further, in each of the embodiments described above, the root key certificate and the public key certificate which are stored in both the client apparatus 40 and the server apparatus 30 necessary for mutual authentication between the client apparatus 40 and the server apparatus 30 are updated. However, as described above with reference to FIG. 7, when the necessary authentication is only authentication of the server apparatus 30 performed by the client apparatus 40, it is sufficient that the root key certificate is stored in the server apparatus 30 while the public key certificate is stored in the client apparatus 40. Accordingly, in this case, what should be updated is thus limited.

Figure 50:
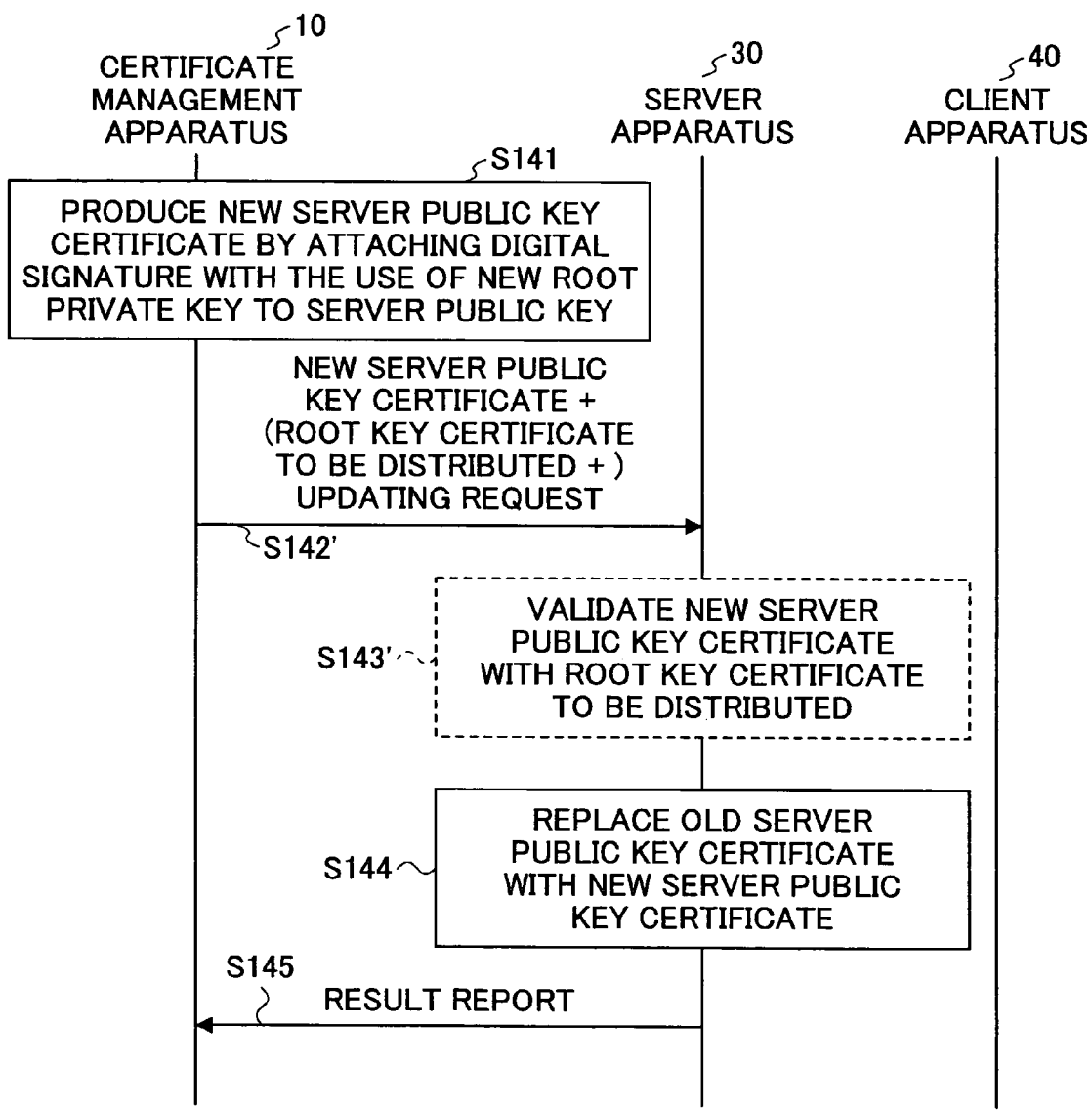
FIG. 50 shows a sequence diagram illustrating public key storage processing in the server apparatus in a variant embodiment of each embodiment.
Figure 51:
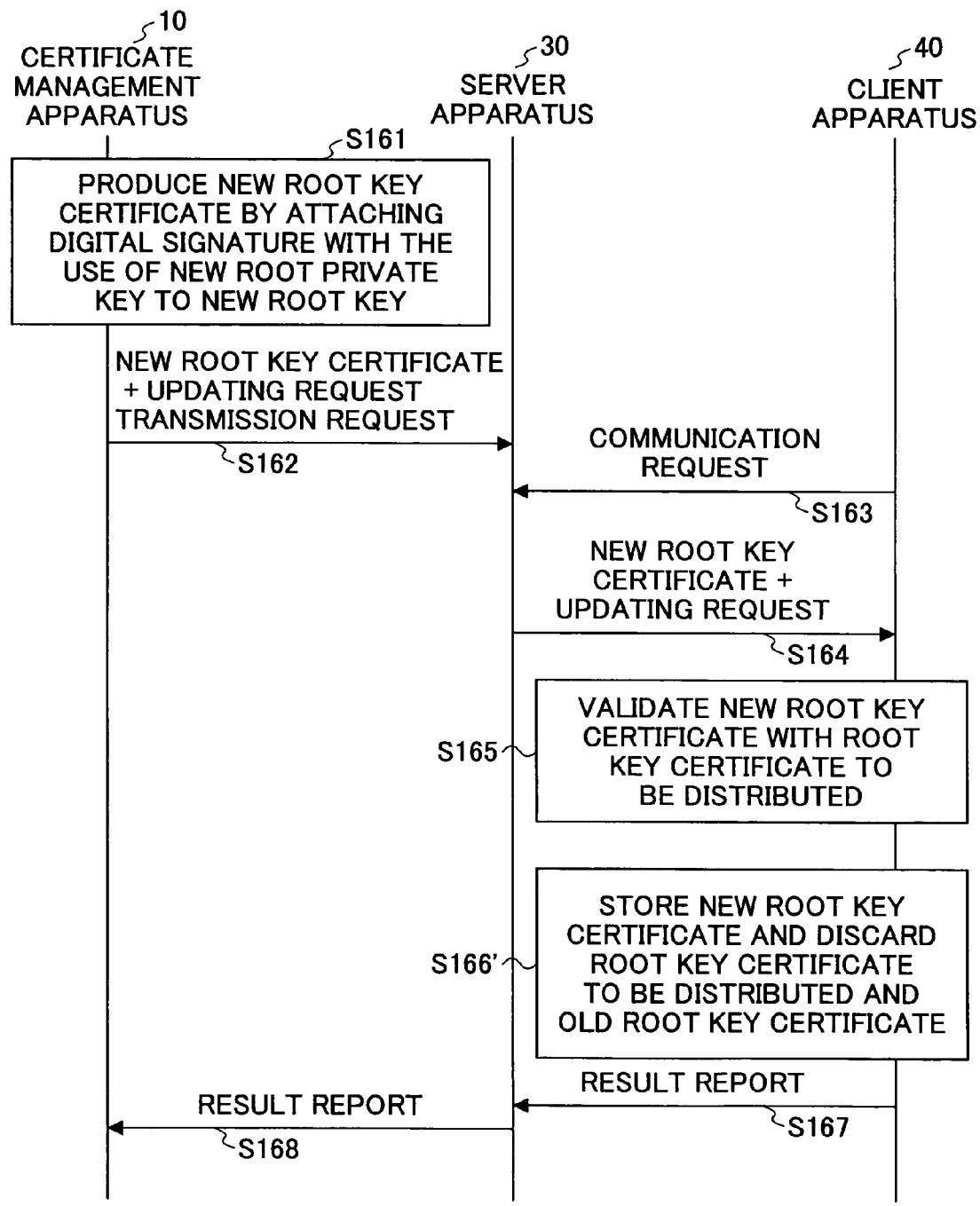
FIG. 51 shows a sequence diagram illustrating root key certificate updating processing in the client apparatus in the same.
Figure 52:
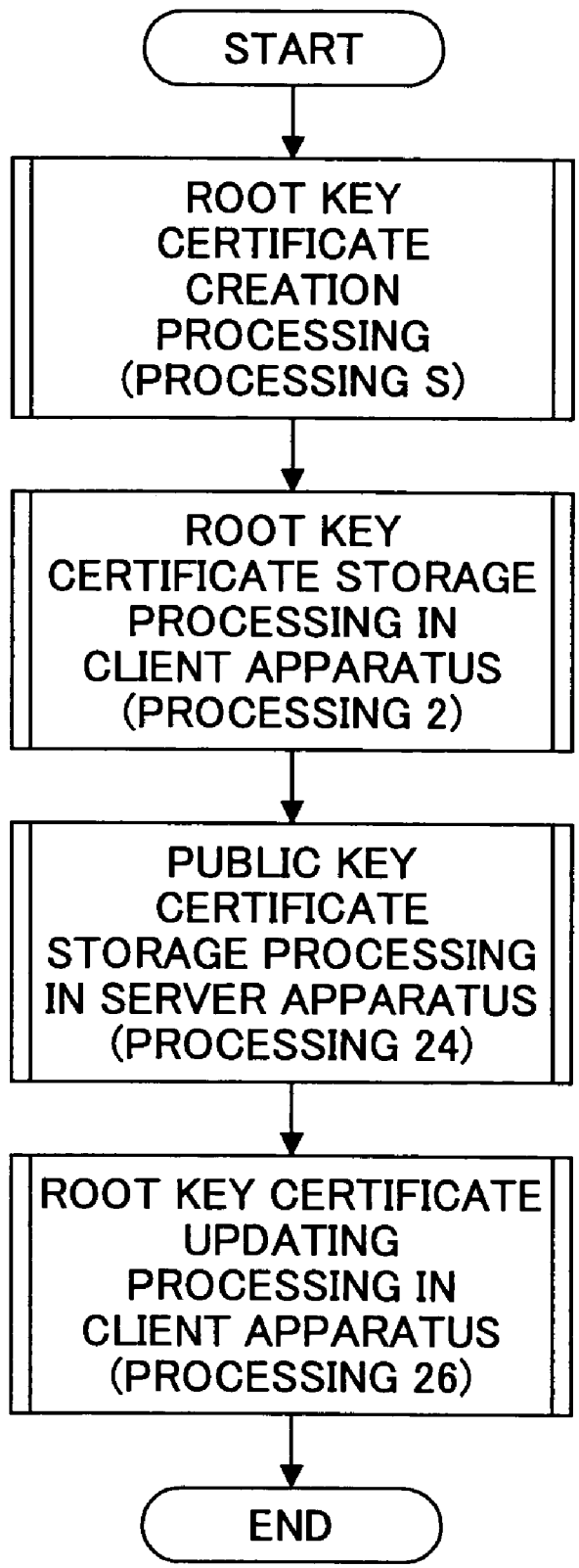
FIG. 52 shows a flow chart illustrating execution order of respective processing in the same.

Thus, it is possible to simplify the root key updating processing according to the first embodiment described above as follows: That is, as shown in FIG. 52, the root key certificate creation processing (processing S) shown in FIG. 6, the root key certificate storage processing in the client apparatus (processing 2) shown in FIG. 8, the public key certificate storage processing (processing 24) shown in FIG. 50 and the root key certificate updating processing (processing 26) in the client apparatus shown in FIG. 51 are performed in the stated order.

In this processing, the processing 24 corresponds to the processing 4 shown in FIG. 10. However, in case where the root key certificate is not stored in the server apparatus 30, the new server public key certificate received from the certificate management apparatus 10 is trusted in Step S144, and is used to replace the old server public key certificate as it is. Further, in Step S142', a configuration may be provided such that, the root key certificate to be distributed is also transmitted, and with the use thereof, the new server public key certificate may be validated (in Step S143). In this case, by storing in the server apparatus 30 the root key certificate same as that of the client apparatus 40, the root key certificate to be distributed can be validated with the use thereof.

The processing 26 corresponds to the processing 6 shown in FIG. 6. Since the public key certificate is not updated in the client apparatus 40, processing of discarding the public key certificate is omitted from the Step S166'. Only in this point, the processing 26 is different from the processing 6.

Also through the above-mentioned processing, the same as in any of the other embodiments, the operation of transmitting the new server public key certificate to the server apparatus 30 is performed after receiving information from the client apparatus 40 indicating that it has received the new root key certificate. Then, by applying this way, the same as in the first embodiment, the root key can be updated under automatic control without significantly affecting the authentication processing between the server apparatus 30 and the client apparatus 40.

Also for any of the other respective embodiments, the same variation can be applied.

Figure 54:
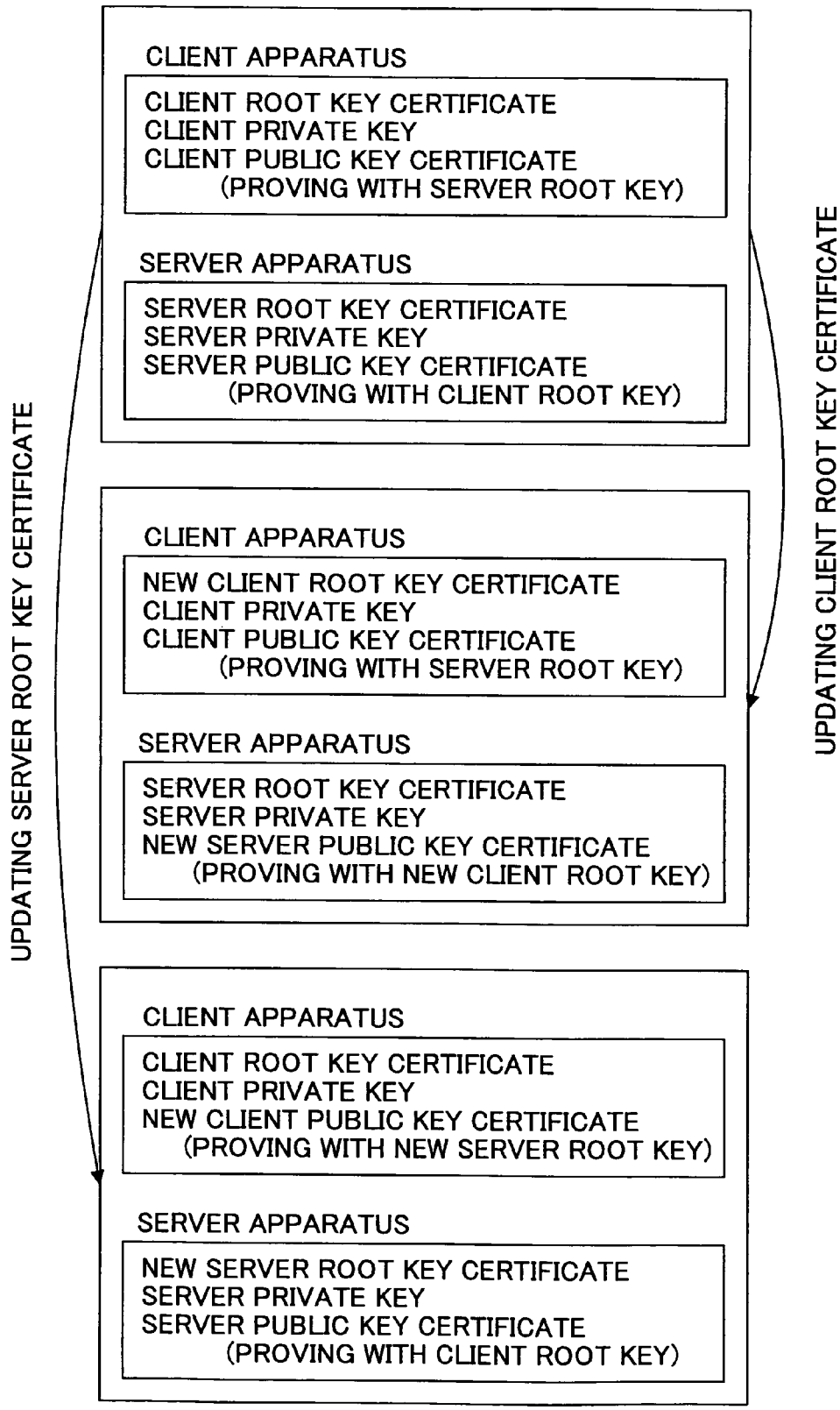
FIG. 54 illustrates storage states of keys and certificates in another variant embodiment of each of the embodiments, and root key updating processing in the same case.

Further, in the above-described respective embodiments, the common root key certificate is used by the client apparatus 40 and the server apparatus. However, it is not necessary to limited thereto. That is, as shown in FIG. 54, different root keys may be stored in the client apparatus 40 and the server apparatus 30. Also applying such a configuration, no problem occur in authentication when the server apparatus 30 can validate the client public key certificate, and also, the client apparatus 40 can validate the server public key certificate.

In such a case, the respective root key certificates may be independently updated. In such a case, the public key certificates which should be validated with the use of the root key certificate should also be updated together. Also in this processing, by applying a manner such that, according to the same concepts as that in the above-described respective embodiments, when the public key certificate (server public key certificate) stored in the server apparatus 30 is updated after updating of the root key certificate (server root key certificate) stored in the client apparatus 40 is finished, it is possible to update the root key while maintaining the state in which the authentication processing between the client apparatus 40 and the server apparatus 30 is available. The same as in the above-mentioned first embodiment, it is preferable that, after updating the root key certificate (client root key certificate) stored in the server apparatus 30 is finished, the public key certificate (client public key certificate) stored in the client apparatus 40 is updated.

Figure 59:
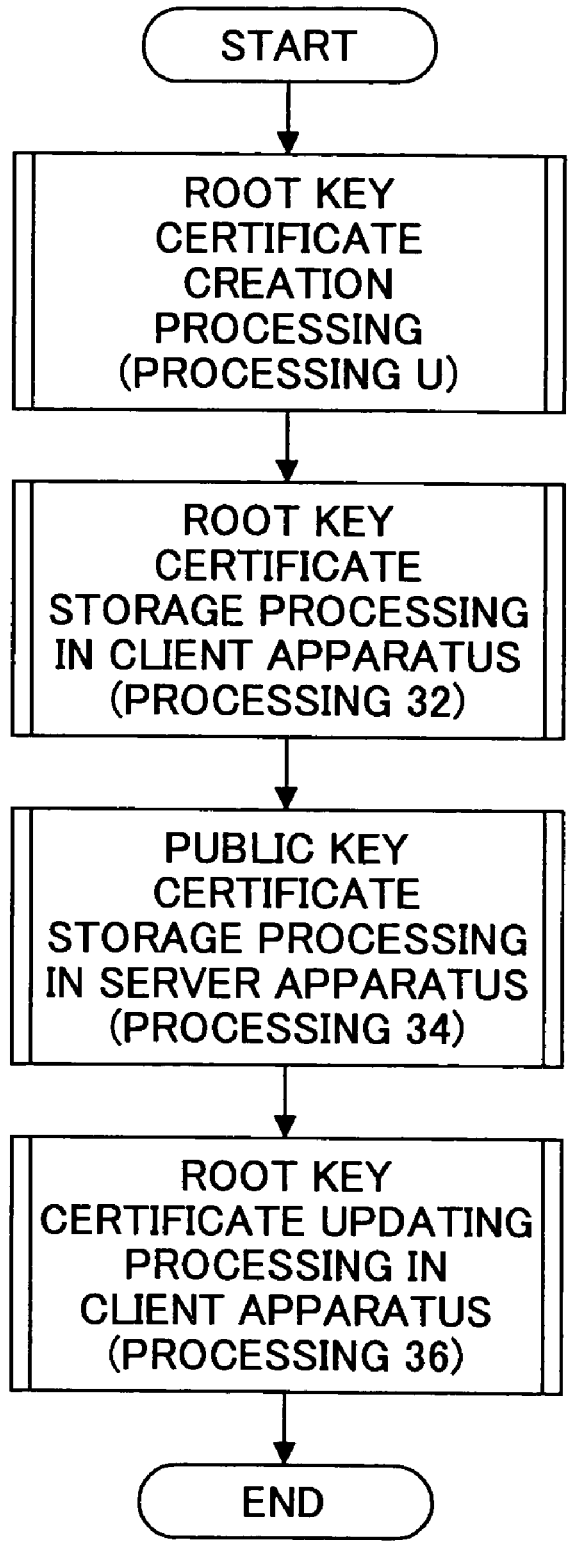
FIG. 59 shows a flow chart illustrating an execution order of the respective processing in the same case.

In a specific example of this processing, for example, respective processing shown in FIGS. 55 through 58 is executed in an order shown in FIG. 59. The respective processing shown in FIGS. 55 through 58 corresponds to the processing S shown in FIG. 6, the processing 2 shown in FIG. 8, the processing 4 shown in FIG. 10, and the processing 6 shown in FIG. 12, respectively.

Figure 55:
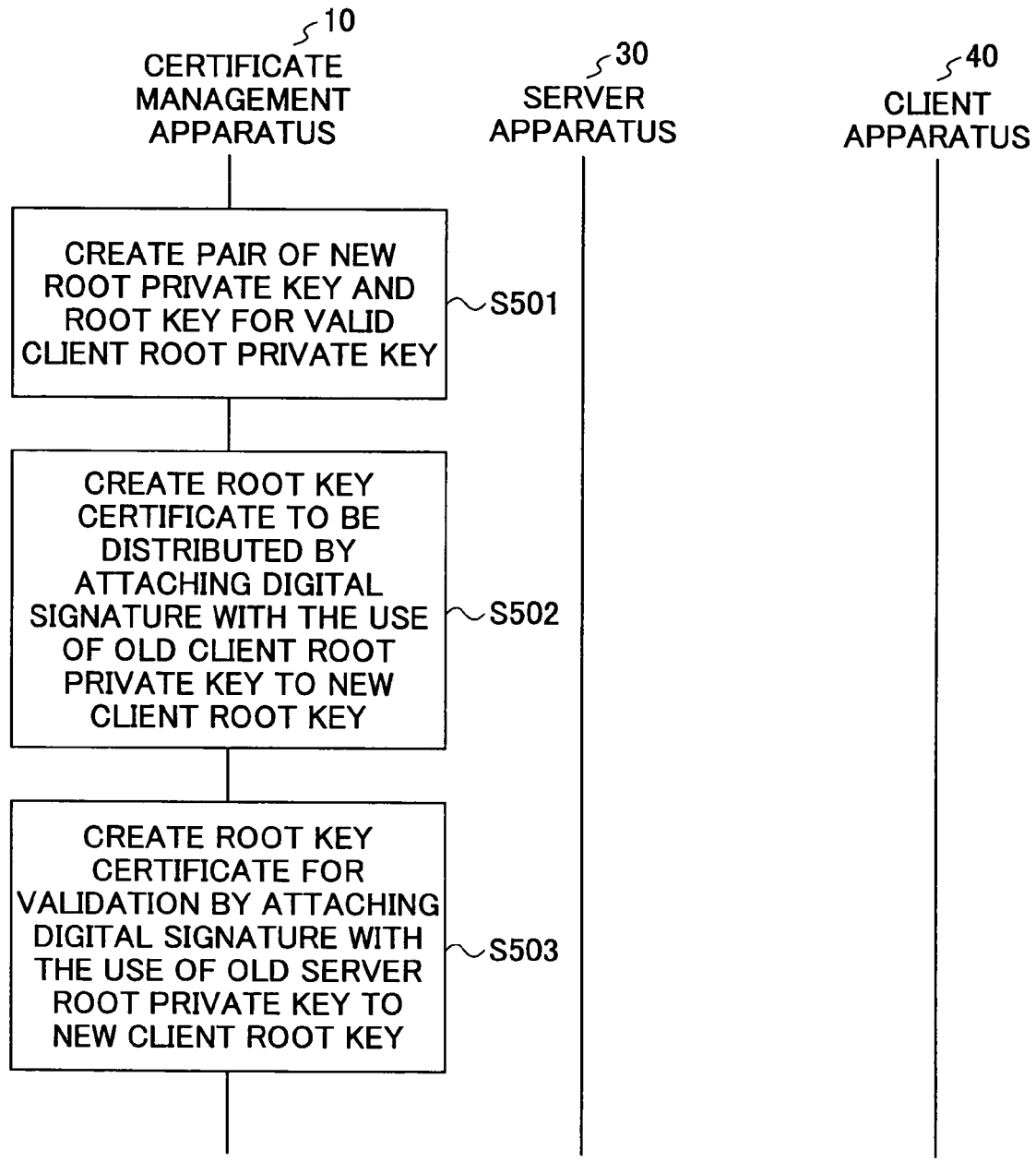
FIG. 55 shows a sequence diagram illustrating root key certificate creation processing in the other variant embodiment.
Figure 56:
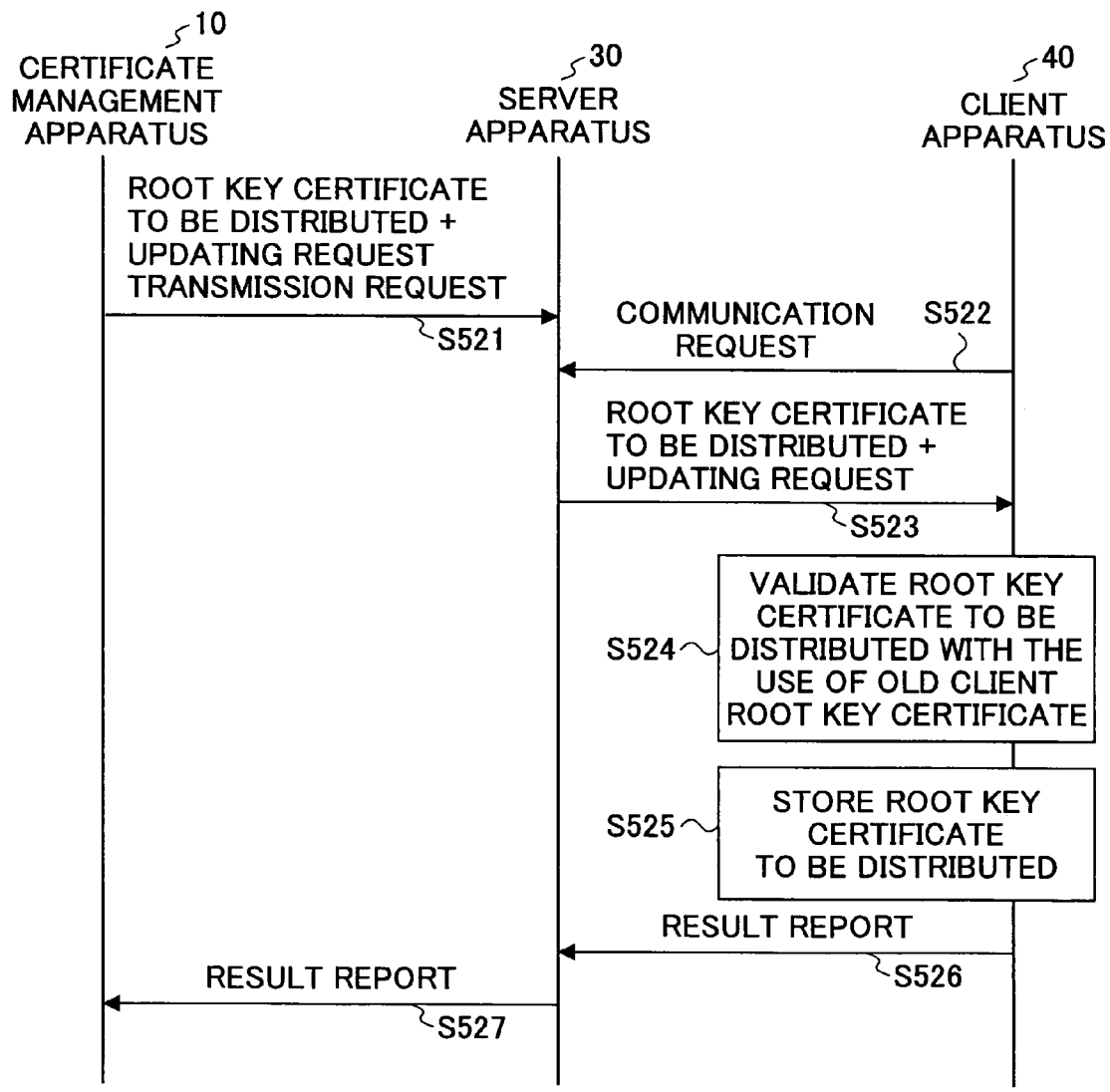
FIG. 56 shows a sequence diagram illustrating root key certificate storage processing in the client apparatus in the same case.
Figure 57:
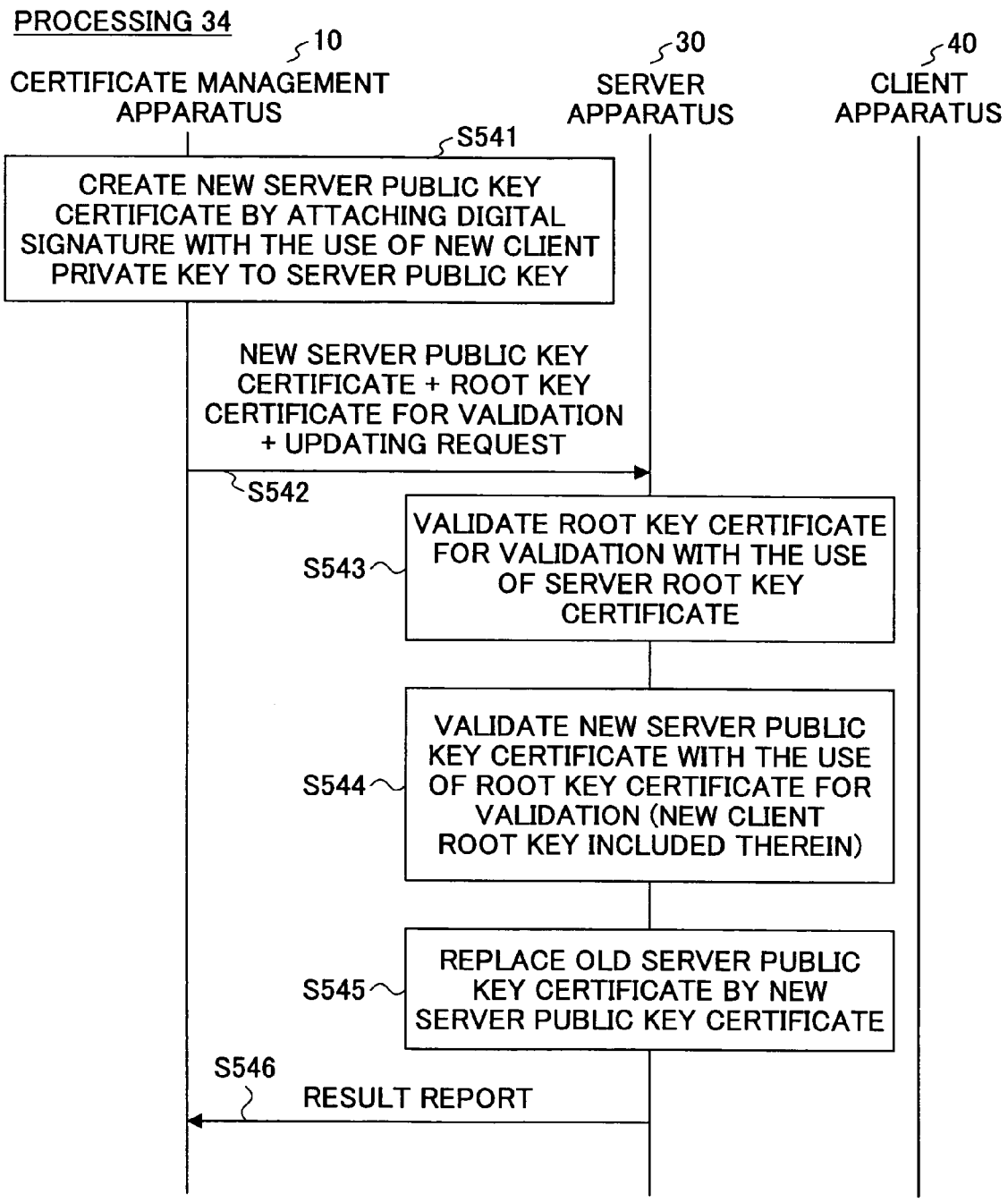
FIG. 57 shows a sequence diagram illustrating public key certificate storage processing in the server apparatus in the same case.
Figure 58:
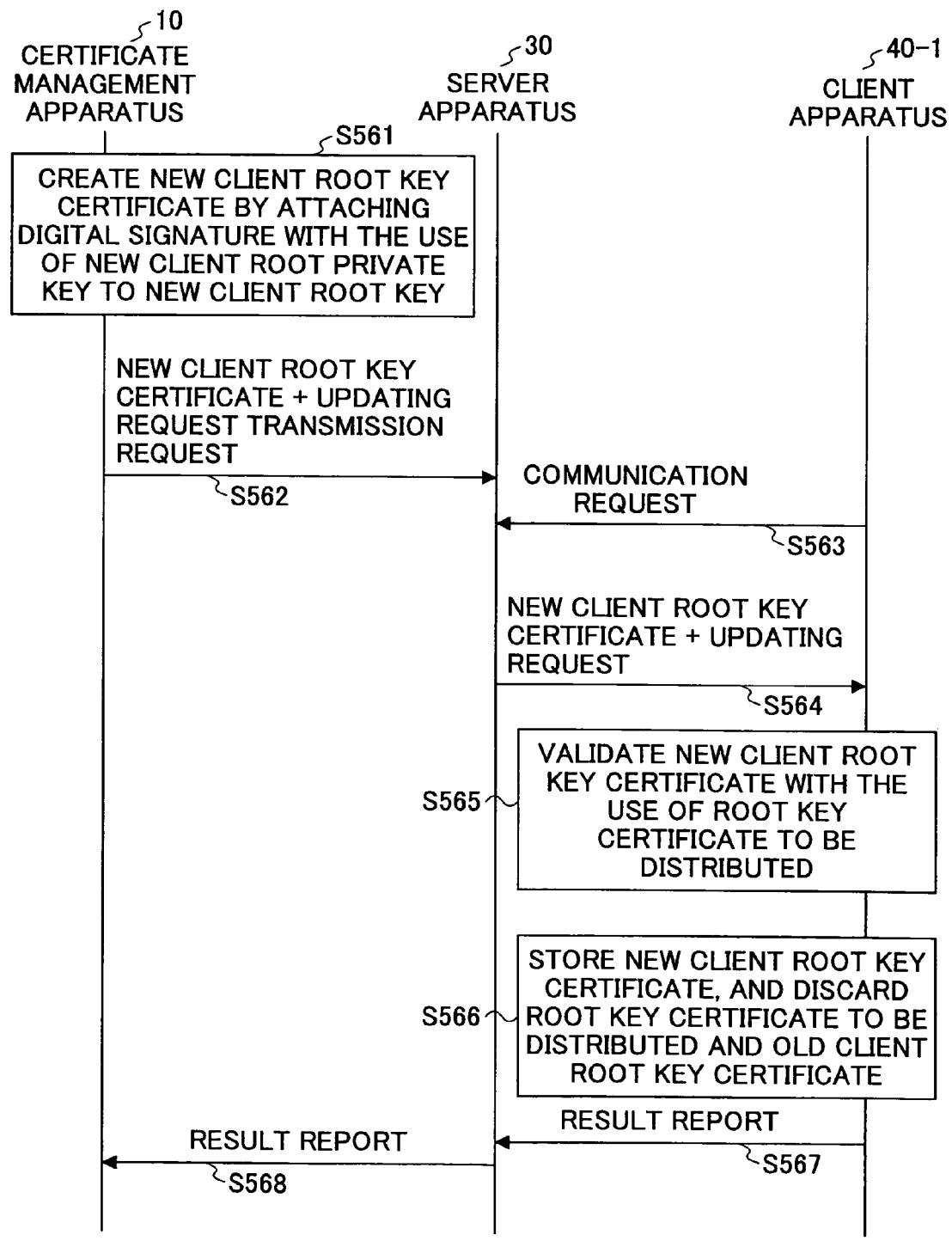
FIG. 58 shows a sequence diagram illustrating root key certificate updating processing in the client apparatus in the same case.

A root key certificate for validation created in Step S503 shown in FIG. 55 is used by the server apparatus 30 for validating the new server public key certificate. There, the server public key certificate is to be validated with the use of the client root key certificate, and since the server apparatus 30 cannot validate the server public key certificate with the use of the server root key certificate stored by itself, the root key certificate for validation is needed.

The same variation is also applicable to the above-described respective embodiments in the same manner.

Furthermore, it is also possible to mutually combining the arts described above for the respective ones of the embodiments and the variant embodiments described above.

Furthermore, it is possible to obtain the advantages same those described above by causing a computer which is communicatable directly or indirectly via a communication network with a plurality of apparatuses included in a client and server system, to execute a program prepared for achieving the respective functions (i.e., functions of the above-mentioned configuration storage part, the updating order control part, the proof key updating part, the first transmitting unit, the second transmitting unit and so forth).

Such a program may be previously stored in a ROM, a HDD or so belonging to the computer, or, may be provided to the computer with a form recorded in a non-volatile recording medium (memory) such as a CD-ROM, a flexible disk, an SRAM, an EEPROM, a memory card or such. The above-mentioned respective processing may be executed by the computer as a result of a CPU of the computer being installed in the computer and the CPU executing the respective processing, or the CPU reading out the program from the memory, and executing the same.

It is also possible that the program is downloaded from an external apparatus (server) including a recording medium in which the program is recorded connected with the communication network, or from an external apparatus having a storage device storing the program.

Thus, by the digital certificate management system, the digital certificate management apparatus, the digital certificate management method, the updating order determining method and the program according to the present invention, it is possible to safely update an authentication public key used for validation of a digital certificate in authentication processing in a client and server system without providing a special communication path for the updating processing.

Accordingly, by applying the present invention to processing for management of certificates used for authentication processing in the client and server system, it is possible to provide a system by which the authentication public keys can be safely updated, at low costs.

Further, the present invention is not limited to the above-described embodiments, and variations and modifications may be made without departing from the basic concept of the present invention.

The present application is based on Japanese Laid-open Patent Applications Nos. 2003-075278, 2004-056764, 2003-096129 and 2004-056766, filed on Mar. 19, 2003, Mar. 1, 2004, Mar. 31, 2003 and Mar. 1, 2004, respectively, the entire contents of which are hereby incorporated by reference.

What is claimed is:

1. A digital certificate management system comprising:
a client and server system in which a digital certificate is used for authentication so as to establish communication between a server and a client, and data transmission is performed therebetween with the use of the communication established through the authentication; and
a digital certificate management apparatus communicatable with the client and the server, and
wherein:
said digital certificate management apparatus comprises a proof key updating unit which updates a proof key used for proving validity of the digital certificate used for authentication by the server;
said proof key updating unit comprises:
a unit configured to acquire a new proof key for updating;
a unit configured to acquire a new digital certificate used for the authentication for which validity can be proved with the use of said new proof key;
a first transmitting unit transmitting the new proof key to the client; and
a second transmitting unit transmitting a new server certificate which is the new digital certificate for the server, to the server, and
wherein:
said second transmitting unit performs operation of transmitting the new server certificate to the server after receiving, from the client, information indicating that the client has received the new proof key.

2. The digital certificate management system as claimed in claim 1, wherein:
said proof key updating unit in said digital certificate management apparatus comprises a unit configured to acquire a proof key certificate, which is a digital certificate, including the new proof key, for which validity can be proved with the use of an old proof key, and
wherein:
said first transmitting unit is configured to transmit the new proof key in a form of the proof key certificate to the client; and
said client comprises a unit configured to be responsive to the proof key included in the proof key certificate transmitted from said digital certificate management apparatus, for proving validity of the received proof key certificate with the use of the old proof key and storing the proof key included in the proof key certificate when determining that the proof key is a proper one.

3. The digital certificate management system as claimed in claim 1, wherein:
said proof key updating unit in the digital certificate management system comprises:
a unit configured to acquire a first proof key certificate, including the new proof key, which is a digital certificate for which validity can be proved with the use of an old proof key; and
a unit configured to acquire a second proof key certificate, including the new proof key, which is a digital certificate for which validity can be proved with the use of the new proof key, and
wherein:
said first transmitting unit is configured to transmit the new proof keys in respective forms of the first proof key certificate and the second proof key certificate to the client; and
said client comprises:
a unit configured to be responsive to the first proof key certificate transmitted from said digital certificate management apparatus, for proving validity of the received certificate with the use of the old proof key and storing the certificate when determining that it is a proper one; and
a unit configured to be responsive to the second proof key certificate from said digital certificate management apparatus, for proving validity of the received certificate with the use of the new proof key included in the first proof key certificate, and storing the second proof key certificate when determining that it is a proper one, and then deleting the old proof key certificate and the first proof key certificate, and
wherein:
the first transmitting unit in the digital certificate management apparatus is configured to perform operation of transmitting the second proof key certificate to the client at least after receiving information from the server indicating that the server has received the new server certificate.

4. A digital certificate management system comprising:
a client and server system in which a digital certificate is used for mutual authentication so as to establish communication between a server and a client, and data transmission is performed therebetween with the use of the communication established through the authentication; and
a digital certificate management apparatus communicatable with the client and the server, and
wherein:
said digital certificate management apparatus comprises a proof key updating unit which updates a proof key used for proving validity of the digital certificate used for the mutual authentication by the client and the server;
said proof key updating unit comprises:
a unit configured to acquire a new proof key for updating;
a unit configured to acquire a new digital certificate used for the mutual authentication for which validity can be proved with the use of said new proof key;
a first transmitting unit transmitting a new client certificate which is the new digital certificate for the client, and the new proof key, to the client; and
a second transmitting unit transmitting a new server certificate which is the new digital certificate for the server, and the new proof key, to the server, and
wherein:
said second transmitting unit performs operation of transmitting the new server certificate to the server after receiving from the client, information indicating that the client has received the new proof key; and
said first transmitting unit performs operation of transmitting the new client certificate to the client after receiving information from the server indicating that the server has received the new proof key.

5. The digital certificate management system as claimed in claim 4, wherein:
said first transmitting unit is configured to transmit the new proof key at the same time as or prior to transmission of the new client certificate to the client; and
said second transmitting unit is configured to transmit the new proof key at the same time as or prior to transmission of the new server certificate to the server.

6. A digital certificate management system comprising:
a client and server system in which a digital certificate is used for mutual authentication so as to establish communication between a server and a client, and data transmission is performed therebetween with the use of the communication established through the authentication; and a digital certificate management apparatus communicatable with the client and the server, and wherein:

said digital certificate management apparatus comprises a proof key updating unit which updates a proof key used for proving validity of the digital certificate used for the mutual authentication by the client and the server;

said proof key updating unit comprises:

a unit configured to acquire a new proof key for updating;

a unit configured to acquire a new digital certificate used for the mutual authentication for which validity can be proved with the use of said new proof key;

a first transmitting unit transmitting a new client certificate which is the new digital certificate for the client, and the new proof key, to the client; and a second transmitting unit transmitting a new server certificate which is the new digital certificate for the server, and the new proof key, to the server, and wherein:

said first transmitting unit performs operation of transmitting the new client certificate and the new proof key to the client at the same time; and said second transmitting unit performs operation of transmitting the new server certificate and the new proof key to the server at the same time after receiving information from the client indicating that the client has received the new proof key.

7. The digital certificate management system as claimed in claim 1, wherein:

said server has an intermediary function for communication between the digital certificate management apparatus and the client;

said digital certificate management apparatus and the client perform data transmission mutually via the server; and the server transmits the new proof key and/or a new client certificate to the client, transmitted from the first transmitting unit of the digital certificate management apparatus for the client, via the communication established through authentication performed with the client with the use of an old digital certificate.

8. The digital certificate management system as claimed in claim 4, wherein:

said server has an intermediary function for communication between the digital certificate management apparatus and the client;

said digital certificate management apparatus and the client perform data transmission mutually via the server; and the server transmits the new proof key and/or the new client certificate to the client, transmitted from the first transmitting unit of the digital certificate management apparatus for the client, via the communication established through authentication performed with the client with the use of an old digital certificate.

9. The digital certificate management system as claimed in claim 6, wherein:

said server has an intermediary function for communication between the digital certificate management apparatus and the client;

said digital certificate management apparatus and the client perform data transmission mutually via the server; and the server transmits the new proof key and/or the new client certificate to the client, transmitted from the first transmitting unit of the digital certificate management apparatus for the client, via the communication established through authentication performed with the client with the use of an old digital certificate.

10. The digital certificate management system as claimed in claim 1, wherein:

said client has an intermediary function for communication between the digital certificate management apparatus and the server;

said digital certificate management apparatus and the server perform data transmission mutually via the client; and the client transmits the new proof key and/or the new server certificate to the server, transmitted from the second transmitting unit of the digital certificate management apparatus for the server, via the communication established through authentication performed with the server with the use of an old digital certificate.

11. The digital certificate management system as claimed in claim 4, wherein:

said client has an intermediary function for communication between the digital certificate management apparatus and the server;

said digital certificate management apparatus and the server perform data transmission mutually via the client; and the client transmits the new proof key and/or the new server certificate to the server, transmitted from the second transmitting unit of the digital certificate management apparatus for the server, via the communication established through authentication performed with the server with the use of an old digital certificate.

12. The digital certificate management system as claimed in claim 6, wherein:

said client has an intermediary function for communication between the digital certificate management apparatus and the server;

said digital certificate management apparatus and the server perform data transmission mutually via the client; and the client transmits the new proof key and/or the new server certificate to the server, transmitted from the second transmitting unit of the digital certificate management apparatus for the server, via the communication established through authentication performed with the server with the use of an old digital certificate.

13. The digital certificate management system as claimed in claim 1, wherein:

the authentication performed between the client and the server comprises authentication according to an SSL or TLS protocol; and the server certificate comprises a public key certificate for the server.

14. The digital certificate management system as claimed in claim 4, wherein:

the authentication performed between the client and the server comprises authentication according to an SSL or TLS protocol; and the server certificate comprises a public key certificate for the server.

15. The digital certificate management system as claimed in claim 6, wherein:

the authentication performed between the client and the server comprises authentication according to an SSL or TLS protocol; and the server certificate comprises a public key certificate for the server.

16. A digital certificate management apparatus communicatable with a client and a server which configure a client and server system, comprising:
a proof key updating unit which updates a proof key used for proving validity of a digital certificate used by the server for authentication through which communication between the client and the server is established, and
wherein:
said proof key updating unit comprises:
a unit configured to acquire a new proof key for updating;
a unit configured to acquire a new digital certificate used for the authentication for which validity can be proved with the use of said new proof key;
a first transmitting unit transmitting the new proof key to the client; and
a second transmitting unit transmitting a new server certificate which is the new digital certificate for the server to the server, and
wherein:
said second transmitting unit performs operation of transmitting the new server certificate to the server after receiving, from the client, information indicating that the client has received the new proof key.

17. A digital certificate management apparatus communicatable with a client and a server which configure a client and server system, comprising:
a proof key updating unit which updates a proof key used for proving validity of a digital certificate used for mutual authentication through which communication is established between the client and the server, and
wherein:
said proof key updating unit comprises:
a unit configured to acquire a new proof key for updating;
a unit configured to acquire a new digital certificate used for the mutual authentication for which validity can be proved with the use of said new proof key;
a first transmitting unit transmitting a new client certificate which is the new digital certificate for the client, and the new proof key, to the client; and
a second transmitting unit transmitting a new server certificate which is the new digital certificate for the server, and the new proof key, to the server, and
wherein:
said second transmitting unit performs operation of transmitting the new server certificate to the server after receiving, from the client, information indicating that the client has received the new proof key; and
said first transmitting unit performs the operation of transmitting the new client certificate to the client after receiving information from the server indicating that the server has received the new proof key.

18. A digital certificate management apparatus communicatable with a client and a server which configure a client and server system, comprising:
a proof key updating unit which updates a proof key used for proving validity of a digital certificate used for mutual authentication through which communication is established between the client and the server, and
wherein:
said proof key updating unit comprises:
a unit configured to acquire a new proof key for updating;
a unit configured to acquire a new digital certificate used for the mutual authentication for which validity can be proved with the use of said new proof key;

a first transmitting unit transmitting a new client certificate which is the new digital certificate for the client, and the new proof key, to the client; and
a second transmitting unit transmitting a new server certificate which is the new digital certificate for the server, and the new proof key, to the server, and
wherein:
said first transmitting unit performs operation of transmitting the new client certificate and the new proof key to the client at the same time; and
said second transmitting unit performs operation of transmitting the new server certificate and the new proof key to the server at the same time after receiving information from the client indicating that the client has received the new proof key.

19. A digital certificate management system comprising:
a client and server system in which one or a plurality of clients and one or a plurality of servers are included, authentication is performed between each client and each server with the use of a digital certificate, and data transmission is performed therebetween with communication established through the authentication; and
a digital certificate management apparatus communicatable with each client and each server, and
wherein:
said digital certificate management apparatus comprises:
a proof key updating unit updating a proof key used for proving validity of the digital certificate used for authentication by each server; and
an updating order control unit controlling a procedure of updating the proof key performed by the proof key updating unit based on information concerning respective nodes included in the client and server system as to a communication counterpart of each node and as to whether each of the node and the counterpart acts as a client or a server, and
wherein:
said proof key updating unit comprises:
a unit configured to acquire a new proof key for updating;
a unit configured to acquire a new digital certificate used for the authentication for which validity can be proved with the use of said new proof key;
a first transmitting unit transmitting the new proof key to each client; and
a second transmitting unit transmitting a new server certificate which is the new digital certificate for each server, to the relevant server, and
wherein:
said updating order control unit controls the updating procedure so that said second transmitting unit performs operation of transmitting the new server certificate to the respective server after receiving from all the clients, which act as communication counterparts of the server, information indicating that the clients have received the new proof keys.

20. The digital certificate management system as claimed in claim 19, wherein:
said proof key updating unit in said digital certificate management apparatus comprises a unit configured to acquire a proof key certificate, including the new proof key, which is a digital certificate for which validity can be proved with the use of an old proof key, and
wherein:
said first transmitting unit is configured to transmit the new proof key in a form of the proof key certificate, to each client; and each client comprises a unit configured to be responsive to the proof key certificate transmitted from said digital certificate management apparatus, for proving validity of the received proof key certificate with the use of the old proof key and storing the proof key included in the proof key certificate when determining that the proof key is a proper one.

21. The digital certificate management system as claimed in claim 19, wherein:
said proof key updating unit in the digital certificate management apparatus comprises:
a unit configured to acquire a first proof key certificate, including the new proof key, which is a digital certificate for which validity can be proved with the use of an old proof key; and
a unit configured to acquire a second proof key certificate, including the new proof key, which is a digital certificate for which validity can be proved with the use of the new proof key, and
wherein:
said first transmitting unit is configured to transmit the new proof keys in respective forms of the first proof key certificate and the second proof key certificate to each client; and
each client comprises:
a unit configured to be responsive to the first proof key certificate transmitted from said digital certificate management apparatus, for proving validity of the received certificate with the use of the old proof key and storing the certificate when determining that it is a proper one; and
a unit configured to be responsive to the second proof key certificate transmitted from said digital certificate management apparatus, for proving validity of the received certificate with the use of the new proof key included in the first proof key certificate, and storing the second proof key certificate when determining that it is a proper one, and then deleting the old proof key certificate and the first proof key certificate, and
wherein:
the updating order control unit in the digital certificate management apparatus is configured to perform control such that the operation of transmitting the second proof key certificate to each client from the first transmitting unit is performed at least after receiving information from all the servers which act as communication counterparts of the client indicating that the servers have received the new server certificates.

22. A digital certificate management system comprising:
a client and server system in which one or a plurality of clients and one or a plurality of servers are included, mutual authentication is performed between each client and each server with the use of a digital certificate, and data transmission is performed therebetween with communication established through the authentication; and
a digital certificate management apparatus communicatable with each client and each server, and
wherein:
said digital certificate management apparatus comprises:
a proof key updating unit which updates a proof key used for proving validity of the digital certificate used for the mutual authentication by each client and each server; and
an updating order control unit controlling a procedure of updating the proof key performed by the proof key updating unit based on information concerning the respective nodes included in the client and server system as to a communication counterpart of each node and as to whether each of the node and the counterpart acts as a client or a server, and
wherein:
said proof key updating unit comprises:
a unit configured to acquire a new proof key for updating;
a unit configured to acquire a new digital certificate, used for the mutual authentication, for which validity can be proved with the use of said new proof key;
a first transmitting unit transmitting a new client certificate which is the new digital certificate for each client, and the new proof key, to the relevant client; and
a second transmitting unit transmitting a new server certificate which is the new digital certificate for each server, and the new proof key, to the relevant server, and
wherein:
said updating order control unit controls the updating procedure so that said second transmitting unit performs the operation of transmitting the new server certificate to each server after receiving, from all the clients which act as communication counterparts of the relevant server, information indicating that the relevant clients have received the new proof keys, and said first transmitting unit performs the operation of transmitting the new client certificate to each client after receiving information, from all the servers which act as communication counterparts of the relevant client, indicating that the relevant servers have received the new proof keys.

23. A digital certificate management system comprising:
a client and server system in which one or a plurality of clients and one or a plurality of servers are included, mutual authentication is performed between each client and each server with the use of a digital certificate, and data transmission is performed therebetween with communication established through the authentication; and
a digital certificate management apparatus communicatable with each client and each server, and
wherein:
said digital certificate management apparatus comprises:
a proof key updating unit which updates a proof key used for proving validity of the digital certificate used for the mutual authentication by each client and each server; and
an updating order control unit controlling a procedure of updating the proof key performed by the proof key updating unit based on information concerning the respective nodes included in the client and server system as to a communication counterpart of each node and as to whether each of the node and the counterpart acts as a client or a server, and
wherein:
said proof key updating unit comprises:
a unit configured to acquire a new proof key for updating;
a unit configured to acquire a new digital certificate used for the mutual authentication for which validity can be proved with the use of said new proof key;
a first transmitting unit transmitting a new client certificate which is the new digital certificate for each client, and the new proof key, to the client; and
a second transmitting unit transmitting a new server certificate which is the new digital certificate for each server, and the new proof key, to the server, and
wherein:
said updating order control unit controls the updating procedure so that said first transmitting unit performs the operation of transmitting the new client certificate and the new proof key to each client at the same time, and said second transmitting unit performs the operation of transmitting the new server certificate and the new proof key to each server at the same time after receiving information, from all the clients which act as communication counterparts of the relevant server, indicating that the clients have received the new proof keys.

24. The digital certificate management system as claimed in claim 19, wherein:
    each server has an intermediary function for communication between the digital certificate management apparatus and at least one of the clients;
    said digital certificate management apparatus and each of said at least one client perform data transmission mutually via any of the servers; and
    the server transmits the new proof key and/or a new client certificate to the client, transmitted from the first transmitting unit of the digital certificate management apparatus for the client, via the communication established through authentication performed with the client, which is a transmission destination, with the use of an old digital certificate.

25. The digital certificate management system as claimed in claim 22, wherein:
    each server has an intermediary function for communication between the digital certificate management apparatus and at least one of the clients;
    said digital certificate management apparatus and each of said at least one client perform data transmission mutually via any of the servers; and
    the server transmits the new proof key and/or the new client certificate to the client, transmitted from the first transmitting unit of the digital certificate management apparatus for the client, via the communication established through authentication performed with the client, which is a transmission destination, with the use of an old digital certificate.

26. The digital certificate management system as claimed in claim 23, wherein:
    each server has an intermediary function for communication between the digital certificate management apparatus and at least one of the clients;
    said digital certificate management apparatus and each of said at least one client perform data transmission mutually via any of the servers; and
    the server transmits the new proof key and/or the new client certificate to the client, transmitted from the first transmitting unit of the digital certificate management apparatus for the client, via the communication established through authentication performed with the client, which is a transmission destination, with the use of an old digital certificate.

27. The digital certificate management system as claimed in claim 19, wherein:
    each client has an intermediary function for communication between the digital certificate management apparatus and at least one of the servers;
    said digital certificate management apparatus and each of said at least one server perform data transmission mutually via any of the clients; and
    the client transmits the new proof key and/or the new server certificate to the server, transmitted from the second transmitting unit of the digital certificate management apparatus for the server, via the communication established through authentication performed with the server, which is a transmission destination, with the use of an old digital certificate.

28. The digital certificate management system as claimed in claim 22, wherein:
    each client has an intermediary function for communication between the digital certificate management apparatus and at least one of the servers;
    said digital certificate management apparatus and each of said at least one server perform data transmission mutually via any of the clients; and
    the client transmits the new proof key and/or the new server certificate to the server, transmitted from the second transmitting unit of the digital certificate management apparatus for the server, via the communication established through authentication performed with the server, which is a transmission destination, with the use of an old digital certificate.

29. The digital certificate management system as claimed in claim 23, wherein:
    each client has an intermediary function for communication between the digital certificate management apparatus and at least one of the servers;
    said digital certificate management apparatus and each of said at least one server perform data transmission mutually via any of the clients; and
    the client transmits the new proof key and/or the new server certificate to the server, transmitted from the second transmitting unit of the digital certificate management apparatus for the server, via the communication established through authentication performed with the server, which is a transmission destination, with the use of an old digital certificate.

30. The digital certificate management system as claimed in claim 19, wherein:
    the authentication performed between the client and the server comprises authentication according to an SSL or TLS protocol; and
    the server certificate comprises a public key certificate for the server.

31. The digital certificate management system as claimed in claim 22, wherein:
    the authentication performed between the client and the server comprises authentication according to an SSL or TLS protocol; and
    the server certificate comprises a public key certificate for the server.

32. The digital certificate management system as claimed in claim 23, wherein:
    the authentication performed between the client and the server comprises authentication according to an SSL or TLS protocol; and
    the server certificate comprises a public key certificate for the server.

33. A digital certificate management apparatus communicatable with one or a plurality of clients and one or a plurality of servers which configure a client and server system, comprising:
    a proof key updating unit updating a proof key used for proving validity of a digital certificate used for authentication by the server, whereby communication is established between each client and each server; and
    an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein:

said proof key updating unit comprises:

a unit configured to acquire a new proof key for updating;

a unit configured to acquire a new digital certificate used for the authentication for which validity can be proved with the use of said new proof key;

a first transmitting unit transmitting the new proof key to each client; and a second transmitting unit transmitting a new server certificate which is the new digital certificate for each server, to the relevant server, and wherein:

said updating order control unit controls the updating procedure so that said second transmitting unit performs the operation of transmitting the new server certificate to the respective server after receiving from all the clients, which act as communication counterparts of the server, information indicating that the clients have received the new proof keys.

34. A digital certificate management apparatus communicatable with one or a plurality of clients and one or a plurality of servers which configure a client and server system, comprising:

a proof key updating unit updating a proof key used for proving validity of a digital certificate used for mutual authentication, whereby communication is established between each client and each server; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein:

said proof key updating unit comprises:

a unit configured to acquire a new proof key for updating;

a unit configured to acquire a new digital certificate, used for the mutual authentication, for which validity can be proved with the use of said new proof key;

a first transmitting unit transmitting a new client certificate which is the new digital certificate for each client, and the new proof key, to the relevant client; and a second transmitting unit transmitting a new server certificate which is the new digital certificate for each server, and the new proof key, to the relevant server, and wherein:

said updating order control unit controls the updating procedure so that said second transmitting unit performs the operation of transmitting the new server certificate to each server after receiving, from all the clients which act as communication counterparts of the relevant server, information indicating that the relevant clients have received the new proof keys, and said first transmitting unit performs the operation of transmitting the new client certificate to each client after receiving information, from all the servers which act as communication counterparts of the relevant client, indicating that the relevant servers have received the new proof keys.

35. A digital certificate management apparatus communicatable with one or a plurality of clients and one or a plurality of servers which configure a client and server system, comprising:

a proof key updating unit updating a proof key used for proving validity of a digital certificate used for mutual authentication, whereby communication is established between each client and each server; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein:

said proof key updating unit comprises:

a unit configured to acquire a new proof key for updating;

a unit configured to acquire a new digital certificate used for the mutual authentication for which validity can be proved with the use of said new proof key;

a first transmitting unit transmitting a new client certificate which is the new digital certificate for each client, and the new proof key, to the client; and a second transmitting unit transmitting a new server certificate which is the new digital certificate for each server, and the new proof key, to the server, and wherein:

said updating order control unit controls the updating procedure so that said first transmitting unit performs the operation of transmitting the new client certificate and the new proof key to each client at the same time, and said second transmitting unit performs the operation of transmitting the new server certificate and the new proof key to each server at the same time after receiving information, from all the clients which act as communication counterparts of the relevant server, indicating that the clients have received the new proof keys.

36. A digital certificate management method for managing, in a digital certificate management apparatus communicatable with a server and a client which configure a client and server system, a digital certificate used for authentication whereby communication is established between the server and the client, comprising the steps of:

a) updating a proof key used for proving validity of the digital certificate used for authentication by the server, and wherein said step a) comprises the steps of:

a-1) acquiring a new proof key for updating; and a-2) acquiring a new digital certificate used for the authentication for which validity can be proved with the use of said new proof key;

b-1) transmitting the new proof key to the client; and b-2) transmitting a new server certificate which is a new digital certificate for the server, to the server, after receiving, from the client, information indicating that the client has received the new proof key.

37. The digital certificate management method as claimed in claim 36, wherein:

said step a) further comprises the step of a-3) acquiring a proof key certificate, which is the digital certificate, including the new proof key, for which validity can be proved with the use of an old proof key;

said step b-1) further comprises the step of b-3) transmitting the new proof key in a form of the proof key certificate to the client; and when the proof key certificate is transmitted to the client, the client is caused to prove validity of the received proof key certificate with the use of the old proof key and store the proof key included in the proof key certificate when determining that the proof key is a proper one.

38. The digital certificate management method as claimed in claim 36, wherein:
said step a) further comprises the steps of:
a-4) acquiring a first proof key certificate, including the new proof key, which is the digital certificate for which validity can be proved with the use of an old proof key certificate; and
a-5) acquiring a second proof key certificate, including the new proof key, which is a digital certificate for which validity can be proved with the use of the new proof key, and
wherein:
said step b-1) comprises the step of transmitting the new proof keys in respective forms of the first proof key certificate and the second proof key certificate to the client;
after the completion of said step b-2), the second proof key certificate is transmitted to the client at least after information indicating that the server has received the new server certificate is received;
the client is caused to prove validity of the received certificate with the use of the old proof key upon receiving the first proof key certificate, and to store the certificate when determining that it is a proper one; and
the client is caused to prove validity of the received certificate with the use of the new proof key included in the first proof key certificate when receiving the second proof key certificate, and to store the second proof key certificate when determining that it is a proper one, and then delete the old proof key certificate and the first proof key certificate.

39. A digital certificate management method for managing, in a digital certificate management apparatus communicatable with a server and a client which configure a client and server system, a digital certificate used for mutual authentication whereby communication is established between the server and the client, comprising the steps of:
a) updating a proof key used for proving validity of the digital certificate used for the mutual authentication by the client and the server, and
wherein:
said step a) comprises the steps of;
a-1) acquiring a new proof key for updating; and
a-2) acquiring a new digital certificate used for the mutual authentication for which validity can be proved with the use of said new proof key;
b-1) transmitting the new proof key to the server;
b-2) transmitting the new proof key to the client;
b-3) transmitting a new client certificate which is the new digital certificate for the client, to the client; and
b-4) transmitting a new server certificate which is the new digital certificate for the server, to the server; and
wherein:
said steps a-1), a-2), b-1), b-2), b-3) and b-4) are executed in a predetermined order; and
said step b-4) is performed after the completion of said step b-2) and also after information indicating that the client has received the new proof key from the client is received from the client, and also, said step b-3) is performed after the completion of said step b-1) and also after information indicating that the server has received the new proof key is received from the server.

40. The digital certificate management method as claimed in claim 39, wherein:

said step b-3) is performed at the same time or after the completion of said step b-2), and also, said step b-4) is performed at the same time or after the completion of said step b-1).

41. A digital certificate management method for managing, in a digital certificate management apparatus communicatable with a server and a client which configure a client and server system, a digital certificate used for mutual authentication whereby communication is established between the server and the client, comprising the steps of:
a) updating a proof key used for proving validity of the digital certificate used for the mutual authentication by the client and the server, and
wherein:
said step a) comprises the steps of:
a-1) acquiring a new proof key for updating;
a-2) acquiring a new digital certificate used for the mutual authentication for which validity can be proved with the use of said new proof key;
b-1) transmitting the new proof key to the server;
b-2) transmitting the new proof key to the client;
b-3) transmitting a new client certificate which is the new digital certificate for the client, to the client; and
b-4) transmitting a new server certificate which is the new digital certificate for the server, to the server, and
wherein:
said steps a-1), a-2), b-1), b-2), b-3) and b-4) are executed in a predetermined order; and
said steps b-2) and b-3) are performed together, and then, after the completion of these steps and after information indicating that the client has received the new proof key, said steps b-1) and b-4) are performed together.

42. The digital certificate management method as claimed in claim 36, wherein:
said digital certificate management apparatus and the client perform data transmission mutually via the server; and
the server transmits the new proof key and/or a new client certificate to the client, transmitted in said step b-2) and/or said step b-1) from the digital certificate management apparatus for the client, via the communication established through authentication performed with the client with the use of an old digital certificate.

43. The digital certificate management method as claimed in claim 39, wherein:
said digital certificate management apparatus and the client perform data transmission mutually via the server; and
the server transmits the new proof key and/or the new client certificate to the client, transmitted in said step b-2) and/or said step b-3) from the digital certificate management apparatus for the client, via the communication established through authentication performed with the client with the use of an old digital certificate.

44. The digital certificate management method as claimed in claim 41, wherein:
said digital certificate management apparatus and the client perform data transmission mutually via the server; and
the server transmits the new proof key and/or the new client certificate to the client, transmitted in said step b-2) and/or said step b-3) from the digital certificate management apparatus for the client, via the communication established through authentication performed with the client with the use of an old digital certificate.

45. The digital certificate management method as claimed in claim 36, wherein:
said digital certificate management apparatus and the server perform data transmission mutually via the client; and
the client transmits the new proof key and/or the new server certificate to the server, transmitted in said step b-1) and/or said step b-2) from the digital certificate management apparatus for the server, via the communication established through authentication performed with the server with the use of an old digital certificate.

46. The digital certificate management method as claimed in claim 39, wherein:
said digital certificate management apparatus and the server perform data transmission mutually via the client; and
the client transmits the new proof key and/or the new server certificate to the server, transmitted in said step b-1) and/or said step b-4) from the digital certificate management apparatus for the server, via the communication established through authentication performed with the server with the use of an old digital certificate.

47. The digital certificate management method as claimed in claim 41, wherein:
said digital certificate management apparatus and the server perform data transmission mutually via the client; and
the client transmits the new proof key and/or the new server certificate to the server, transmitted in said step b-1) and/or said step b-4) from the digital certificate management apparatus for the server, via the communication established through authentication performed with the server with the use of an old digital certificate.

48. The digital certificate management method as claimed in claim 36, wherein:
the authentication performed between the client and the server comprises authentication according to an SSL or TLS protocol; and
the server certificate comprises a public key certificate for the server.

49. The digital certificate management method as claimed in claim 39, wherein:
the authentication performed between the client and the server comprises authentication according to an SSL or TLS protocol; and
the server certificate comprises a public key certificate for the server.

50. The digital certificate management method as claimed in claim 41, wherein:
the authentication performed between the client and the server comprises authentication according to an SSL or TLS protocol; and
the server certificate comprises a public key certificate for the server.

51. A digital certificate management method for managing, in a digital certificate management apparatus communicatable with one or a plurality of servers and one or a plurality of clients which configure a client and server system, a digital certificate used for mutual authentication whereby communication is established between the one or the plurality of servers and the one or the plurality of clients, comprising the steps of:
a) updating a proof key used for proving validity of the digital certificate used for authentication, based on an updating procedure determined according to information concerning the respective nodes included in the client and server system as to a communication counterpart of each node and as to whether each of the node and the counterpart acts as a client or a server, and
wherein:
said step a) comprising the steps of:
a-1) acquiring a new proof key for updating;
a-2) acquiring a new digital certificate used for the mutual authentication for which validity can be proved with the use of said new proof key;
a-3) transmitting the new proof key to each client; and
a-4) transmitting a new server certificate which is a new digital certificate for each server, to the server, and
wherein:
said updating procedure is configured so that said step a-4) is performed after information indicating that the new proof keys have been received is received from all the clients, which act as communication counterparts of the relevant server.

52. The digital certificate management method as claimed in claim 51, wherein:
said step a) further comprises the steps of a-5) acquiring a proof key certificate, including the new proof key, which is the digital certificate for which validity can be proved with the use of an old proof key, and
wherein:
said step a-3) comprises the step of transmitting the new proof key in a form of the proof key certificate to the client; and
the client is caused to prove validity of the received proof key certificate with the use of the old proof key when receiving the proof key certificate, and to store the proof key included in the proof key certificate when determining that the proof key is a proper one.

53. The digital certificate management method as claimed in claim 51, wherein:
said step a) further comprises the steps of:
a-6) acquiring a first proof key certificate, including the new proof key, which is the digital certificate for which validity can be proved with the use of an old proof key certificate; and
a-7) acquiring a second proof key certificate, including the new proof key, which is the digital certificate for which validity can be proved with the use of the new proof key, and
wherein:
said step a-3) comprises the step of transmitting the new proof keys in respective forms of the first proof key certificate and the second proof key certificate to each client;
said step a-3) is configured so that the operation of transmitting the second proof key certificate to each client is performed at least after information is received from all the servers, which act as communication counterparts of the client, indicating that the servers have received the new server certificate;
each client is caused to be responsive to the first proof key certificate received from said digital certificate management apparatus, for proving validity of the received certificate with the use of the old proof key and storing the certificate when determining that it is a proper one; and
each client is caused to be responsive to the second proof key certificate received from said digital certificate management apparatus for proving validity of the received certificate with the use of the new proof key included in the first proof key certificate and storing the second proof key certificate when determining that it is a proper one, and then to delete the old proof key certificate and the first proof key certificate.

54. A digital certificate management method for managing, in a digital certificate management apparatus communicatable with one or a plurality of servers and one or a plurality of clients which configure a client and server system, a digital certificate used for mutual authentication whereby communication is established between the one or the plurality of servers and the one or the plurality of clients, comprising the step of:
   a) updating a proof key used for proving validity of the digital certificate used for the mutual authentication based on an updating procedure determined according to information concerning the respective nodes included in the client and server system as to a communication counterpart of each node and as to whether each of the node and the counterpart acts as a client or a server, and
   wherein:
   said step a) comprises:
   a-1) acquiring a new proof key for updating;
   a-2) acquiring a new digital certificate, used for the mutual authentication, for which validity can be proved with the use of said new proof key;
   a-3) transmitting a new client certificate which is the new digital certificate for each client, and the new proof key, to the relevant client; and
   a-4) transmitting a new server certificate which is the new digital certificate for each server, and the new proof key, to the relevant server, and
   wherein:
   said updating procedure is configured so that said step a-4) is performed after information indicating that the relevant clients have received the new proof keys is received from all the clients which act as communication counterparts of the relevant server, and said step a-3) is performed after information indicating that the relevant servers have received the new proof keys is received from all the servers which act as communication counterparts of the relevant client.

55. A digital certificate management method for managing, in a digital certificate management apparatus communicatable with one or a plurality of servers and one or a plurality of clients which configure a client and server system, a digital certificate used for mutual authentication whereby communication is established between the one or the plurality of servers and the one or the plurality of clients, comprising the step of:
   a) updating a proof key used for proving validity of the digital certificate used for the mutual authentication based on an updating procedure determined according to information concerning the respective nodes included in the client and server system as to a communication counterpart of each node and as to whether each of the node and the counterpart acts as a client or a server, and
   wherein:
   said step a) comprises the steps of:
   a-1) acquiring a new proof key for updating;
   a-2) acquiring a new digital certificate used for the mutual authentication for which validity can be proved with the use of said new proof key;
   a-3) transmitting a new client certificate which is the new digital certificate for each client, and the new proof key, to the client; and
   a-4) transmitting a new server certificate which is the new digital certificate for each server, and the new proof key, to the server; and
   wherein said updating procedure is configured so that operations of transmitting the new client certificate and the new proof key to each client are performed at the same time, and operations of transmitting the new server certificate and the new proof key to each server are performed at the same time after information indicating that the clients have received the new proof keys is received from all the clients which act as communication counterparts of the relevant server.

56. The digital certificate management method as claimed in claim 51, wherein:
   said digital certificate management apparatus and each client perform data transmission mutually via any of the servers; and
   the server transmits the new proof key and/or a new client certificate to the client, transmitted from the digital certificate management apparatus for the client in said step a-3), via the communication established through authentication performed with the client which is a transmission destination with the use of an old digital certificate.

57. The digital certificate management method as claimed in claim 54, wherein:
   said digital certificate management apparatus and each client perform data transmission mutually via any of the servers; and
   the server transmits the new proof key and/or the new client certificate to the client, transmitted from the digital certificate management apparatus for the client in said step a-3), via the communication established through authentication performed with the client which is a transmission destination with the use of an old digital certificate.

58. The digital certificate management method as claimed in claim 55, wherein:
   said digital certificate management apparatus and each client perform data transmission mutually via any of the servers; and
   the server transmits the new proof key and/or the new client certificate to the client, transmitted from the digital certificate management apparatus for the client in said step a-3), via the communication established through authentication performed with the client which is a transmission destination with the use of an old digital certificate.

59. The digital certificate management method as claimed in claim 51, wherein:
   said digital certificate management apparatus and each server perform data transmission mutually via any of the clients; and
   the client transmits the new proof key and/or the new server certificate to the server, transmitted from the digital certificate management apparatus for the server in said step a-4), via the communication established through authentication performed with the server which is a transmission destination with the use of an old digital certificate.

60. The digital certificate management method as claimed in claim 54, wherein:
   said digital certificate management apparatus and each server perform data transmission mutually via any of the clients; and
   the client transmits the new proof key and/or the new server certificate to the server, transmitted from the digital certificate management apparatus for the server in said step a-4), via the communication established through authentication performed with the server which is a transmission destination with the use of an old digital certificate.

61. The digital certificate management method as claimed in claim 55, wherein:
said digital certificate management apparatus and each server perform data transmission mutually via any of the clients; and
the client transmits the new proof key and/or the new server certificate to the server, transmitted from the digital certificate management apparatus for the server in said step a-4), via the communication established through authentication performed with the server which is a transmission destination with the use of an old digital certificate.

62. The digital certificate management method as claimed in claim 51, wherein:
the authentication performed between the client and the server comprises authentication according to an SSL or TLS protocol; and
the server certificate comprises a public key certificate for the server.

63. The digital certificate management method as claimed in claim 54, wherein:
the authentication performed between the client and the server comprises authentication according to an SSL or TLS protocol; and
the server certificate comprises a public key certificate for the server.

64. The digital certificate management method as claimed in claim 55, wherein:
the authentication performed between the client and the server comprises authentication according to an SSL or TLS protocol; and
the server certificate comprises a public key certificate for the server.

65. An updating procedure determining method for determining an updating procedure to be stored in one or a plurality of clients and one or a plurality of servers which configure a client and server system, for updating by a digital certificate management apparatus a proof key used for proving validity of a digital certificate used for authentication, through which communication is established between the one or the plurality of clients and the one or the plurality of servers, comprising the step of:
determining the updating procedure based on information concerning the respective nodes included in the client and server system as to a communication counterpart of each node and as to whether each of the node and the counterpart acts as a client or a server,
so that a step of transmitting a new server certificate which is the new digital certificate for which validity can be proved with the use of a new proof key for updating, used for the authentication by the server, is performed after information indicating that all the clients which act as communication counterparts of the server is received from the clients.

66. A computer readable information recording medium storing therein a program for causing a computer, which controls a digital certificate management apparatus communicatable with a client and a server which configure a client and server system, to perform a proof key updating step of updating a proof key used for providing validity of a digital certificate used by the server for authentication performed when communication is established between the client and the server, said program being configured to cause the computer to function as:
a unit configured to acquire a new proof key for updating;
a unit configured to acquire a new digital certificate used for the authentication for which validity can be proved with the use of said new proof key;
a first transmitting unit transmitting the new proof key to the client; and
a second transmitting unit transmitting a new server certificate which is the new digital certificate for the server, to the server, and
wherein:
said second transmitting unit performs the operation of transmitting the new server certificate to the server after receiving from the client information indicating that the client has received the new proof key.

67. A computer readable information recording medium storing therein a program for causing a computer, which controls a digital certificate management apparatus communicatable with a client and a server which configure a client and server system, to perform a proof key updating step of updating a proof key used for providing validity of a digital certificate used for authentication performed when communication is established between the client and the server, said program being configured to cause the computer to function as:
a unit configured to acquire a new proof key for updating;
a unit configured to acquire a new digital certificate used for the mutual authentication for which validity can be proved with the use of said new proof key;
a first transmitting unit transmitting a new client certificate which is the new digital certificate for the client, and the new proof key, to the client; and
a second transmitting unit transmitting a new server certificate which is the new digital certificate for the server, and the new proof key, to the server, and
wherein: said second transmitting unit performs the operation of transmitting the new server certificate to the server after receiving from the client information indicating that the client has received the new proof key; and
said first transmitting unit performs the operation of transmitting the new client certificate to the client after receiving information from the server indicating that the server has received the new proof key.

68. A computer readable information recording medium storing a program for causing a computer, which controls a digital certificate management apparatus communicatable with a client and a server which configure a client and server system, to perform a proof key updating step of updating a proof key used for proving validity of a digital certificate used for authentication performed when communication is established between the client and the server, said program being configured to cause the computer to function as:
a unit configured to acquire a new proof key for updating;
a unit configured to acquire a new digital certificate used for the mutual authentication for which validity can be proved with the use of said new proof key;
a first transmitting unit transmitting a new client certificate which is the new digital certificate for the client, and the new proof key, to the client; and
a second transmitting unit transmitting a new server certificate which is the new digital certificate for the server, and the new proof key, to the server, and wherein:

said first transmitting unit has a function of performing the operation of transmitting the new client certificate and the new proof key to the client at the same time; and said second transmitting unit has a function of performing the operation of transmitting the new server certificate and the new proof key to the server at the same time after receiving information from the client indicating that the client has received the new proof key.

69. A computer readable information recording medium storing therein a program for causing a computer, which controls a digital certificate management apparatus communicatable with one of a plurality of clients and one or a plurality of servers which configure a client and server system, to function as:

a proof key updating unit updating a proof key used for proving validity of a digital certificate used for authentication by each server for establishing communication between each server and each client: and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein:

said proof key updating unit comprises:

a unit configured to acquire a new proof key for updating;

a unit configured to acquire a new digital certificate used for the authentication for which validity can be proved with the use of said new proof key;

a first transmitting unit transmitting the new proof key to each client; and a second transmitting unit transmitting a new server certificate which is the new digital certificate for each server, to the relevant server, and wherein:

said updating order control unit controls the updating procedure so that said second transmitting unit performs the operation of transmitting the new server certificate to the respective server after receiving from all the clients, which act as communication counterparts of the server, information indicating that the clients have received the new proof keys.

70. A computer readable information recording medium storing therein a program for causing a computer, which controls a digital certificate management apparatus communicatable with one of a plurality of clients and one or a plurality of servers which configure a client and server system, to function as:

a proof key updating unit updating a proof key used for proving validity of the digital certificate used for mutual authentication for establishing communication between each server and each client; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein:

said proof key updating unit has the functions of:

a unit configured to acquire a new proof key for updating;

a unit configured to acquire a new digital certificate, used for the mutual authentication, for which validity can be proved with the use of said new proof key;

a first transmitting unit transmitting a new client certificate which is the new digital certificate for each client, and the new proof key, to the relevant client; and a second transmitting unit transmitting a new server certificate which is the new digital certificate for each server, and the new proof key, to the relevant server, and wherein:

said updating order control unit is configured to control the updating procedure so that said second transmitting unit performs the operation of transmitting the new server certificate to each server after receiving, from all the clients which act as communication counterparts of the relevant server, information indicating that the relevant clients have received the new proof keys, and said first transmitting unit performs the operation of transmitting the new client certificate to each client after receiving information, from all the servers which act as communication counterparts of the relevant client, indicating that the relevant servers have received the new proof keys.

71. A computer readable information recording medium storing therein a program for causing a computer, which controls a digital certificate management apparatus communicatable with one of a plurality of clients and one or a plurality of servers which configure a client and server system, to function as:

a proof key updating unit updating a proof key used for proving validity of the digital certificate used for mutual authentication for establishing communication between each server and each client; and an updating order control unit controlling a procedure of updating the proof key performed by the proof key updating unit based on information concerning the respective nodes included in the client and server system as to a communication counterpart of each node and as to whether each of the node and the counterpart acts as a client or a server, and wherein:

said proof key updating unit has the functions of:

a unit configured to acquire a new proof key for updating;

a unit configured to acquire a new digital certificate used for the mutual authentication for which validity can be proved with the use of said new proof key;

a first transmitting unit transmitting a new client certificate which is the new digital certificate for each client, and the new proof key, to the client; and a second transmitting unit transmitting a new server certificate which is the new digital certificate for each server, and the new proof key, to the server, and wherein:

said updating order control unit is configured to control the updating procedure so that said first transmitting unit performs the operations of transmitting the new client certificate and the new proof key to each client at the same time, and said second transmitting unit performs the operations of transmitting the new server certificate and the new proof key to each server at the same time after receiving information, from all the clients which act as communication counterparts of the relevant server, indicating that the clients have received the new proof keys.

* * * * *